(12) United States Patent
Ezumi et al.

(10) Patent No.: US 8,306,196 B2
(45) Date of Patent: Nov. 6, 2012

(54) COMMUNICATION TERMINAL, CONTROL METHOD FOR COMMUNICATION TERMINAL AND CONTROL PROGRAM FOR COMMUNICATION TERMINAL

(75) Inventors: Yosuke Ezumi, Tokyo (JP); Tomoyuki Takeda, Yokohama (JP); Muneki Nakao, Yokohama (JP); Koichiro Otsuka, Tokyo (JP); Yoshiyuki Hirai, Kunitachi (JP); Shinya Kogure, Ohta (JP)

(73) Assignee: Canon Kabushiki Kaisha, Tokyo (JP)

( * ) Notice: Subject to any disclaimer, the term of this patent is extended or adjusted under 35 U.S.C. 154(b) by 1051 days.

(21) Appl. No.: 10/543,544

(22) PCT Filed: Jan. 26, 2004

(86) PCT No.: PCT/JP2004/000664
§ 371 (c)(1),
(2), (4) Date: Feb. 22, 2006

(87) PCT Pub. No.: WO2004/073289
PCT Pub. Date: Aug. 26, 2004

(65) Prior Publication Data
US 2006/0242242 A1   Oct. 26, 2006

(30) Foreign Application Priority Data

Jan. 27, 2003 (JP) .................. 2003-016948
Jan. 28, 2003 (JP) .................. 2003-018132

(51) Int. Cl.
*H04M 1/64* (2006.01)
(52) U.S. Cl. .................. 379/88.17; 379/93.01
(58) Field of Classification Search ............... 379/88.17, 379/220, 93.06, 93.07, 93.05; 309/256, 230; 709/202
See application file for complete search history.

(56) References Cited

U.S. PATENT DOCUMENTS 5,918,009 A * 6/1999 Gehani et al. .................. 726/8
(Continued)

FOREIGN PATENT DOCUMENTS

JP     2001-119405     4/2001
(Continued)

OTHER PUBLICATIONS

A Peer-to-Peer Communication System, pp. 873-879, Springer-Verlag Berlin Heidelberg 2002.*

*Primary Examiner* — Curtis Kuntz
*Assistant Examiner* — Amal Zenati
(74) *Attorney, Agent, or Firm* — Fitzpatrick, Cella, Harper & Scinto

(57) ABSTRACT

The invention is to enable a secure sharing of an internet resource with a partner in conversation by the IP telephone, in simple and inexpensive manner and not requiring cumbersome operations, by a communication terminal only, not relying on another equipment. Internet resource sharing means is provided for a shared utilization of a same internet resource (WEB data, FTP file etc.) among the communication terminals (200, 220) in conversation. The sharing of the internet resource is executed by transmitting/receiving URL information of the desired internet resource by FTP or by an E-mail protocol, or by transmitting/receiving the internet resource itself by an HTTP proxy procedure with the partner communication terminal, in which either of the communication terminal and the partner terminal functions as an HTTP proxy server and the other functions as an HTTP client.

The sharing of the internet resource can also be achieved by accessing to a server providing a desired internet resource, and changing the transmitting address of the packet transmitted in such operation to an IP address of the partner in conversation, in such a manner that a response packet of the server is transmitted to the partner in conversation.

16 Claims, 37 Drawing Sheets

U.S. PATENT DOCUMENTS

| | | | |
|---|---|---|---|
| 6,751,211 B1 * | 6/2004 | Chack | 370/352 |
| 6,829,654 B1 * | 12/2004 | Jungck | 709/246 |
| 7,002,703 B2 * | 2/2006 | Parry | 358/1.15 |
| 7,054,908 B2 | 5/2006 | Kogure et al. | |
| 7,117,023 B2 | 10/2006 | Takeda et al. | |
| 7,385,621 B2 * | 6/2008 | Parker et al. | 348/14.08 |
| 7,496,670 B1 * | 2/2009 | Givoly | 709/230 |
| 2002/0145753 A1 | 10/2002 | Inoue et al. | |
| 2003/0051215 A1 | 3/2003 | Nakao | |
| 2004/0093375 A1 * | 5/2004 | Mason et al. | 709/203 |
| 2004/0151165 A1 | 8/2004 | Ezumi | |
| 2004/0179470 A1 * | 9/2004 | Nguyen et al. | 370/216 |
| 2004/0196506 A1 | 10/2004 | Izumi et al. | |
| 2005/0018657 A1 | 1/2005 | Nakao et al. | |
| 2005/0047558 A1 | 3/2005 | Kogure | |
| 2005/0114646 A1 | 5/2005 | Rekimoto et al. | |

FOREIGN PATENT DOCUMENTS

| | | |
|---|---|---|
| JP | 2001-292138 | 10/2001 |
| JP | 2002-158804 | 5/2002 |
| JP | 2003-153223 | 5/2003 |
| JP | 2004-104653 | 4/2004 |

* cited by examiner

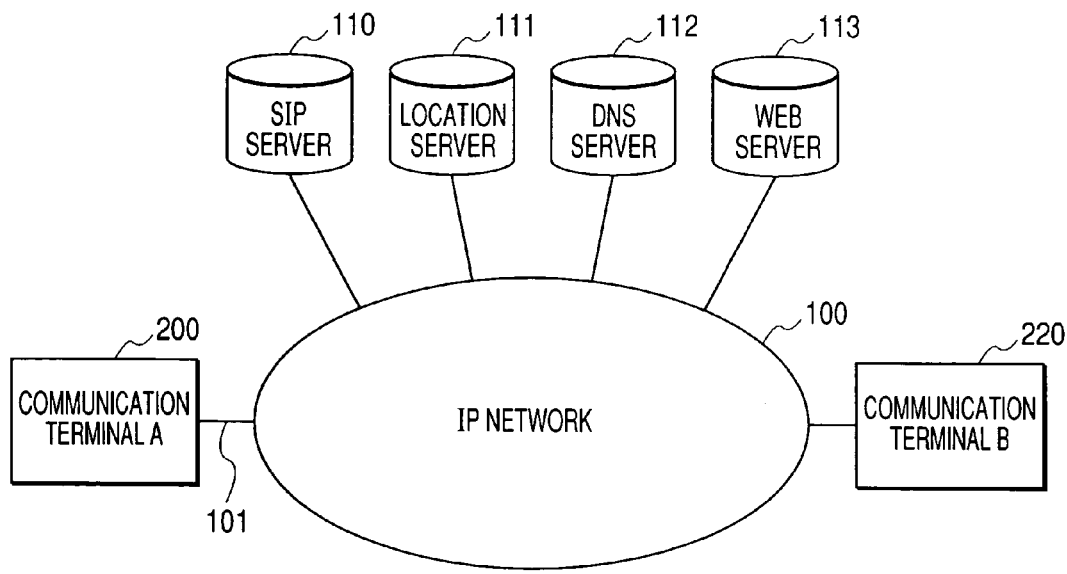
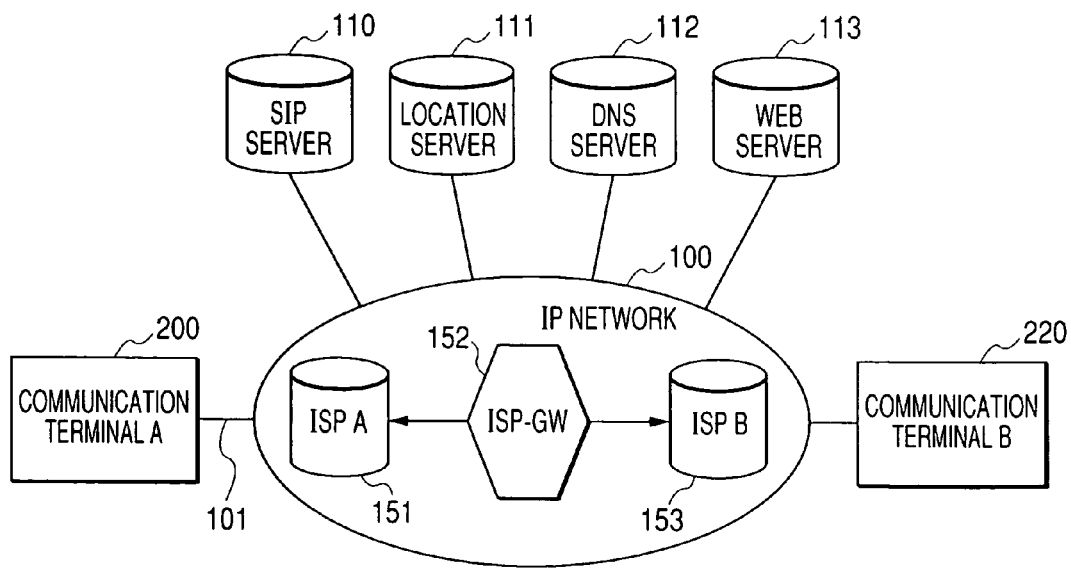

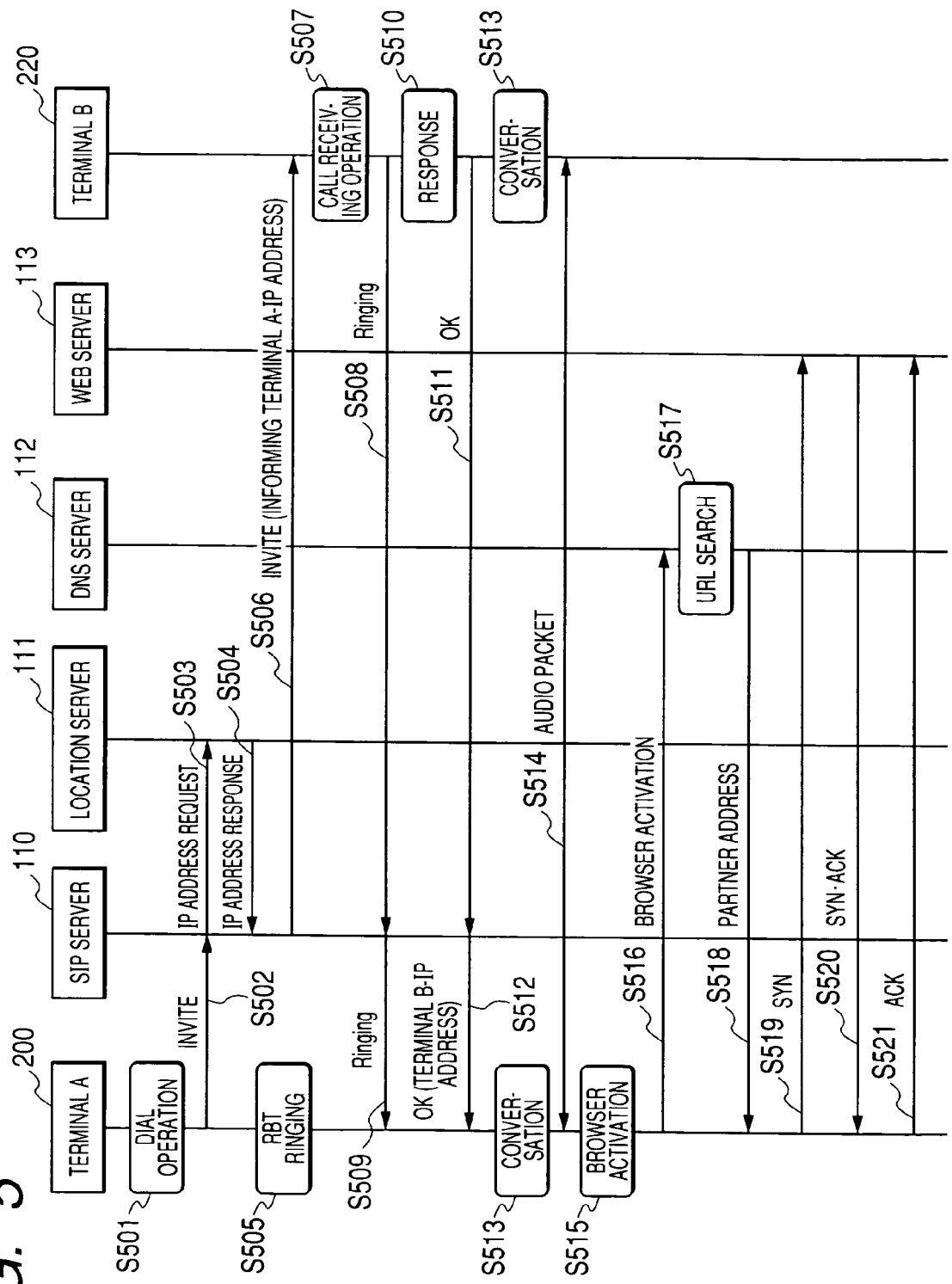

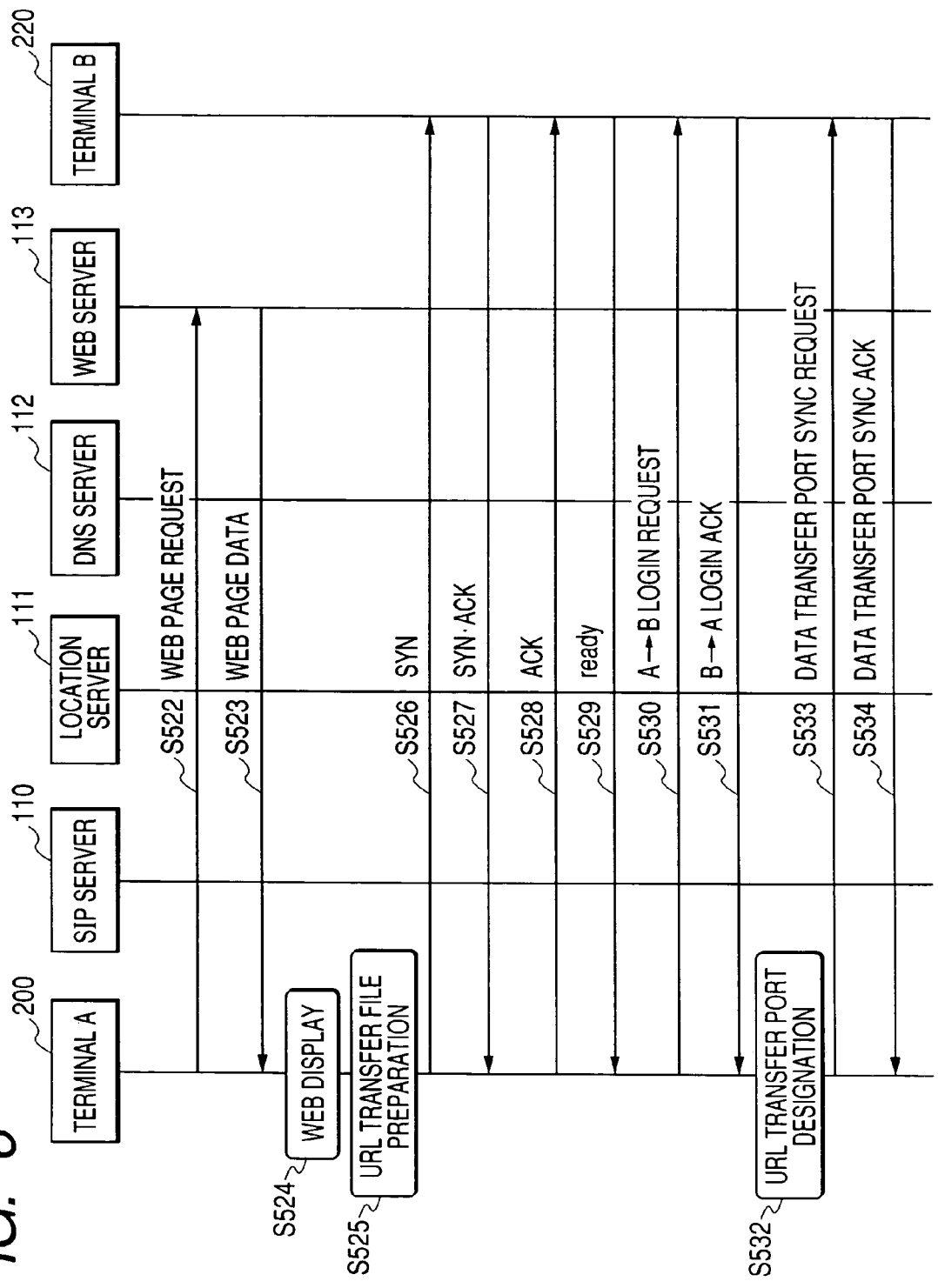

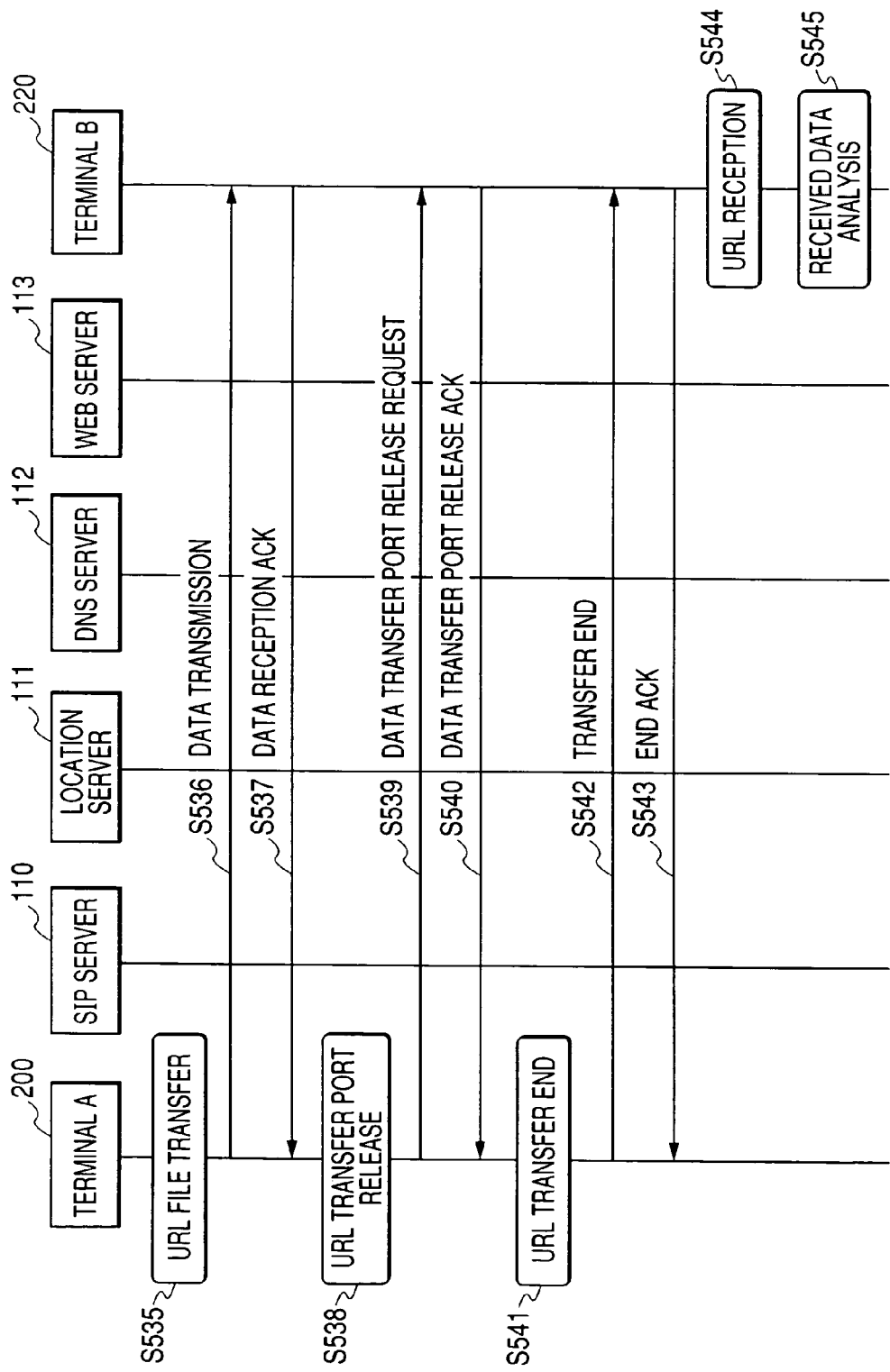

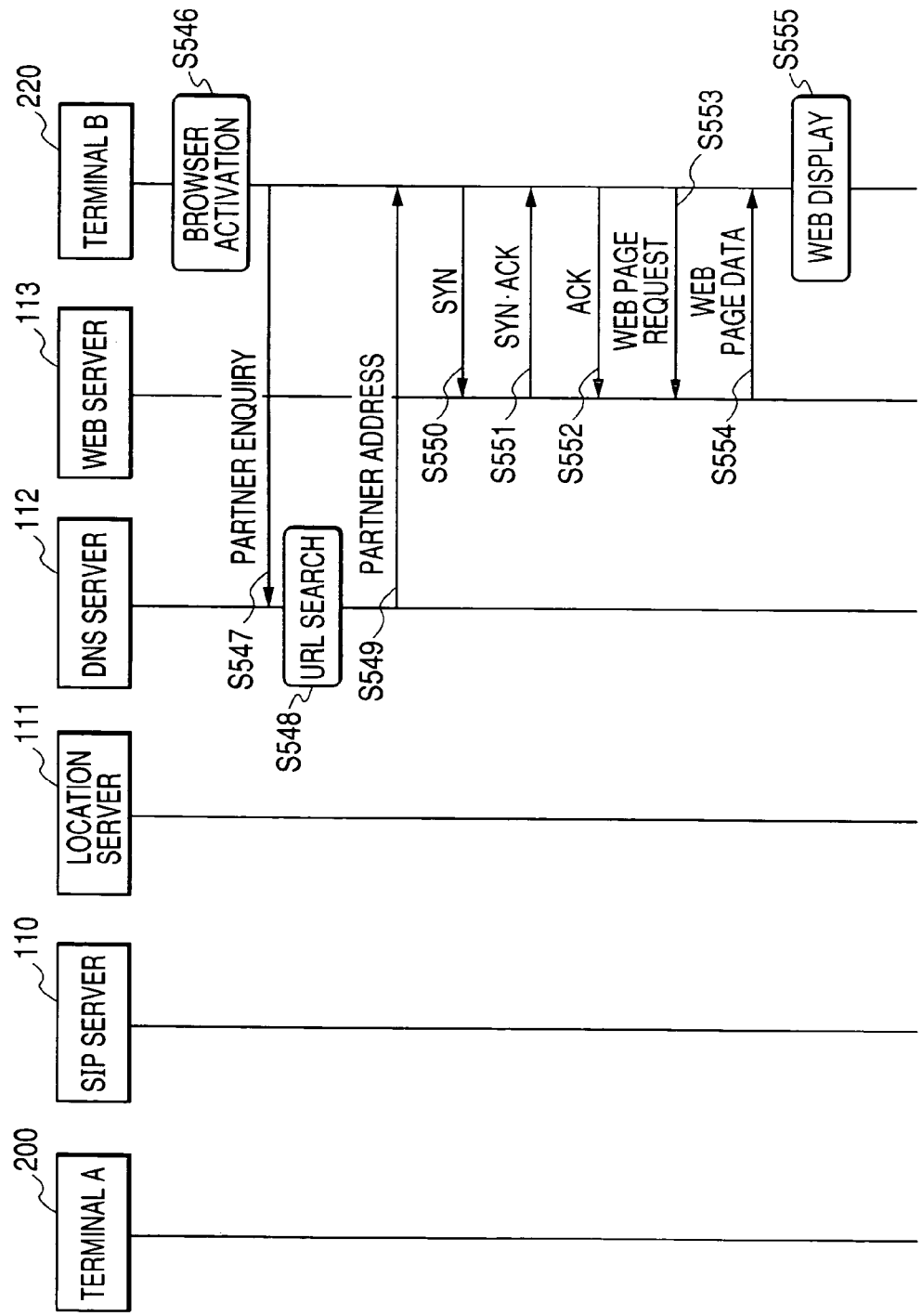

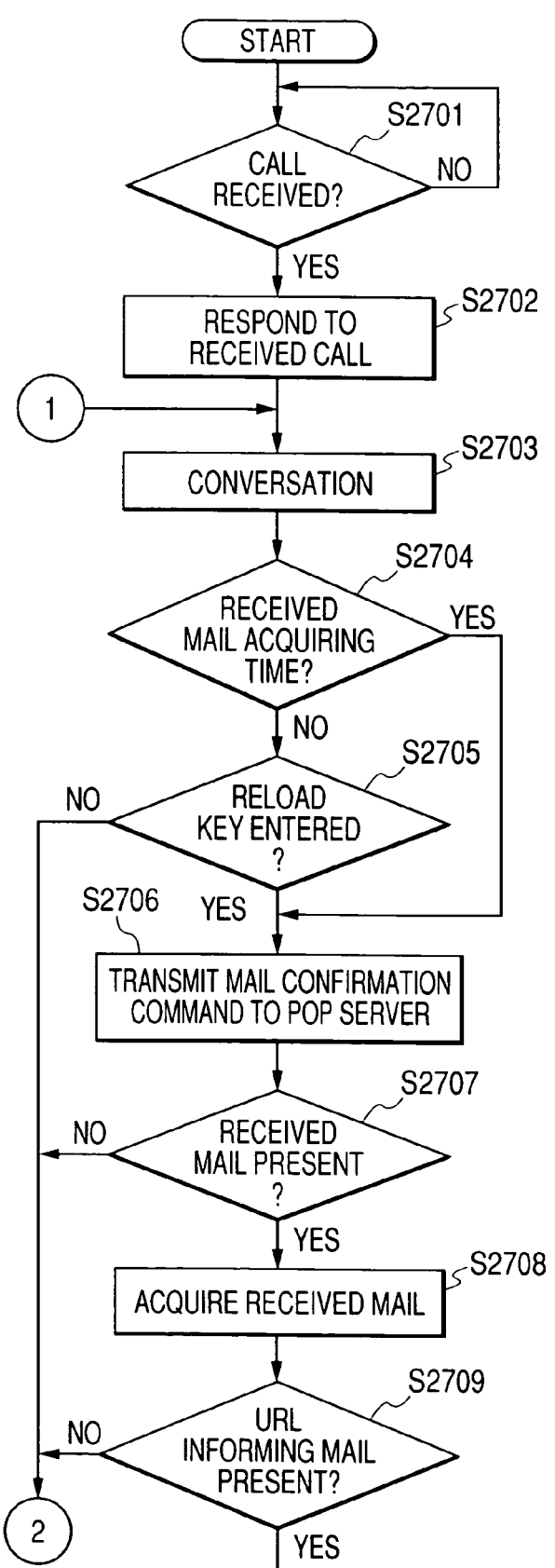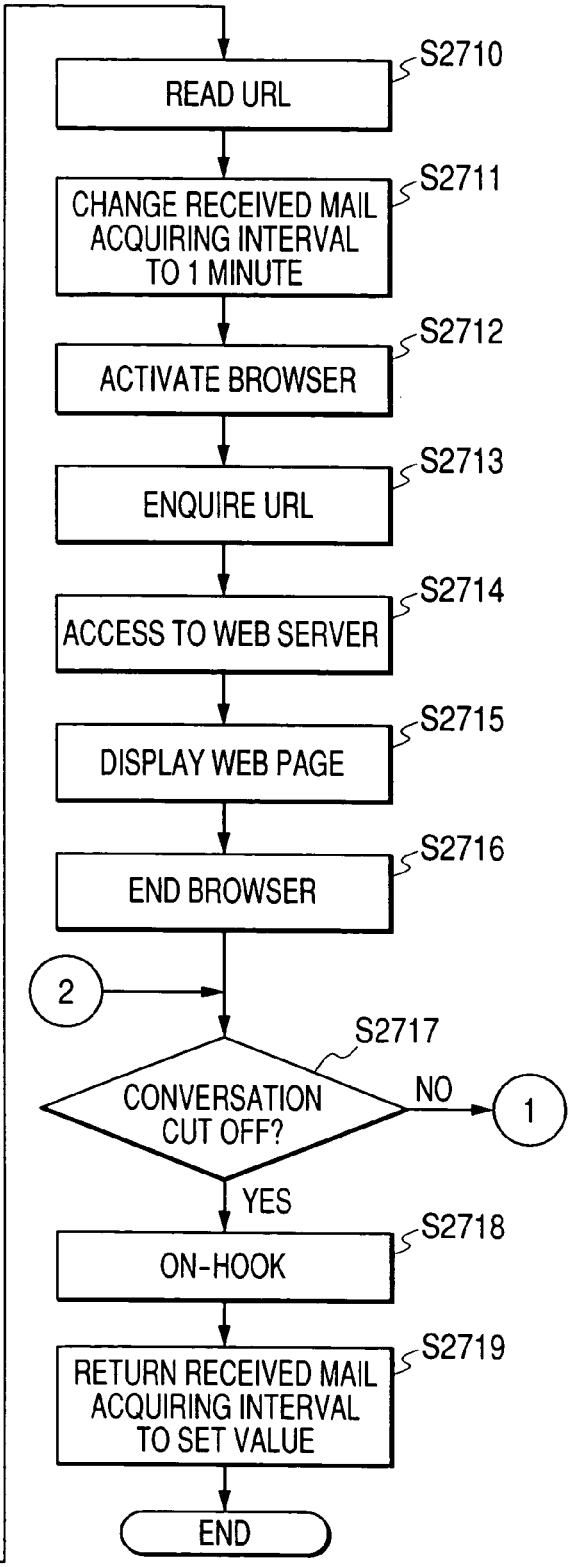
FIG. 23

FIG. 31

```
POST /BrowserClass HTTP/1.1
Host: www.BrowsDenwaCorp.com
Content-Type: text/xml; charset=utf-8
Content-Length: length
SOAPAction: "BrowserRemoteClass"<?xml version="1.0" encoding="utf-8"?>
<soap:Envelope xmlns:soap="http://schemas.xmlsoap.org/soap/envelope/">
  <soap:Body soap:encodingStyle="http://schemas.xmlsoap.org/soap/encoding/">
    <RemoteCmd>
      <BrowsURL>http://www.canon.co.jp/ezumi.html</BrowsURL>
    </RemoteCmd>
  </soap:Body>
</soap:Envelope>
```

COMMUNICATION TERMINAL, CONTROL METHOD FOR COMMUNICATION TERMINAL AND CONTROL PROGRAM FOR COMMUNICATION TERMINAL

This application is a National Stage filing under 35 U.S.C. §371 of International Application No. PCT/JP2004/000664, filed Jan. 26, 2004, which in turn claims priority of both Japanese Application No. 2003-016948, filed Jan. 27, 2003, and Japanese Application No. 2003-018132, filed Jan. 28, 2003, the priorities of each of which are hereby claimed, said International Application having been published in Japanese, but not in English, as International Publication No. WO 2004/073289 A1 on Aug. 26, 2004.

TECHNICAL FIELD

The present invention relates to a communication terminal connected to an IP network and executing a conversation by a predetermined IP telephone system, a control method and a control program therefor.

BACKGROUND ART

In recent years, the internet is becoming rapidly pervasive over the world, and an internet telephone (hereinafter represented as IP telephone) is attracting attention because of an advantage capable of significantly reducing the communication charge. In the internet telephone, a particularly promising standard is VoIP (non-patent literature 1: ITU-U recommendation H.323), and various equipment for the internet telephone are being proposed according to such standard.

In a mode of utilization of the IP telephone, there is conceived a mode of a mutually direct and constant connection through a LAN and through an internet service provider. In the IP telephone, since the users wishing a communication have to be mutually IP connected, a rendez-vous server is prepared on the internet. Such rendez-vous server is provided with a correspondence table indicating a telephone number and an available internet service provider, and informs a user of the call receiving side with a call request and an IP address of a calling user, and a conversation is realized by simultaneous connections of both users through the rendez-vous server. As one of the standards utilizing such rendez-vous server, there is known SIP (Session Initiate Protocol: non-patent literature 2: RFC2543).

Non-patent literature 1: ITU-T recommendation H.323
Non-patent literature 2: RFC2543 (http://www.faqs.org/rfcs/rfc2543.html)

However, most of the prior IP telephone technologies only executes an audio communication on an IP connection.

For example, in a communication by the IP telephone, even though mutual IP addresses are already known, each user cannot access to internet resources available with such IP address, and such technologies cannot be considered to provide a sufficient service to the user.

For example, in such prior technology, even when a user wishes to inform a partner in communication of a WEB page, an FTP server or another internet resource, such information can only be transmitted by voice in the conversation in the IP telephone. An address of such internet resource, usually represented in a format of URL or URI, which often contains a larger number of characters than in a telephone number, and it is difficult and cumbersome to transmit data of such format correctly by voice.

Also there is already available a telephone set, having a mechanism for utilizing an internet resource such as a WEB browser, but the user, even in case of utilizing such terminal, is required to re-enter an address of the internet resource, transmitted by voice as described above, into the WEB browser or the like.

Also the terminal of the user may support the IP telephone and the utilization of the internet resource such as WEB page browsing in different connection methods, and, in such case, the user is required to cut off the IP telephone and executes an IP connection again. In order to achieve a conversation and a utilization of the internet resource at the same time, it is necessary to utilize another equipment such as a PC in addition to the terminal for IP telephone and to utilizing the internet resource by a separate call connection.

DISCLOSURE OF THE INVENTION

An object of the present invention is to solve the aforementioned drawbacks and to securely share an internet resource with a partner in conversation by the IP telephone, in easy and inexpensive manner and not requiring a cumbersome operation, by a communication terminal only, without relying on another equipment.

BRIEF DESCRIPTION OF THE DRAWINGS

FIG. 3 is a schematic view showing a communication environment, constituted of an IP network in which the apparatus shown in FIG. 1 communicates.

FIG. 3 is a schematic view showing another communication environment, constituted of an IP network in which the apparatus shown in FIG. 1 communicates.

FIG. 4 is a schematic view showing another configuration of a communication environment, in which the apparatus shown in FIG. 1 communicates.

FIG. 5 is a schematic view showing a mode (embodiment 1) of an IP telephone communication by the apparatus shown in FIG. 1.

FIG. 6 is a schematic view showing a mode (embodiment 1) of an IP telephone communication by the apparatus shown in FIG. 1.

FIG. 7 is a schematic view showing a mode (embodiment 1) of an IP telephone communication by the apparatus shown in FIG. 1.

FIG. 8 is a schematic view showing a mode (embodiment 1) of an IP telephone communication by the apparatus shown in FIG. 1.

FIG. 23 is a flow chart showing a communication control procedure (embodiment 2) of an IP telephone communication by the apparatus shown in FIG. 1.

FIG. 31 is a schematic view showing a configuration of a SOAP message employed in the embodiment 1.

BEST MODE FOR CARRYING OUT THE INVENTION

In the following, embodiments of the present invention sill be explained with reference to the accompanying drawings.

In the present description (including claims), terms "internet" and "internet resource" are employed to respectively indicate an IP network and data (including a file and a directory list) and other resources accessible through IP on the IP network. Thus a term "internet" employed in the present description has a same meaning as an IP network, and includes not only "Internet" that is widely and publicly utilized, but also a closed IP network such as an intranet within an industry or another organization, and a term "internet resource" indicates data accessible through IP on such network. This is inevitable as a term of an upper concept such as "IP network resource" is not commonly utilized at present.

Figure 1:
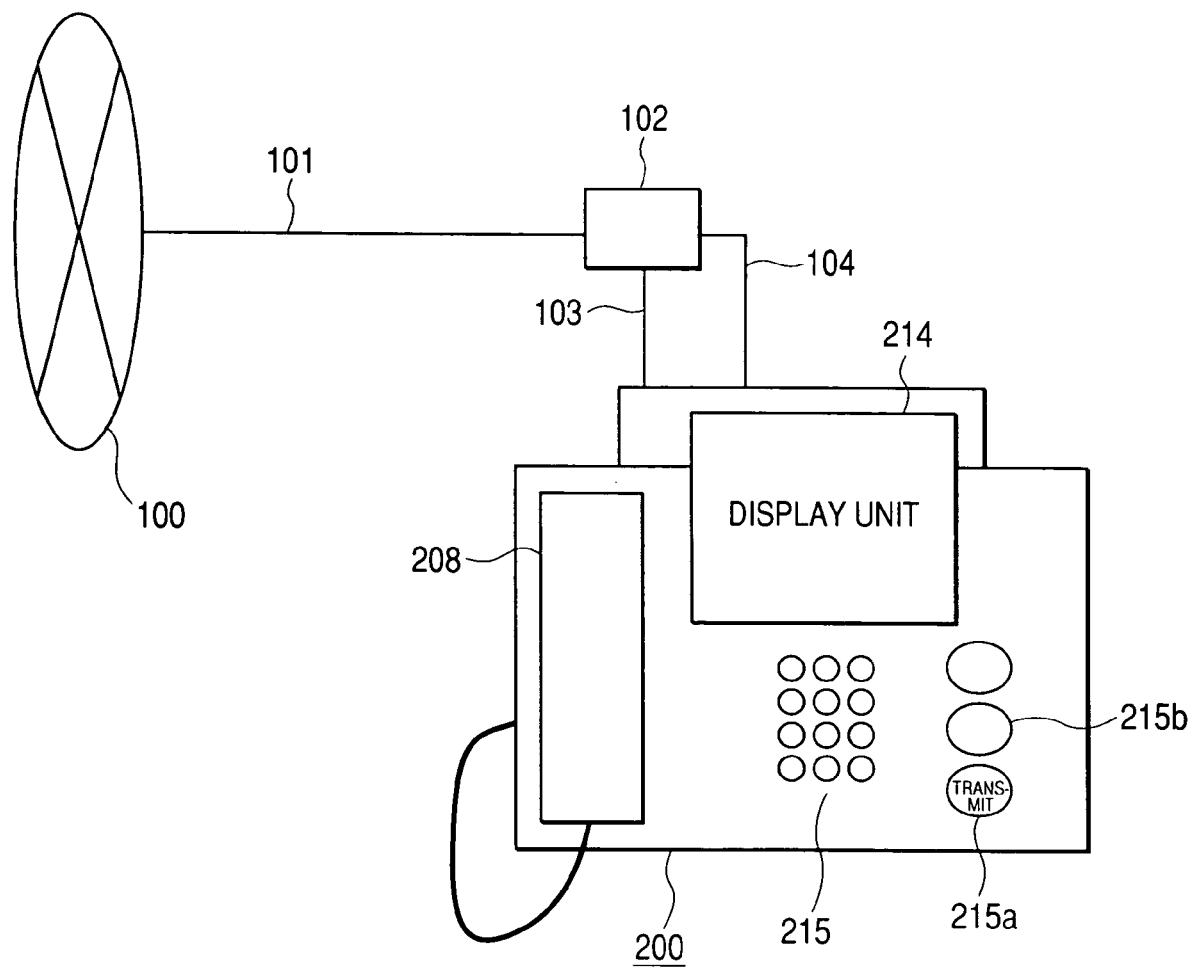
FIG. 1 is a schematic view showing a configuration of a communication terminal embodying the present invention.

FIG. 1 shows a configuration of a communication terminal having an IP telephone function and a WEB browser function embodying the present invention. In FIG. 1, a numeral 100 indicates an IP network (including not only so-called internet but also a closed network such as an intranet, but called hereinafter an internet network except for a case requiring a particular distinction) to which a communication terminal 200 is connected, through a wired circuit 101. In the present embodiment, the wired circuit 101 is assumed as an ADSL. A circuit of the communication terminal shown in FIG. 1 is divided, by a splitter 102, into a band 104 for a PSTN network and a band 103 for an ADSL network, and the communication terminal 200 is capable of an audio communication (such as a conversation and facsimile) by a PSTN connection, and also of an internet connection (utilizing an ADSL connection such as PPPoE) and a utilizsation of resources on the internet (in the present embodiment, at least a WEB page browsing and an E-mail transmission/reception in addition to the IP telephone).

The connection to the IP network 100 need not be executed by ADSL but may be made with an arbitrary line such as an optical fiber line, a CATV line or a wireless line.

The communication terminal 200 in FIG. 1 is provided with a display unit 214 utilizing a liquid crystal display, an operation unit 215 including numeral keys and various function keys, and a handset 208 for input/output of audio communication. The display unit 214 and the operation unit 215 are used not only for a conversation control but also for realizing the WEB browser function.

The operation unit 215 is provided with a resource transfer button 215a and a reload button 215b. The resource transfer button 215a is depressed by a user, during an IP telephone communication between the terminals, for designating a shared utilization of an internet resource. The reload button 215b is used for a forced receiving operation of a mail (or for a reloading operation of a WEB page).

Figure 2:
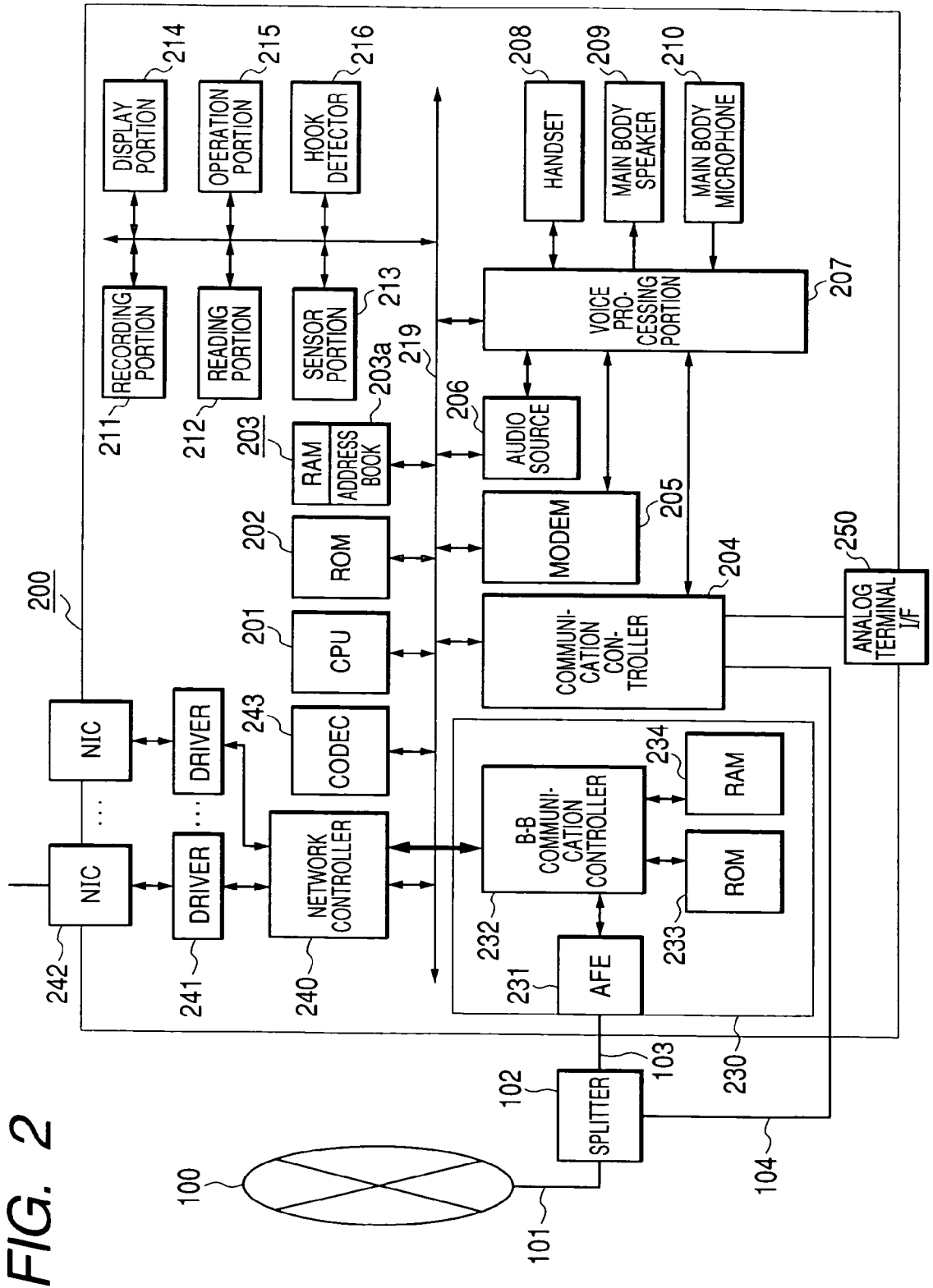
FIG. 2 is a block diagram showing a configuration of a control system of the apparatus shown in FIG. 1.

FIG. 2 shows a configuration of a control system of the communication terminal 200 shown in FIG. 1. The illustrated control system realizes, in the communication terminal 200, an IP telephone function and a WEB browser function, and also a facsimile function (not shown in FIG. 1).

Referring to FIG. 2, a CPU 201 receives signals from various components through a data bus 219, and, in response to the entered signals, controls various components connected to the data bus 21. Thus, the CPU 201 controls the entire equipment according to program stored in a ROM 202, thereby realizing a connection to the network or controlling and executing various protocols. There are naturally included controls for operation, display, reading and recording.

It also executes a control for broadband connection, a control for realizing the IP telephone, a control for executing a WEB access, a browser control for display a WEB page, a control for detecting or extracting an IP address, a file preparation for transmitting data such as URL, and a transmission/reception control.

A ROM 202, a program storing memory, is constituted of a masked ROM or a flash ROM. It may be constituted of a flash ROM or an EEPROM, for data requiring writing and erasure. The ROM 202 stores programs for the entire controls executed by the CPU 201.

A RAM 203 is used as a work area for the processes executed by the CPU 201, to be used in the processes of a WEB browsing including a call process and an E-mail transmission/reception, and as an area for reading, recording and processing audio CODEC data. Different from the ROM, it stores temporary data.

The RAM 203 also has an area backed up with a battery, which is used for set content of various service functions such as time data, and a content registered in an address book (or telephone directory) Among these areas, FIG. 2 shows an area 203a of an address book.

The address book 203a stores a telephone number obtained for example by a number informing in a conversation through an ordinary line, an IP address obtained in an IP telephone communication, a user name and a mail address corresponding to such information, and also a name and a mail address of the user of this equipment, according to a predetermined setting operation.

A memory area for management information similar to the address book may be constituted of a non-volatile memory such as an EEPROM.

The RAM 203 is also utilized as a buffer for a temporary storage of an IP address detected in an IP telephone connection procedure and for a file transmission/reception, and as a reception buffer for displaying a WEB page.

A communication controller 204 is an interface for accommodating an analog (PSTN) public line 104, and is connected, in case of an analog line, to a telephone line (hereinafter called a subscriber line) of a telephone station exchange, and is constituted of a polarity matching circuit formed by a full-wave rectifying circuit of diodes for matching the polarity of the line voltage, a ringer detection circuit connected to the subscriber line of the station exchange for detecting a call signal from the station exchange, a pulse emission circuit for forming a loop in response to an off-hook operation and sending dialing pulses to the station, and a transformer circuit for 2-4 line conversion. Also an interface 250 for an externally connected analog terminal is provided for enabling a connection of an ordinary analog terminal.

A MODEM 205 is constituted of a DSP and an AFE (analog front-end), and realizes a function of a facsimile modem, executing facsimile transmission/reception by G3FAX under the control of the CPU 201. It also has a number display function for analyzing modem data (number display data) and an echo canceller function, and can also realize a speaker phone function.

A sound source part 206 for a holding tone or a call-receiving melody has a sound source data generating function, and data stored in the ROM 202 or the RAM 203 can be reproduced as an analog signal in the sound source part 206 under the control of the CPU 201. It also serves as a sound source for outputting a call progress tone such as pseudo DT, BT or RBT.

An audio processing part 207 executes an audio pass control under the control of the CPU 201 to process a signal from the MODEM 205, and input/output signals from the sound source 206, a handset 208, a speaker 209 and a main body microphone 210 to be explained later, and from the communication controller 204.

A handset 208 (FIG. 1) is used for voice input/output in a conversation on an ordinary line and in the IP telephone. An on/off state of a hook for the handset 208 is detected by a hook detector 216, and the on/off state of the line is controlled according to such hook state.

A speaker 209 is used for outputting a call receiving tone and stored voice data, and for monitoring in a speakerphone conversation. A main body microphone 210 is used for a voice input in case of a speakerphone function.

A recording part 211 is constituted of known recording means such as a thermal printer, a thermal transfer printer, a laser beam printer or an ink jet printer, and, in case of a facsimile recording, decodes MH, MR or MMR encoded digital data and records thus decoded data. Also in case of data printing from the WEB browser, the RAM 203 is used as a reception buffer, then data stored therein of a web page described in a markup language (usually HTML) are converted into display data, and data of an amount displayable on a display screen of the display part 214 are stored in a display buffer in the RAM 203. The WEB browser, upon completing the storage in the display buffer, notifies the recording part 211 of a start of recording.

Upon receiving a notice for completion of storage, the recording part 211 reads out the data from the display buffer, then executes a conversion into display data for each line and transfers the data to the recording part 211. After the transfer, an end of transfer is notified to the browser. Upon receiving a notice for the end of transfer, and in case next display data are present, the browser stores such data in the display buffer and notifies the recording part 211 of such data, and, in case a web page is completed and next display data are absent, it notifies an end of page. The aforementioned operations are repeated to transfer data of a page to the recording part 211 for executing a web printing.

A reading part 212, being provided with original reading means of known type such as a CCD or a contact sensor array, converts analog data read by the reading means into digital data, and outputs, in case of a facsimile communication, such converted digital data after encoding by a known encoding method such as MH, MR or MMR.

A sensor 213 detects presence/absence and size of a transmission original on the reading part 212, and informs the results to the CPU 201. It also detects presence/absence and size of a recording paper in the recording part 211, and informs the results to the CPU 201.

A display 214 (FIG. 1) is constituted of a liquid crystal display such as a color LCD or a monochromatic LCD and is used for displaying various information. The display process in the display 214 includes a display of HTML information received from a server on the internet, a time display, a status display of a line in communication and an error, a monitoring display of other operation states, a display of a character message entered from the operation unit 215 or received, and a display of set state of various service functions of the telephone.

An operation unit 215 (FIG. 1) is constituted of a keyboard including numeral keys and functions keys (or also a pointing device such as a mouse), and constitutes, together with the display 214, a user interface. It accepts all the user operations such as a WEB browser operation, a printing, a calling/call reception/registration operation, and notifies the controller 201 of the content of such operation.

Keys in the operation unit 215 includes, in addition to the aforementioned resource transfer button 215a, following known keys: dialing keys 0-9, *, # for entering a telephone number or a URL and for entering alphabets and symbols by these keys, transmission/reception keys for controlling facsimile transmission/reception, an off-hook key for controlling on/off state of the line, a holding key, and a selection key for a function setting.

A network controller 240 controls various protocols relating to the internet communication. The network controller 240 is indicated as a circuit block for the purpose of convenience, but a basic control thereof is executed by a software in the CPU 201.

The network controller 240 controls input/output of a NIC (network interface card) 242 (that may be provided in plural units as illustrated) through a driver 241 (usually called PHY) utilizing an MII interface, and also controls input/output of an ADSL modem 230.

The NIC 242 may be based, for example, on an interface standard of CSMA/CD (Ethernet (trade name)). The ADSL modem 230 is used for communication by the ADSL. The NIC 242 is employed for a communication with another equipment connected to LAN, but is not essential for the control to be explained later.

In the network communication, the input/output operations among the circuit blocks around the. network controller 240 as shown in FIG. 2 are executed in the following manner.

An IP telephone communication is executed for example by VOIP described in the ITU-T recommendation H.323. The VoIP utilizes various protocols such as IP (Internet Protocol), UDP (User Datagram Protocol), RTP (Transport Protocol For Real-Time Application) and RSVP (Resource Reservation Protocol).

In the IP telephone, an audio signal entered from the handset 208 is processed by the audio processing part 207, then subjected to a codec audio process by the CODEC 243, and transmitted or received as digital data, through an encoding/decoding by a code format such as ITU-T recommendation G.711 or G.729. Also for specifying an IP address of the partner of communication, a protocol such as SIP, ITU-T recommendation H.323 or MCGP.

In the present embodiment, a communication is made with the internet and also with a LAN through the NIC 242, thus involving a forwarding of a packet between different network segments. Therefore the network controller 240 is preferably provided with a rooter function of transferring a packet between the different network segments, and an NAT function for executing a conversion of address/port number.

The NAT function is to mutually convert a private IP address and an original global IP address usable for the Internet access, thereby enabling a node, having only a local IP address, to tranmissively access to the Internet.

Also there is provided, for an equipment connected to the LAN, a DHCP for dynamically assign an IP address at the start-up and recovering the IP address at the ending.

A connection of the ADSL modem 230 with the ADSL network utilizes a protocol such as PPPoE. Also in a verification at the connection with the ADSL network, there is employed a protocol such as PAP/CHAP, and the network controller 240 is required to be provided with such verification protocol.

The network controller 240 and the ADSL modem 230 are connected through an interface such as UTOPIA.

The ADSL modem 230 is a communication controller for use in the internet connection, to which a public line separated by a splitter is connected. The ADSL modem 230 is constituted of an AFE 231 and a BB-communication part 232. The ADSL modem 230 is connected to a ROM 233 for storing a program for the ADSL modem and a RAM 234 as a data work area.

FIG. 3 schematically show a configuration of an IP network. As shown therein, the communication terminal 200 of the present embodiment is connected by a public line 101 to the IP network 100 and communicates with a partner communication terminal 220.

FIG. 3 assumes a state where the communication terminal (A) 200 and the communication terminal (B) 220 are connected to a same internet service provider (ISP).

On the IP network 100, there are provided a SIP server 110 to be used for call connection of the IP telephone, a location server 111 for managing a telephone number/IP address table, a DNS server 112 for managing an IP address-domain/host name table, and a WEB server 113.

FIG. 4 shows a configuration similar to that shown in FIG. 3 but is different in that the IP network 100 is connected through different internet service providers (ISP: 151, 153). The internet connection may assume the state shown in FIG. 3 or shown in FIG. 4, depending on the partner of communication. In FIG. 4, the communication terminal (A) 200 is connected through the ISP (A) 151 and the communication terminal (B) 220 is connected through the ISP (B) 153.

In the configuration shown in FIG. 4, an ISP-GW 152 for connecting different service providers serves as a gateway between the different ISPs, thereby enabling a communication between the communication terminals 200, 220. The ISP-GW 152 is not necessarily constituted of a single equipment but may also be constituted of plural gateway devices.

The IP telephone communication of the present embodiment employs a SIP system. Assuming that the communication terminal 200 is a calling side and communication terminal 220 is a receiving side, in the SIP system, the communication terminal 200 of the calling side sends a calling message to the SIP server 110, thus requesting a connection with the partner terminal 220. The SIP server 110 enquires an IP address of the partner terminal 220 to the location server 111, and the identified IP address is used for making an IP connection between the communication terminals 200 and 220.

In the following there will be explained, in the aforementioned configuration, a communication control for sharing an internet resource between the communication terminals in the course of a conversation by the IP telephone.

Embodiment 1

FIGS. 5 to 9 illustrate a communication sequence of the IP telephone in the present embodiment 1. In the IP telephone communication shown in FIGS. 5-9, a call connection is made from a communication terminal A to a communication terminal B, constructed as shown in FIGS. 1 and 2. Also in the present embodiment, the communication terminal A executes a WEB browsing and transfers URL data thereof from the communication terminal A to the communication terminal B during the IP telephone communication, thereby enabling the communication terminals (hereinafter also simply called terminals) A and B to share same WEB information.

A SIP server 110, a location server 111, a DNS server 112, and a WEB server 113 shown in FIGS. 5-9 are same as those shown in FIG. 3 or 4.

The communication sequence shown in FIGS. 5-9 is realized by an execution of a communication control program by the CPU 1 shown in FIG. 1. The communication control program of the CPU 1 is stored for example in the ROM 202 (similar also in following other embodiments). Steps of the communication sequence shown in FIGS. 5-9 are indicated by symbols starting from S501. In the communication shown in FIGS. 5-9, it is assumed that an ADSL connection is already established and the terminals A and B are connected with the IP network.

At first, in the terminal A, the user executes a dialing operation on the operation unit 215 (S510 in FIG. 5). Thus, a connection with the SIP server is made by an INVITE message (S502).

The SIP server 110 requests an IP address to the location server 111 (S503), which searches an IP address corresponding to the designated telephone number and transmits the obtained IP address to the SIP server 110 (S504).

Then the SIP server, based on the received IP address of the partner terminal, sends an INVITE request to the terminal B, thus requesting a connection (S506). In this state, the terminal B acquires the IP address of the calling terminal A.

In response to the INVITE request from the SIP server, the terminal B enters a call receiving operation (S507), and returns a ringing signal, indicating a calling operation, to the SIP server (S508), which transmits the ringing signal to the terminal A (S509).

When the terminal B responds, an OK information indicating the completion of connection is transmitted to the SIP server 110 (S511), which transmits the OK information to the terminal A whereby the terminal A acquires the IP address of the partner terminal B (S512).

Thereafter, an audio packet transmission/reception is enabled by the IP connection formed between the terminals A and B (S513), whereby the terminals A and B enter a conversation state (S514).

A communication by VoIP is generally executed on an UDP base including a message in consideration of the real-time property, but a connection by TCP base can also be selected.

The terminal A, being connected with the IP network, can utilize resources on the internet, such as a WEB page or mail transmission/reception.

It is quite conceivable, in the course of conversation between the terminals A and B, that an internet resource, such as a specified WEB page, is talked between the terminals. As explained in the foregoing, a URL of a WEB page has been transmitted by voice in the IP telephone in the prior technologies, but the present embodiment shows an example of transmitting a URL of a WEB page from the terminal A to B and enabling the terminal B to observe such page.

In the terminal A, a WEB browser is activated (S515) and a URL is entered from the operation unit 215, whereby the terminal A enquires an address of the WEB server 113, designated by the URL, to the DNS server 112 (S516). In response, the DNS server 112 searches the address of the WEB server 113 based on the URL (S517) and returns a result of search to the terminal A (S518(.

Then, based on the IP address obtained from the DNS server 112, the terminal A accesses to the WEB server 113. The terminal A sends a SYN packet (S519), receives a SYN-ACK packet from the WEB server 113 (S520), and sends an ACK packet to SYN (S521).

When a synchronization is thus made, the terminal A request a WEB page to the WEB server (S522 in FIG. 6) and obtains data of a WEB page from the WEB server 113 (S523). The terminal A, having received the data of the WEB page, causes the browser to display the WEB page (S524).

The terminal A transfers the URL, in order that the displayed WEB page can also be displayed on the partner terminal B. In case the content of the WEB page is to be observed by the user of the terminal B, the user of the terminal A depresses the resource transfer button 215a of the operation unit 215.

For activating the shared utilization of the resource, in addition to the operation of the aforementioned resource transfer button 215a, there can also be conceived an operation of a suitable button such as a "URL transfer" button prepared on a tool bar of the display 214 or on a console prepared on one of the windows of the WEB browser (also including an operation with a pointing device), and the configuration may be so constructed as to accept any one or all of these operations.

In the present embodiment, in order to transfer the URL information from the terminal A to B by FTP (file transfer protocol), a file describing the URL is prepared (S525). Such URL-containing file is described by SOAP (Simple Object Access Protocol: RFC3288) which an upper protocol of FTP, in order that the receiving side can activate the browser.

The FTP utilizes two connections, namely a controlling connection and a connection for data (file) transfer.

At first, the terminal A, based on the IP address of the terminal B obtained from the location server, executes a synchronization of the control port with the terminal B. Then the terminal A transmits a SY packet (S526), then receives an NSYN•ACK packet (S527) and sends an ACK packet to the SYN of the partner (S528). The terminal B sends a ready signal, indicating that the FTP communication can be started, to the terminal A (S529).

The terminal A request a log-in to the terminal B (S530), which permits the log-in of the terminal A (S531).

For the verification of the FTP log-in, since the IP connection is already established, so-called anonymous FTP method employing "anonymous" for the user name and the mail address for the password is considered sufficient for most cases. For example, even the anonymous FTP method can ensure considerable security by accepting an FTP log-in only from the partner in communication by the IP telephone.

It is however conceivable to improve the security by exchanging information specific to the mutual terminals. For example, in the configuration shown in FIG. 2, since an address book 203a is provided, there may be adopted a procedure in which the terminal A sends a mail address, then the terminal B judges whether the mail address transmitted from the terminal A is contained in the address book 203a and, if contained, permits the FTP log-in of the terminal A. Such FTP log-in sequence can be automatically executed without involving a user input, and the aforementioned verification utilizing the information of the address book can inhibit an FTP log-in from an unidentified party without involving a cumbersome operation, thereby ensuring the security.

Then the terminal A prepares a port for URL data transfer in addition to the control port (S532), and transfer the URL data to the terminal B utilizing such data transfer port (S535 in FIG. 7). At first the terminal A executes a synchronization of the data transfer port with the terminal B (S533, S534). Then the terminal A transmits the file, describing URL, to the terminal B through the data transfer port (S536). The terminal B, having received the file, returns ACK to the data transfer port of the terminal A, thereby informing the completion of reception (S537).

When the transfer of the URL data is completed, the terminal A releases the data transfer port (S538). The terminal A sends, from the data transfer port, a port release request to the terminal B (S539), which returns ACK to the data transfer port of the terminal A (S540). In response, the terminal A completes the release of the URL data transfer port, thereby terminating the URL data transfer (S541). Then the terminal A notifies the terminal B of the end of FTP (S542) and receives ACK from the terminal B (S543).

The terminal B, having received the file described by SOAP (S544), analyzes the received file of the URL data (S545). FIG. 31 shows an example of the URL data described by SOAP. SOAP is a protocol for information transmission of XML base, and a SOAP message has a structure constituted of an envelope, a header and a body. The present embodiment is characterized in an underlined portion in FIG. 31, namely in the body of the SOAP message. Other parts in FIG. 31 are same as those in the prior structure. The characteristic portion (underlined portion) in FIG. 31 has a following structure:

<BrowsURL>http://www.canon.co.jp/ezumi.html</BrowsURL>

This data type <BrowsURL> means that the apparatus is to activate a browser and to browse an address of the designated WWW server. In this manner, each data type used in the SOAP service is defined in an applet downloaded in advance by the terminal, and the applet, upon receiving the SOAP message, can recognize, by an identifier of the header of the message, that the message is a service information packet.

As the SOAP description can designate a handling method for the received URL data file, the terminal B activate the browser as instructed by the SOAP (S546 in FIG. 8), and enters the URL received from the terminal A into the browser. The terminal B enquires an address of the WEB server 113, designated by the URL, to the DNS server 112 (S547). In response, the DNS server 112 searches the address of the WEB server 113 based on the URL (S548), and returns a result of search to the terminal B (S549).

Based on the IP address obtained from the DNS server 112, the terminal B accesses to the WEB server 113. At first the terminal B sends a SYN packet to the WEB server 113 (S550), then receives a SYN-ACK packet from the WEB server 113 (S551), and sends an ACK packet in response to the SYN-ACK (S552). When the synchronization is attained, the terminal B requests a WEB page to the WEB server 113 (S553), and obtained data of a WEB page from the WEB server 113 (S554). The terminal B, having received the data of the WEB page, causes the browser to display the WEB page (S555).

The terminal A, having completed the browsing by the WEB browser, terminates the browser (S556 in FIG. 9), then transmits a cut-off to the WEB server 113 (S557), and terminates the browser (S559). Also the terminal B, having completed the browsing of the browser, terminates the browser (S559). It transmits a cut-off to the WEB server 113 (S560), and terminates the browser (S561).

Figure 9:
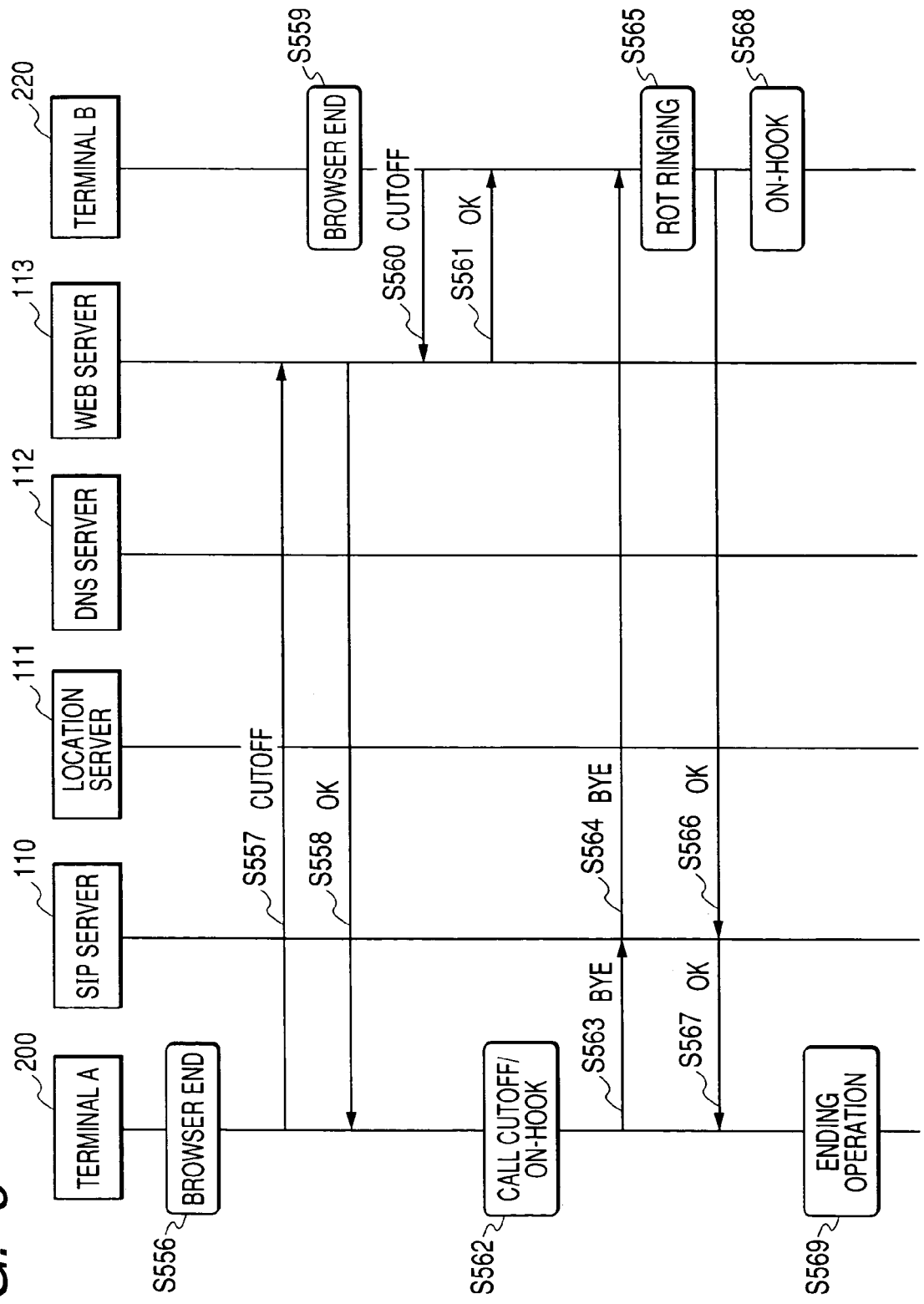
FIG. 9 is a schematic view showing a mode (embodiment 1) of an IP telephone communication by the apparatus shown in FIG. 1.

An ending of the conversation (S562) is executed from the terminal A in the case shown in FIG. 9. Based on the VoIP and SIP procedure, BYe and OK messages are exchanged through the SIP server 110 (S563, S564, S566, S567), and the terminal B thereby executes a ROT ringing (S565) and an on-hook operation (S568), whereby the conversation sequence of the IP telephone is terminated (S569).

The above-described URL data transmitting operation can be executed by any number of times during the conversation. In such case, there may be adopted a system in which the resource sharing button 215a is operated whenever the internet resource changes on the terminal A (for example a re-display of the WEB page under display or a jump to another WEB page), or a system in which the URL data are automatically transmitted from the terminal A to B whenever the internet resource changes on the terminal A (for example a re-display of the WEB page under display or a jump to another WEB page), until the conversation is terminated (or another explicit operation is executed).

Figure 10:
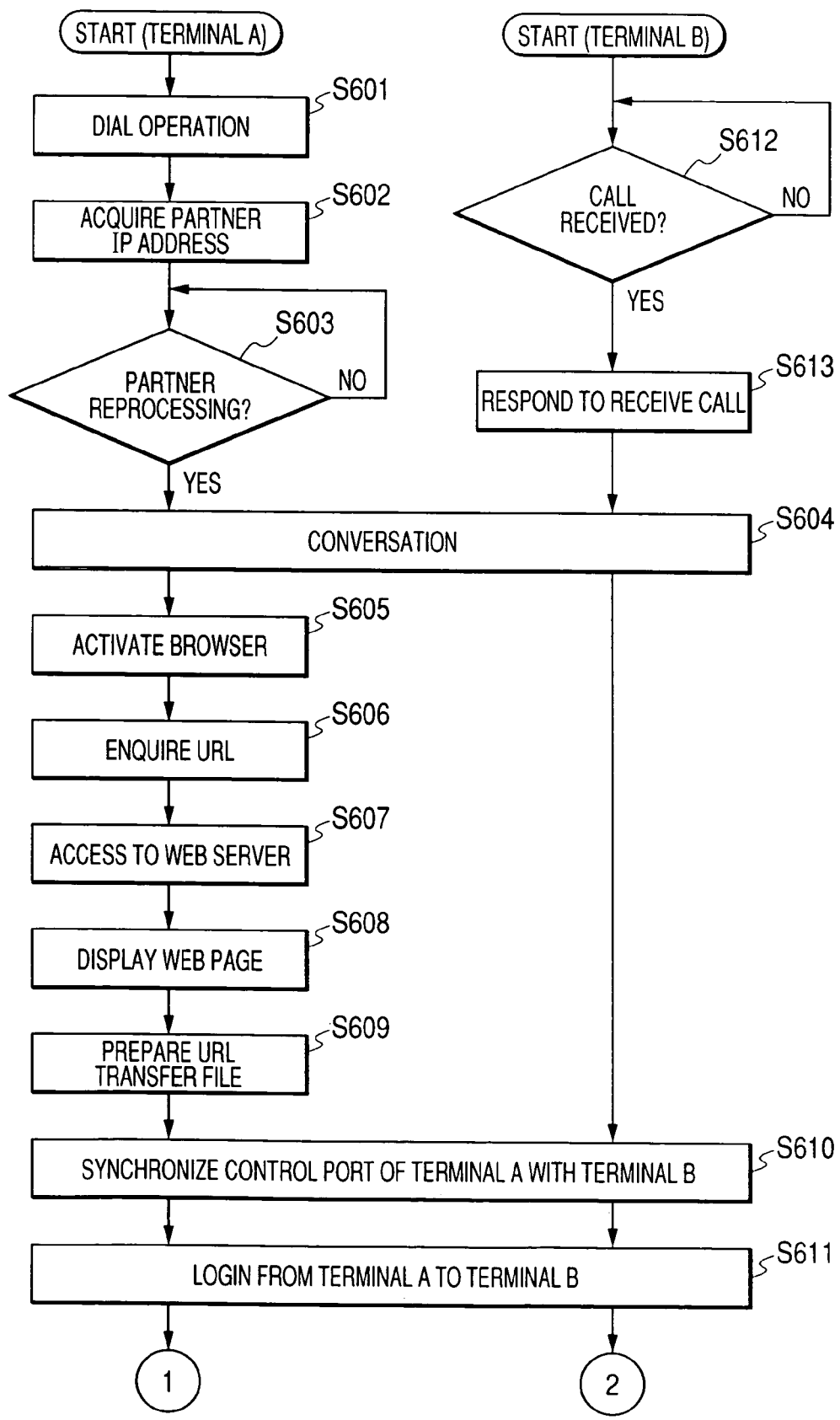
FIG. 10 is a flow chart showing a communication control procedure (embodiment 1) of an IP telephone communication by the apparatus shown in FIG. 1.
Figure 11:
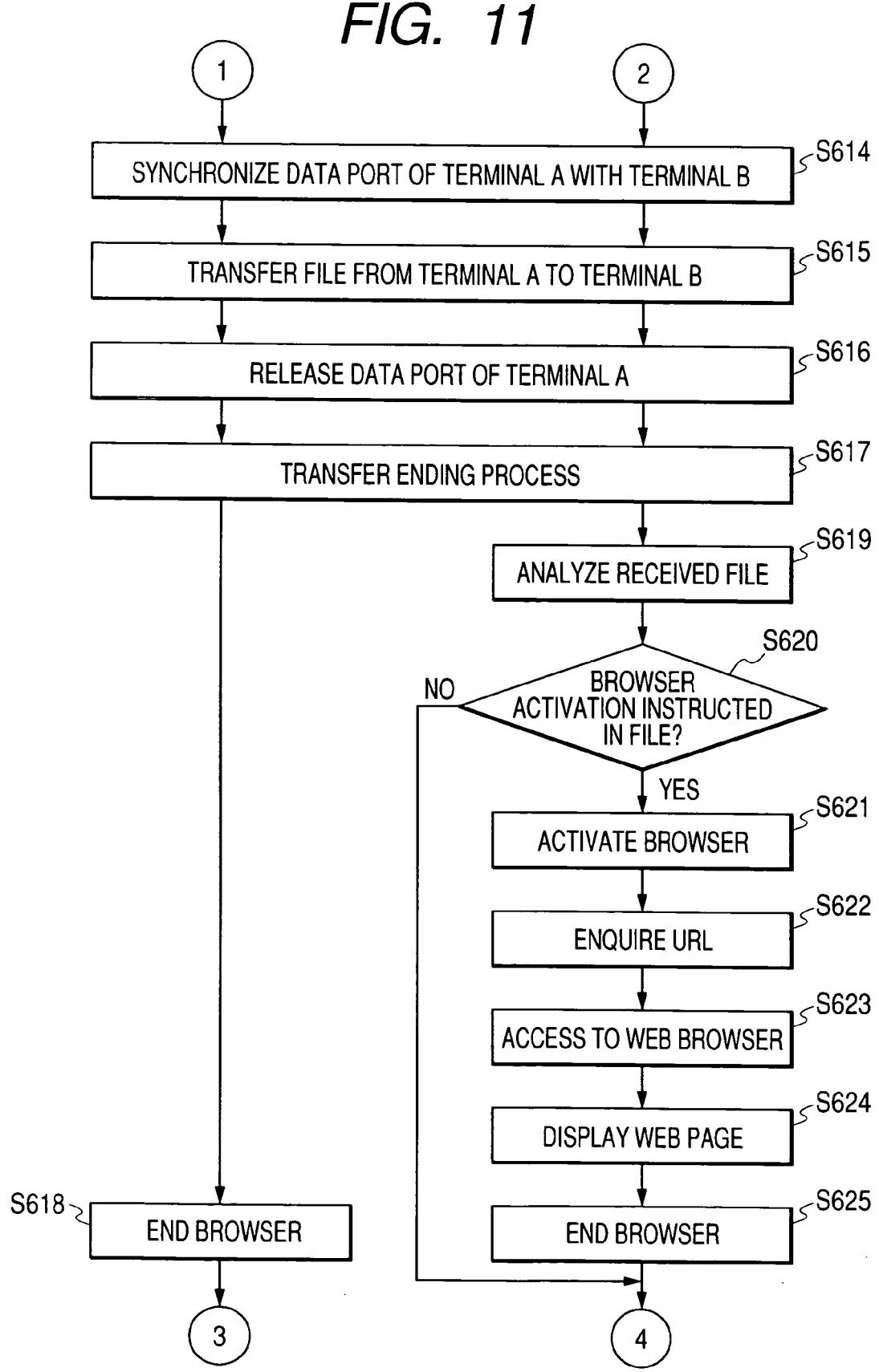
FIG. 11 is a flow chart showing a communication control procedure (embodiment 1) of an IP telephone communication by the apparatus shown in FIG. 1.
Figure 12:
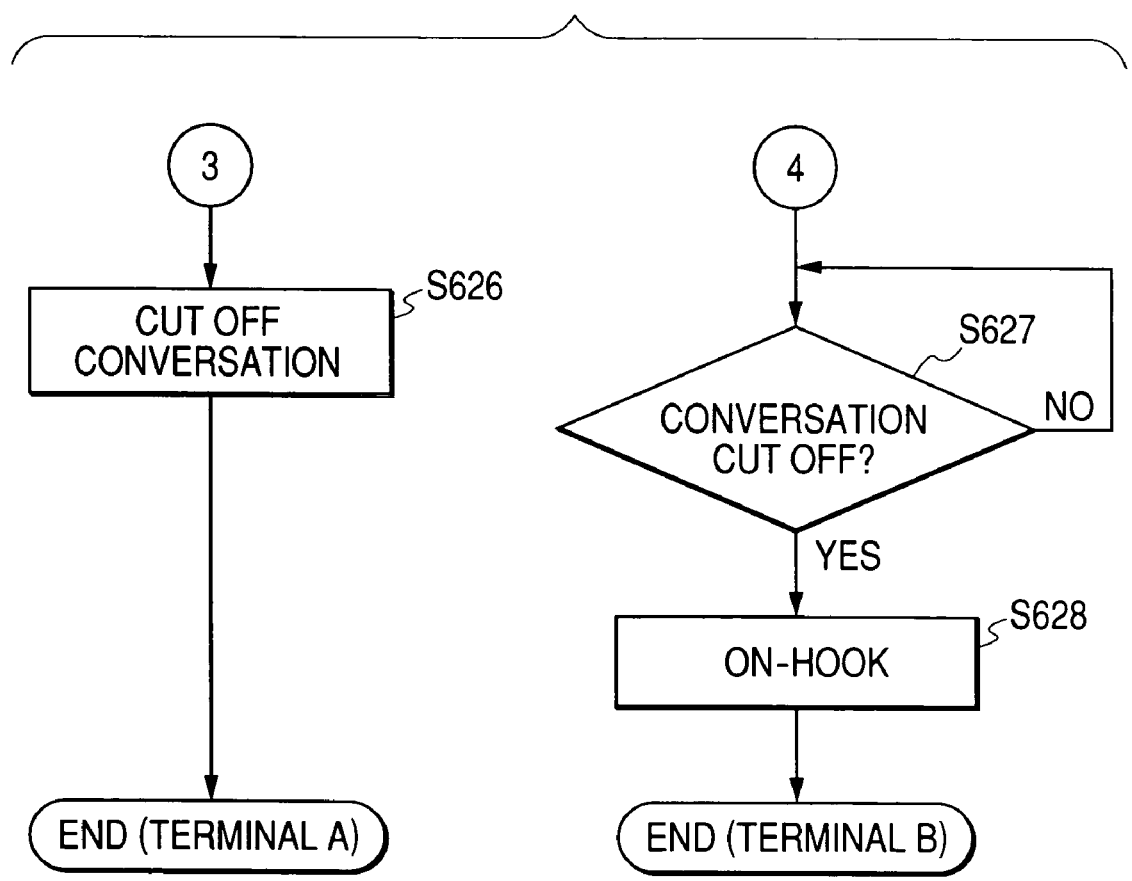
FIG. 12 is a flow chart showing a communication control procedure (embodiment 1) of an IP telephone communication by the apparatus shown in FIG. 1.

The aforementioned IP telephone communication is outlined in flow charts in FIGS. 10-12. The procedure shown in FIGS. 10-12 corresponds to the communication sequence shown in FIGS. 5-9, and is realized, as explained above, by an execution of the communication control program by the CPU 201 shown in FIG. 1. The communication control program of the CPU 1 is stored in the ROM 202. Steps in FIGS. 10-12 are indicated by symbols starting from S601.

At first the terminal A executes a calling operation of the IP telephone. A dialing operation of the terminal A (S601 in FIG. 10) executes a call connection process of the IP telephone utilizing the SIP server 110. As explained before, the SIP server 110 calls the partner terminal and returns an IP address corresponding to the telephone number of the partner terminal to the terminal A (S602). The terminal A enters a calling state and awaits a response of the partner terminal (S603). When the partner terminal responds, a conversation state is entered (S604).

The terminal A activates a browser for displaying the WEB page (S605). When a URL is entered in the browser of the terminal A, the terminal A enquires an address of the WEB server 113 designated by the URL to the DNS server 112, and receives a result of search (S606). Based on the IP address obtained from the DNS server 112, the terminal A accesses to the WEB server 113, thus receives data of a WEB page (S607) and causes the browser to display a WEB page (S608).

The terminal A transfers the URL in order that the displayed WEB page is also displayed on the partner terminal. For transferring the URL by FTP, the terminal A prepares a file describing the URL (S609). The file is described in SOAP, which an upper protocol of FTP, in order that the receiving side can activate the browser.

Based on the IP address of the partner terminal obtained from the location server, the terminal A executes a synchronization of the control port with the partner terminal (S610). When the synchronization with the partner terminal is achieved, a log-in is executed to the partner terminal (S611).

The terminal A prepares a URL transfer port in addition to the control port, and synchronizes the data transfer port with the partner terminal (S614 in FIG. 11). The terminal A sends the URL describing file to the partner terminal utilizing the data transfer port (S615). When the transfer of the URL data is completed, the terminal A releases the port for URL data transfer (S616). The terminal A notifies the partner terminal of the end of FTP and executes a transfer ending process (S617).

The terminal A having completed the browsing by the WEB browser terminates the browser (S618). The conversation is cut off when the conversation with the partner terminal is completed (S626 in FIG. 12).

On the other hand, a process on the terminal B is executed in the following manner.

In a stand-by state, the terminal B monitors whether an incoming call is present (S612 in FIG. 10). When an incoming call is detected, the terminal B responds to the incoming call and enters a conversation state (S604).

When a synchronization is requested from the partner terminal, the terminal B in response executes a synchronization (S610). When an (FTP) log-in is requested from the partner terminal, it permits an (FTP) log-in and enters a data transfer waiting state (S611). The terminal B executes a synchronization of the data transfer port with the partner terminal (S614 in FIG. 11), and receives a URL describing file from the data transfer port of the partner terminal (615).

When the transfer of the URL data is completed, it releases the data transfer port of the partner terminal (S616), also receives an end of FTP from the partner terminal, and executes a transfer ending process (S617).

The terminal B, having received the file, analyzes the received file (S619). In case the file is described in SOAP and contains a URL and an instruction for activating a browser (S620), the terminal B activates a browser for displaying a WEB page (S621). When the URL received from the partner terminal is entered in the browser, the terminal B enquires an address of a WEB server 113 designated by the URL to the DNS server 112 and receives a result of search (S622). The terminal B accesses to the WEB server 113 based on the IP address obtained from the DNS server 112 to receive data of a WEB page, and causes the browser to display the WEB page (S624).

The terminal B, having completed the browsing, terminates the browser (S625). It also monitors the communication state with the partner (S627 in FIG. 12), and terminates the conversation upon detecting a cut-off of the communication by the partner (S628).

In the foregoing, there has been explained an example of transmitting the URL data from the calling terminal A to the terminal B, but the URL transmission can be executed irrespective of the calling side, and it is naturally possible, in a similar manner as described above, to transmit the URL from the terminal B to the terminal A for browsing therein. Also in the foregoing, there has been explained, in case of transmitting the URL data from the terminal A to B, an example in which the terminal A executes an FTP log-in to the terminal B, namely the terminal B serves as an FTP server to which the terminal A transmits the URL data (S536 ub ¥FIG. 7: utilizing an FTP command such as STOR or STOU). However, at the URL data transmission, the FTP log-in direction and the transmitting/receiving direction (whether to utilizing a transmitting command STOR or STOU or a receiving command RETR) can be arbitrarily selected and suitably changed.

Figure 13:
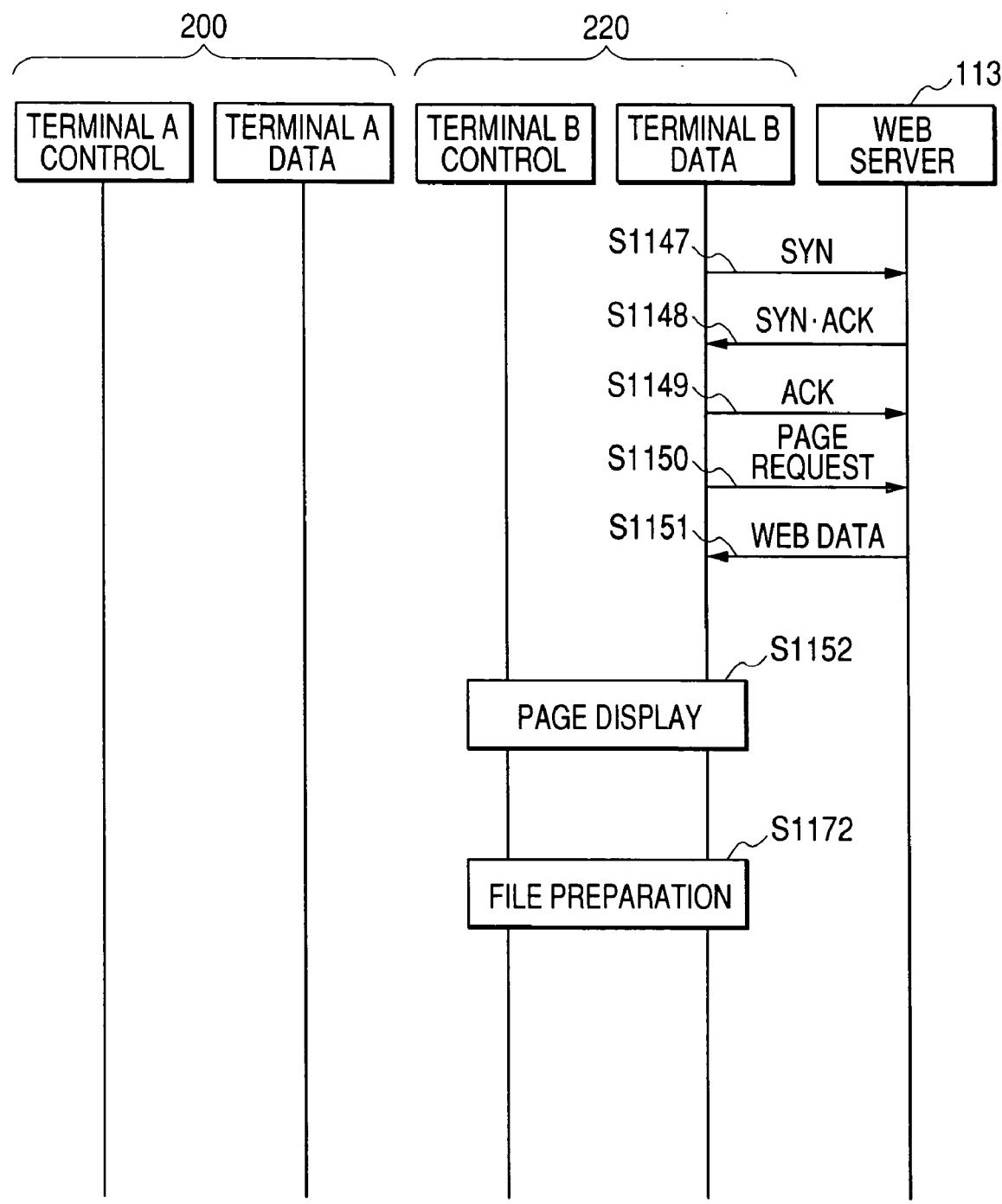
FIG. 13 is a schematic view showing a mode (embodiment 1) of a different FTP communication by the apparatus shown in FIG. 1.
Figure 14:
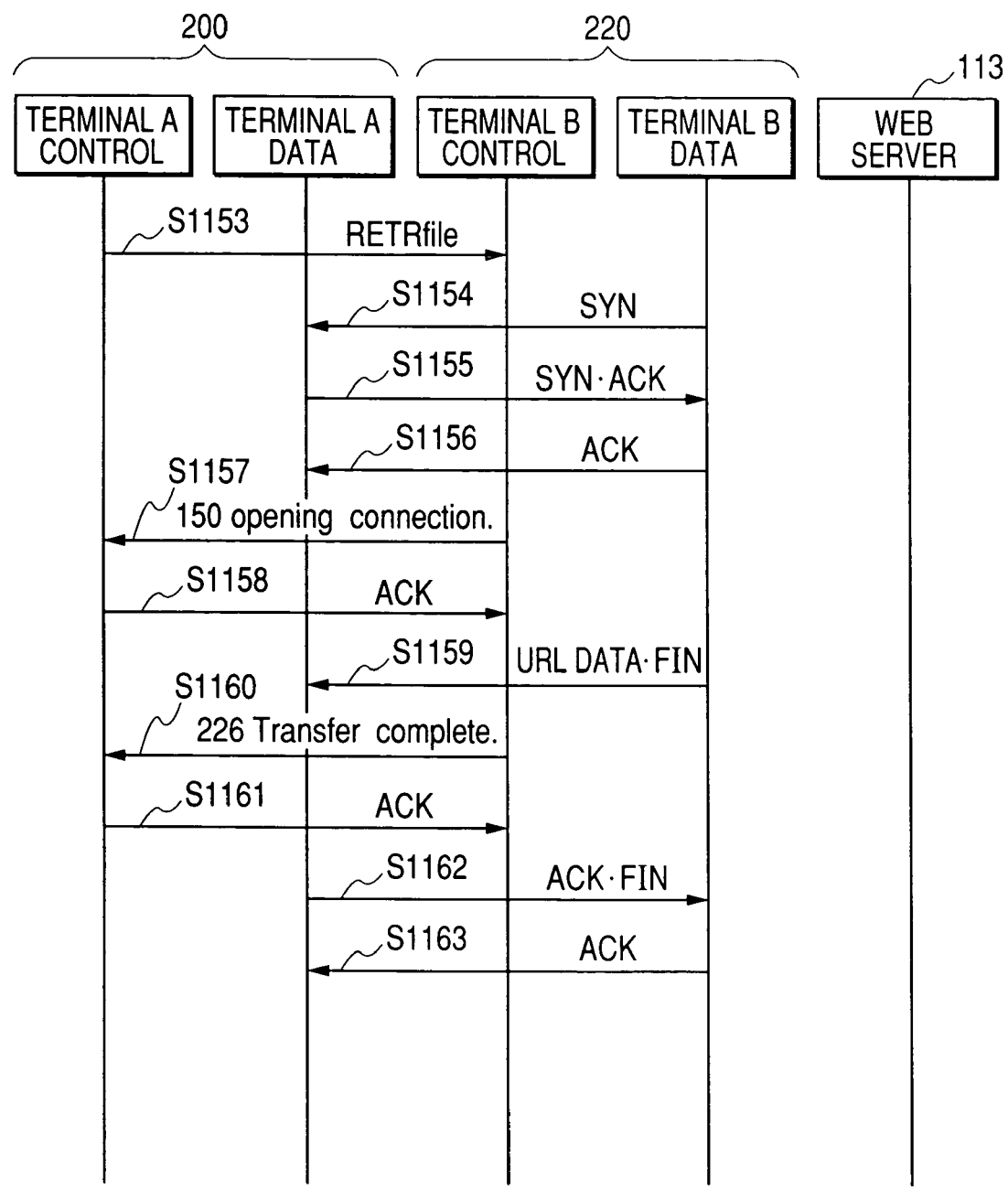
FIG. 14 is a schematic view showing a mode (embodiment 1) of an FTP communication by the apparatus shown in FIG. 1.
Figure 15:
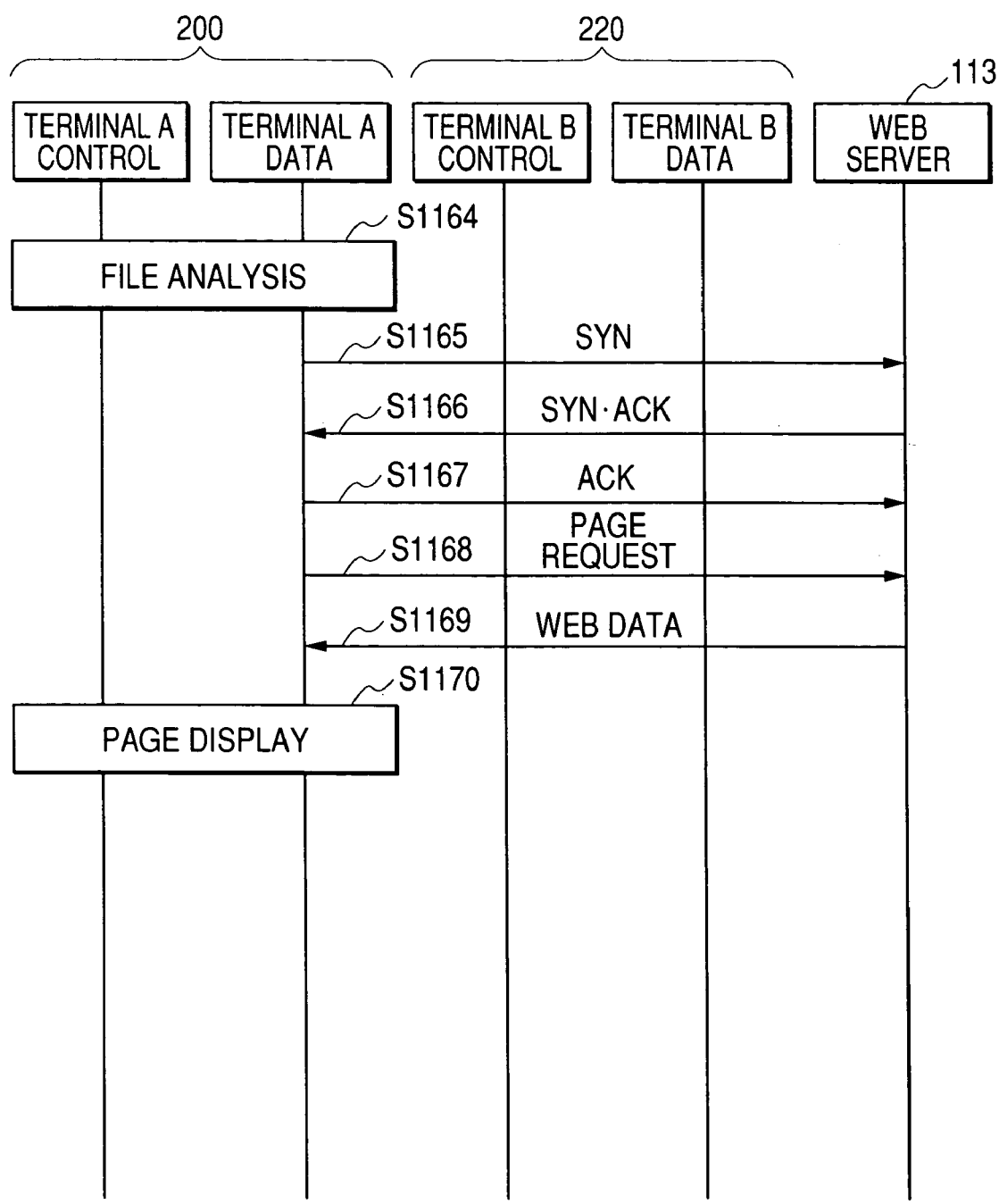
FIG. 15 is a schematic view showing a mode (embodiment 1) of an FTP communication by the apparatus shown in FIG. 1.

An example of such case is shown in FIGS. 13-15, which shows a case of transmitting the URL data from the terminal B to A and executing the browsing in the terminal A, but it is assumed that the terminal A executes a log-in to the terminal B functioning as the FTP server as in the foregoing, and the URL data transmission employs an FTP receiving command RETR.

In FIGS. 13-15, the FTP control port and the data port of the terminal A are represented by 200, and those of the terminal B are represented by 220. In FIGS. 13-15, it is assumed that a conversation state is already established by an IP telephone call sequence similar to that shown in FIG. 5. It is also assumed that an FTP log-in verification similar to that shown in FIG. 6 is already completed.

FIG. 13 shows a mode where the terminal B browses a WEB page. More specifically the terminal B obtains WEB data by an ordinary HTTP protocol (S1147-S1151), executes a rendering of the page and a display on the display part 214 (S1152). Then, a URL data file described in a SOAP format is prepared as described above (S1172). Such URL data file may be unconditionally prepared when the WEB page is downloaded, regardless whether the resource sharing is executed. As the URL data file is formed merely of a character train of one or two lines, such operation does not give a significant load on the system.

Thereafter, when the user of the terminal A, in the course of the conversation, wishes to browse a WEB page same as that observed by the user of the terminal B, the user of the terminal A executes a predetermined operation for transfer (an operation of the resource transfer button 215a or an equivalent operation) by the operation unit 215. Thus, the prepared URL data file is FTP transferred as shown in FIG. 14 (S1153-S1163). In this case, an FTP command RETR is employed for obtaining the file from the terminal B as the FTP server (S1153).

Thereafter, the URL file is analyzed in the terminal A as shown in FIG. 15 (S1164). Then the terminal A downloads the WEB data from the WEB server 113 based on SOAP (S1165-S1169) and displays it on the display part 214 (S1170).

As described in the foregoing, the embodiment 1 can provide means for sharing an internet resource among the terminals in communication by the IP telephone. In the embodiment 1, the internet resource is a WEB page (or URL thereof), and, by transmitting a data file describing the URL of the WEB page (URL file) by the FTP protocol from the first terminal (A) to the second terminal (B), the second terminal (B) can browse a WEB page same as that observed on the first terminal (A).

In this manner, the terminals in communication by the IP telephone can utilize a same internet resource (utilization being a display in the aforementioned embodiment, but the method of utilization of the internet resource being not restricted to a display, as in a case of renewal of a firmware to be explained in the following), and it is rendered possible, in contrast to a prior transmission of the internet resource by voice in the IP telephone conversation, to mutually transmit the information of the internet resource correctly thereby securely enabling the utilization of a same internet resource, and to improve the operability as a re-entry operation for data such as URL can be dispensed with.

Also in the receiving side of the URL data, a browser for reviewing the internet resource indicated by such URL can be automatically activated by the SOAP protocol and no cumbersome operations are required for this purpose.

In the foregoing, a WEB page is considered as the internet resource to be shared by the first and second terminals in the IP telephone communication, but the first and second terminals can share any internet resource that can be represented by URL (or URI) or an equivalent information format (as long as FTP transmittable) indicating the location of the internet resource. Even within the URL format, the internet resource sharable by the invention is numerous, including an FTP directory, a file therein, a Gopher page, and various services providing an audio or video (still/moving image) stream.

The internet resource sharing technology of the invention is widely applicable to the sharing information for business and amusement. In particular, it is considered useful, for the commercialization of the communication terminal of the invention, to utilize the technology for updating a firmware of the communication terminal of the invention. For example, in case a user of the communication terminal of the invention finds a trouble, and, upon consulting with a product support division of the manufacturer by IP telephone, reaches a conclusion that a firmware in the communication terminal has to be renewed, a support personnel of the manufacturer can directly transmit a URL of the firmware (for example a file obtainable by HTTP or FTP and usually provided from an HTTP server or an FTP server operated by the manufacturer) thereby executing an updating of the firmware. Utilizing SOAP or an equivalent protocol, the file handling at the receiving side, such as a firmware updating (which is different from the aforementioned WEB display), can be arbitrarily designated, so that such firmware updating of the communication terminal can be achieved without requiring any user operation.

Embodiment 2

In the foregoing there has been explained a configuration of transmitting/receiving the URL information utilizing the FTP protocol in order to share the internet resource among the terminals in conversation by the IP telephone, but an E-mail protocol (SMTP) may be employed for transmitting and receiving the URL information.

Also in the present embodiment, the communication terminal has a configuration same as that shown in FIGS. 1 and 2, and, in the following sequence and flow charts, there will be explained a communication between a communication terminal A (200) and a communication terminal B (220) as in the embodiment 1 (same also in the following embodiments).

Figure 16:
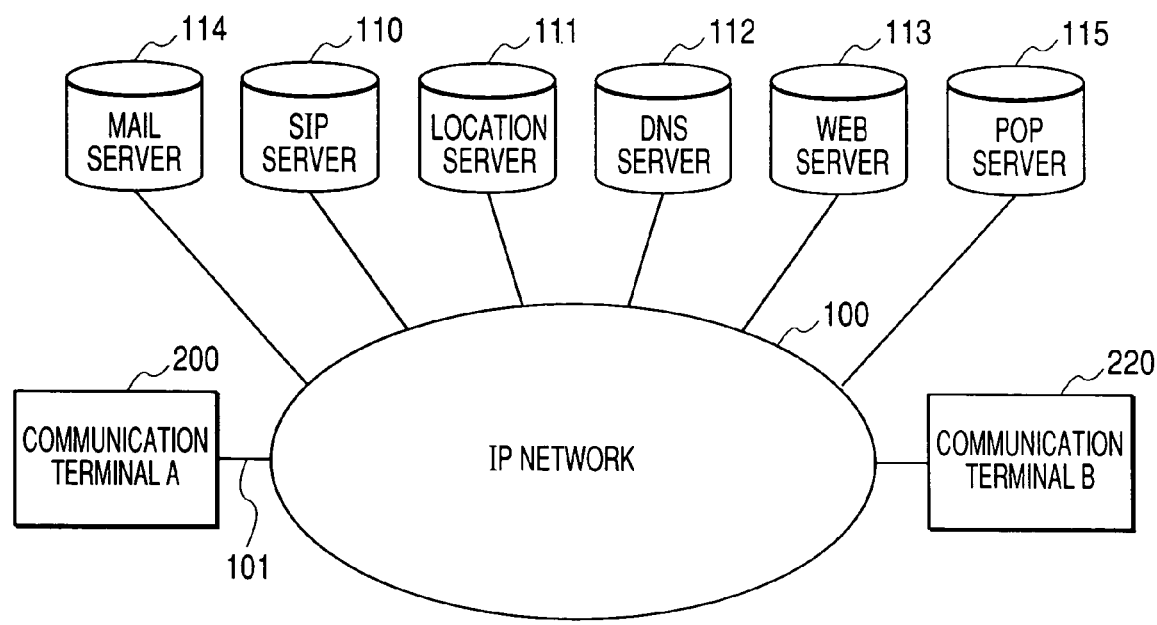
FIG. 16 is a schematic view showing another configuration (embodiment 2) of a communication environment, in which the apparatus shown in FIG. 1 communicates.

In the present embodiment, in order to execute the mail transmission/reception, the IP network 100 is required to have a mail server 114 and a POP server 115 as shown in FIG. 16. Services of the mail server 114 and the POP server 115 are usually provided by an ISP, and need not be provided specifically for executing the present embodiment. FIG. 16 shows one each of the mail server 114 and the POP server 115, but the communication terminals A, B (200, 220) may utilize mutually different mail servers 114 and POP servers 115, for example because they have different ISPs.

The mail server 114 is used for accepting a mail transmission from the user by an SMTP protocol, and delivering the mail between the servers, and the POP server 115 is used (principally for a user of dial-up connection) for delivering an incoming mail to an end user. The deliver to the user executed by the POP server 115 may be realized, in addition to POP, also by APOP or IMAP. Also the mail server 114 may employ another E-mail protocol substituting the SMTP, but SMTP is the most popular E-mail protocol.

Figure 20:
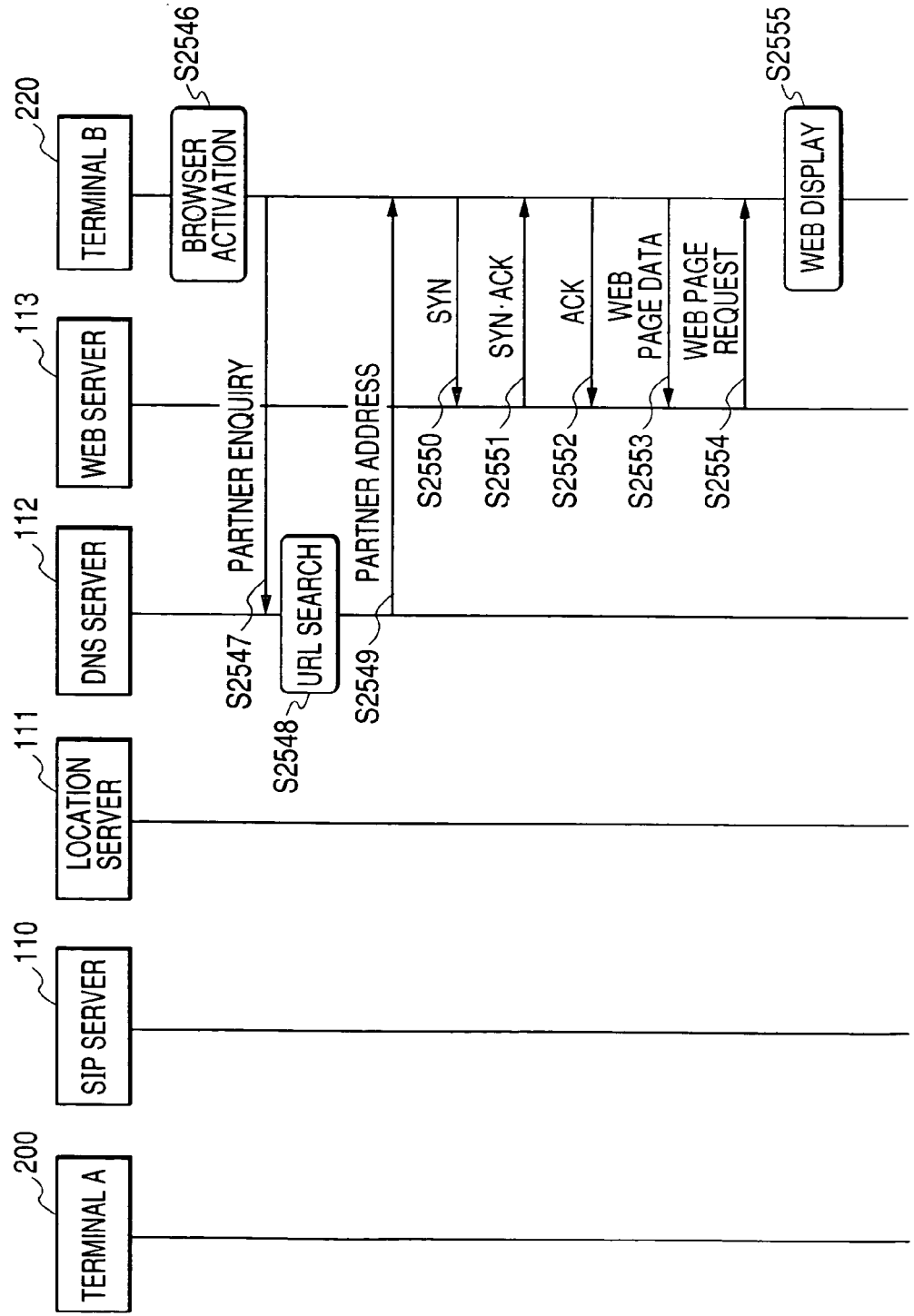
FIG. 20 is a schematic view showing a mode (embodiment 2) of an IP telephone communication by the apparatus shown in FIG. 1.
Figure 21:
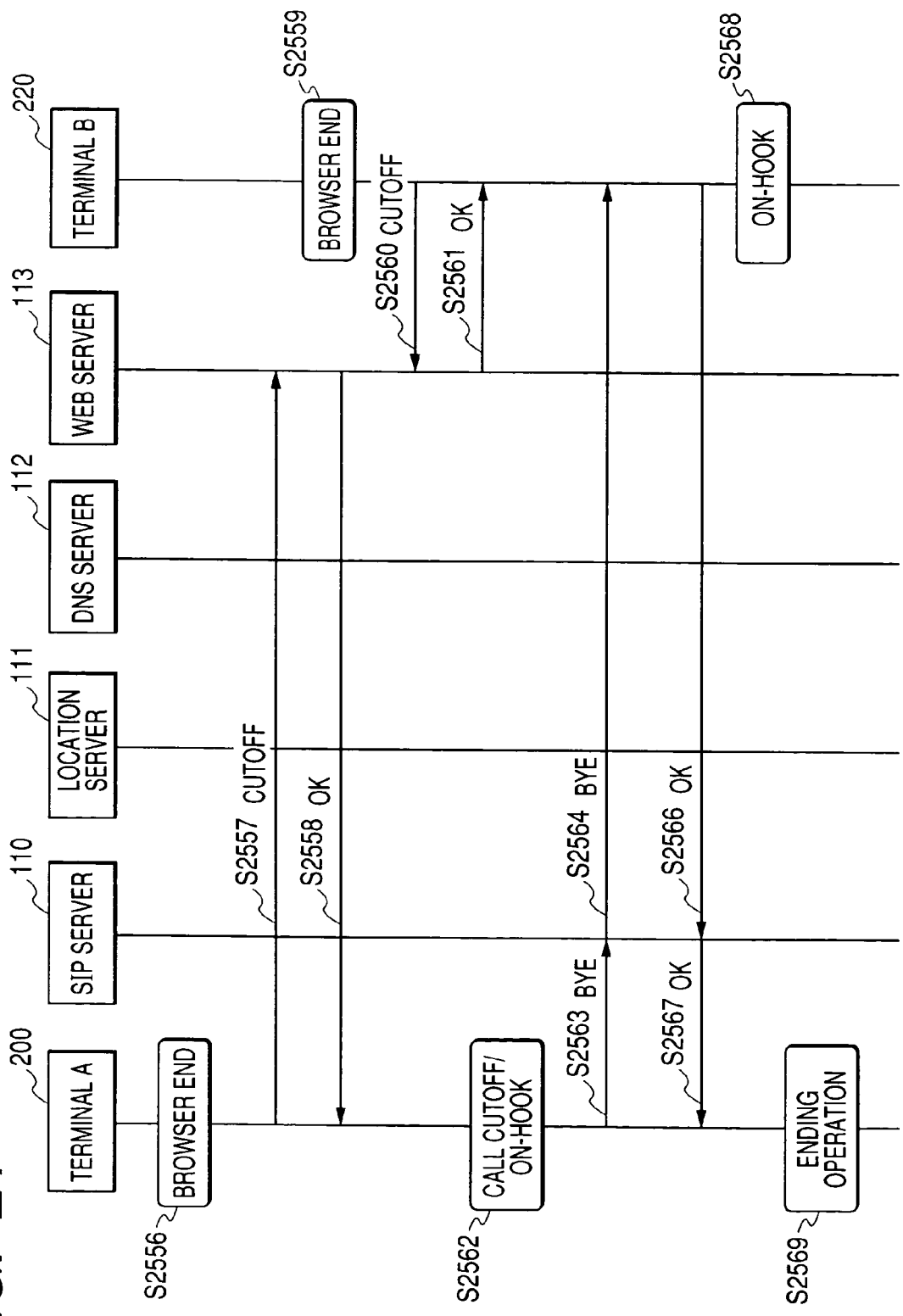
FIG. 21 is a schematic view showing a mode (embodiment 2) of an IP telephone communication by the apparatus shown in FIG. 1.
Figure 22:
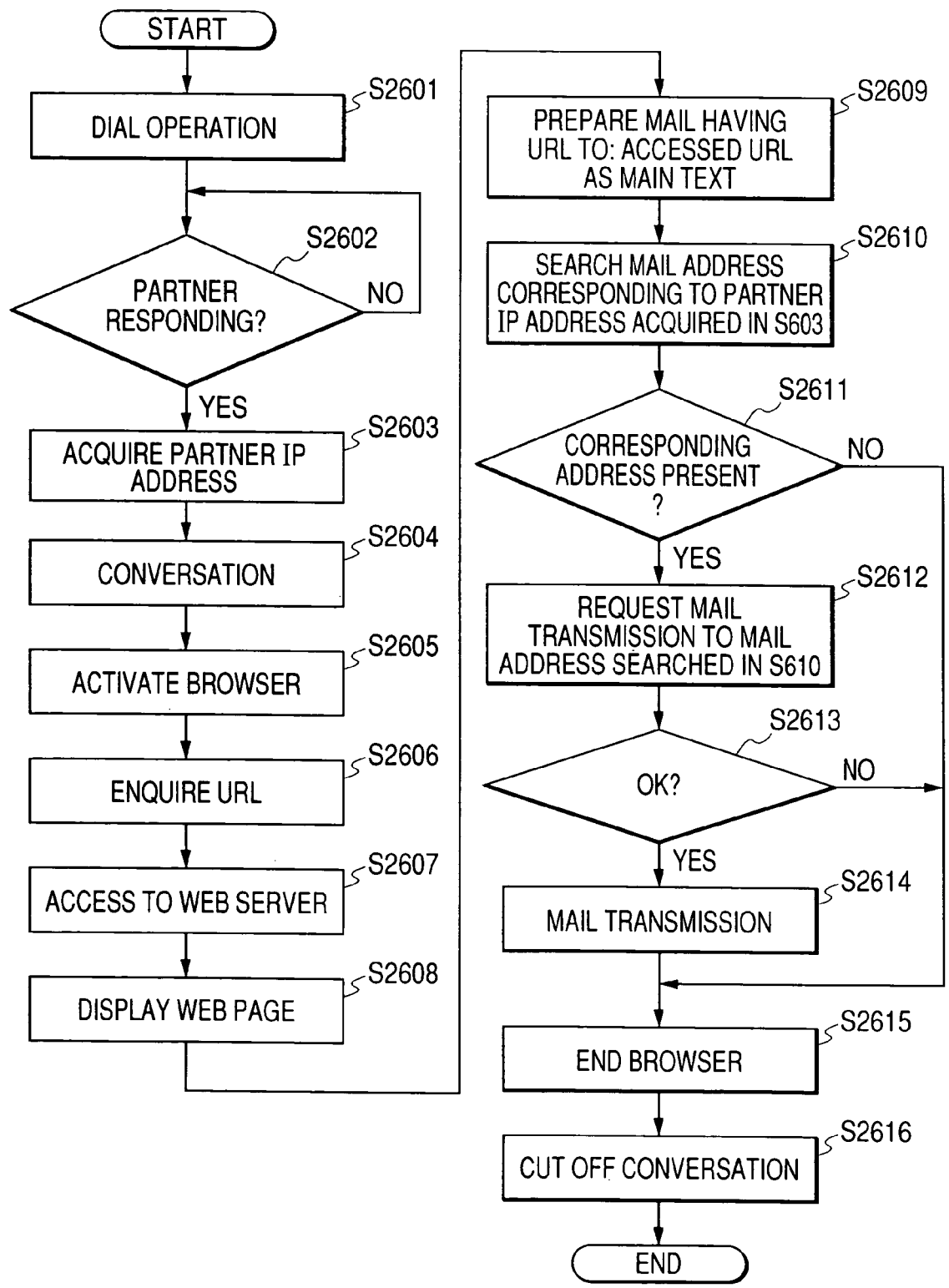
FIG. 22 is a flow chart showing a communication control procedure (embodiment 2) of an IP telephone communication by the apparatus shown in FIG. 1.

FIGS. 17-21 shows a communication sequence of the present embodiment, and FIGS. 22 and 23 show corresponding flow charts.

Figure 17:
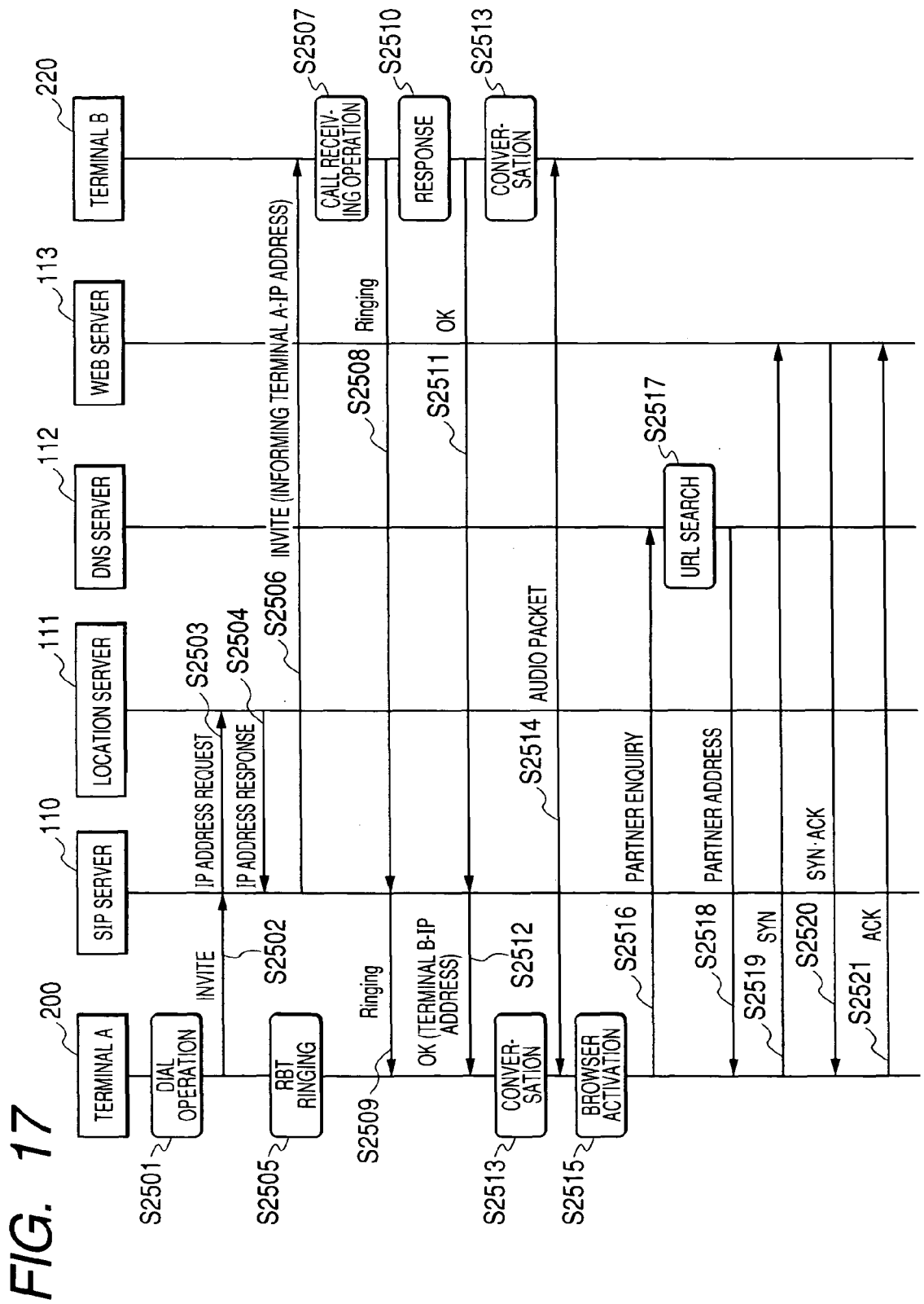
FIG. 17 is a schematic view showing a mode (embodiment 2) of an IP telephone communication by the apparatus shown in FIG. 1.
Figure 18:
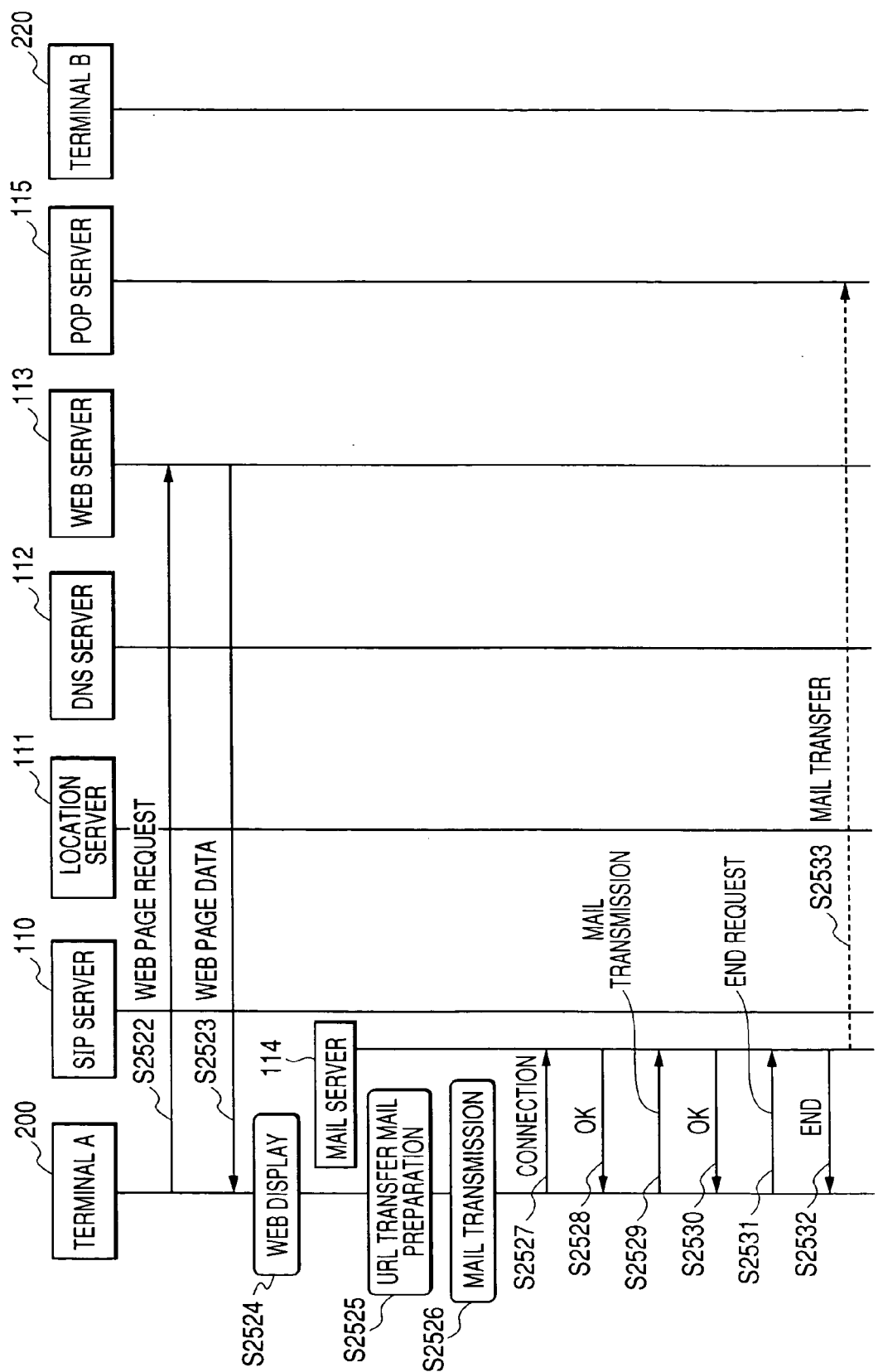
FIG. 18 is a schematic view showing a mode (embodiment 2) of an IP telephone communication by the apparatus shown in FIG. 1.

In FIGS. 17 and 18, a sequence in the terminal A from the acquisition of a WEB page from the WEB server 113 to the display (S2501-S2524) is identical with the sequence in FIGS. 5 and 6 (S501-S524).

After the WEB page display on the terminal A (S2524), in case the content of the WEB page is to be observed by the user of the terminal B, the user of the terminal A depresses the resource transfer button 215*a* of the operation unit 215.

Thus, the terminal A prepares an E-mail text for transferring URL data, indicating the location of the internet resource under use, namely the WEB page in display (S2525). This E-mail text is preferably in a special description format that can be easily analyzed and can control the subsequent utilization of the internet resource. In the present embodiment, there is employed a description format "URLto:<URL of WEB page >". In this format, the receiving side can search "URLto" and can easily extract the ensuing URL of the WEB page (or another internet resource) indicated in < >.

Consequently, such description format of the URL information can be considered, like the SOAP in the embodiment 1, to include utilization control information for the utilization after the reception of the URL information, and, the receiving side of such tagged URL information can utilize the internet resource corresponding to the URL information, according to such utilization control information.

Then the terminal A, based on the IP address of the terminal B (obtained in S2512) and utilizing an IP address—mail address table in the RAM 203 of the terminal A, detect the mail address of the terminal B and sends the mail prepared in S2525 to such address.

The mail transmission is executed by the SMTP protocol commonly utilized in ordinary mails. In this state, as the TCP packets are exchanged utilizing a well-known port number 25 for SMTP different from the port number used in the communication of the IP telephone, the mail transmission and the audio packet can be communicated without mixing, whereby the mail transmission can be executed during the voice conversation.

At first, the terminal A initiates a connection to the mail server 114 available for transmission by the terminal A (S2527 in FIG. 18). Though detailed command exchange is omitted, an own domain name, an own transmitting mail address, and a mail address of the destination of transmission are transmitted to the mail server 114 according to the SMTP protocol. The mail server 114, upon confirming that the mail transmission can be executed without problem, returns an OK command (S2528).

Subsequently, the mail prepared in S2525 is transmitted to the mail server 114 (S2529), and an OK command is returns when the mail is properly delivered to the mail server 114 (S2530). Then the terminal A transmits an end request command, for terminating the communication, to the mail server 114 (S2531), and the mail server 114 returns an end command to terminate the mail transmission (S2532).

The mail server 114, having received the mail, transfers the mail to the POP server 115 executing delivery to the destination user of the terminal B (S2533).

Figure 19:
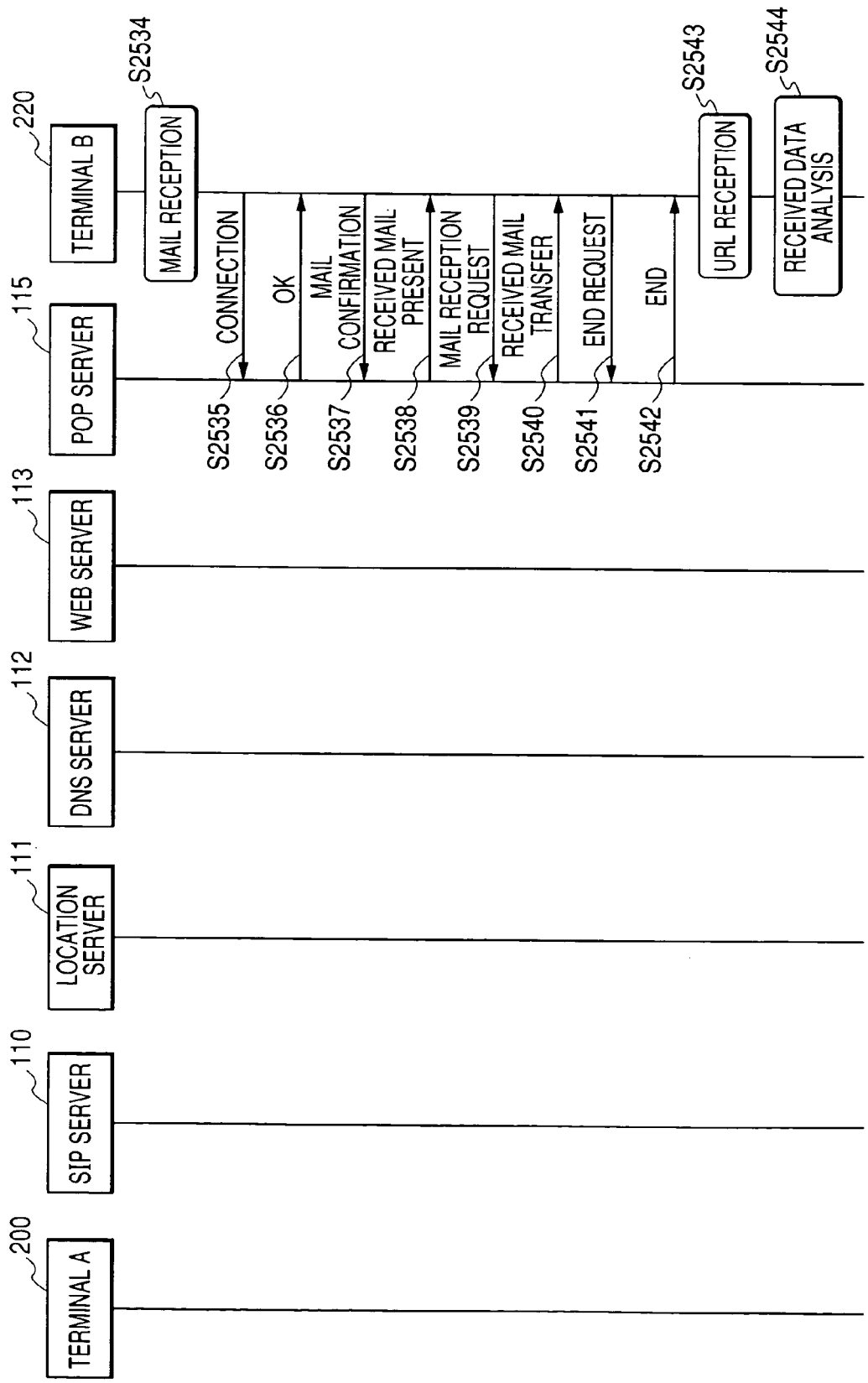
FIG. 19 is a schematic view showing a mode (embodiment 2) of an IP telephone communication by the apparatus shown in FIG. 1.

The terminal B executes a mail reception by the known POP3 protocol (S2534 in FIG. 19). In this state, as the TCP packets are exchanged utilizing a well-known port number 110 for POP3 different from the port number used in the communication of the IP telephone, the mail transmission and the audio packet can be communicated without mixing, whereby the mail transmission can be executed during the voice conversation.

A time interval of the mail fetching of the terminal B from the POP server 115 is usually set by the user. Otherwise, it is also possible to forcedly receive the mail by an operation of the reload button 215*b* (or another operation such as a menu operation by a mouse). Depending on the product specifications or the set status of the terminal B, it may become necessary, at the internet resource sharing operation in the terminal A, to execute a mail receiving operation in the terminal B for example by the reload button 215*b*, but a large time lag is not generated practically by setting the aforementioned mail palling interval very short, particularly by setting a short palling interval (about several seconds) automatically during the IP telephone conversation as will be explained later.

In case the terminal B has a fixed IP address or is capable of directly receiving a mail without utilizing POP or IMAP as in a mobile phone, the mail transmitted by the terminal A arrives at the terminal B without going through the POP/IMAP server. More specifically, in case the terminal A has an STMP server function and the terminal B has a function of receiving an E-mail by SMTP, the terminal A can transmit the mail, prepared in S2525; directly to the terminal B by the SMTP protocol without going through the server. Also the verification in such case can be similar to that explained in the embodiment 1.

A mail reception sequence in POP proceeds in the following manner. At first the terminal B sends its user name and its password to the POP server 115 and starts a connection therewith (S2535). After a verification by the user name and the password, the POP server 115 returns an OK command (S2536).

Subsequently, terminal B sends, to the server, a command for confirming whether a mail addressed to the terminal B has arrived (S2537). In the present sequence, since the URL informing mail from the terminal A has arrived at the POP server 115, the POP server notifies the terminal B of the presence of a received mail (S2538). The terminal B sends a command requesting the reception of the mail to the POP server 115 (S2539), which then sends the URL informing mail to the terminal B (S2540). Upon completion of the mail reception, the terminal B transmits an end request to the POP server 115 (S2541), which in response returns an end command to the terminal B whereby the mail reception is terminated (S2542).

Also in the present embodiment, the mail reception can be executed, during an IP telephone conversation, with an interval shorter than in an initial setting as will be explained in detail in a following flow chart. In this manner it is rendered possible, without depressing the reload button 215b every time, to receive, without a significant delay, the URL informing mail that is transmitted at each renewal of the WEB page on the terminal A (by an automatic control therein or by an explicit manual operation).

The terminal B, having received the URL informing mail (S2543), analyzes the received mail text and extracts the URL in the mail.

A subsequent WEB page display sequence (S2546-S2549), executed in the terminal B as shown in FIGS. 20 and 21, is similar to the sequence shown in FIGS. 8 and 9 (S546-S569).

FIGS. 22 and 23 respectively show control sequences of the terminals A and B.

Referring to FIG. 22, the terminal A executes a dialing operation to send an INVITE message for connection with the SIP server 110 (S2601), which in response calls a partner terminal and also returns a ringing signal to the transmitting terminal, whereupon the terminal A awaits a response of the partner terminal (S2602). When the partner terminal responds, it returns an OK message and an IP address corresponding to the telephone number of the partner terminal to the transmitting terminal, which thus obtains the IP address of the partner and temporarily stores it in the RAM 203 (S2603), and then enters an IP telephone conversation state (S2604).

Then the terminal A, when a browser is activated for display a WEB page (S2605) and a URL is entered in the browser, enquires an address of a WEB server 113 designated by the URL to the DNS server 112 and receives a result of search (S2606). Then the terminal A accesses to the WEB server 113 based on the IP address obtained from the DNS server 112 to receive data of a desired WEB page (S2607) and causes the browser to display the WEB page (S2608).

In the present embodiment, the URL is transmitted by a mail, and, for this purpose, there is prepared a mail describing the URL S2609). In the present embodiment, there is prepared a mail containing text data "URLto:<URL of WEB page>", in a main text of the mail. However the URL describing method is not restricted to such format as long as it is executed in a same method in the transmitting and receiving sides, and the URL may be written in a subject (header) and need not to assume the format "URLto:<URL of WEB page>". Then a mail address of the partner is searched, utilizing an IP address—mail address correspondence table in the RAM 203 and based on the IP address of the partner obtained in the step S2603 (S2610). In case the mail address is found in the search, a mail transmission is executed by steps S2612 and thereafter. In case the mail address is not found, as the mail transmission is not possible, the sequence finally proceeds to a step S2615, while the conversation is continued, to terminate the browser (S2611).

In case the mail address is found in S2611, a request for sending the URL informing mail, having thus found mail address as an address, is sent to the mail server 114 (S2612). The mail server 114 discriminates whether or not to permit the mail transmission, by checking the domain of the transmitting terminal and the mail address of the destination. The transmitting terminal awaits an OK message from the mail server 114 (S2613). In case an OK message is received in the step S2613, the transmitting terminal sends the mail (S2614) while continuing the conversation, but, if the OK message is not received, the transmitting terminal proceeds to a step S2615 to terminate the browser while continuing the conversation. It is however naturally possible to access to another WEB page and to execute the process starting from the step S2606.

When the conversation is to be terminate, the transmitting terminal by an on-hook operation sends a BYE command to the SIP server 110, thereby terminating the conversation (S2616). The conversation is naturally terminated when a cut-off by the partner is detected by a reception of a BYE command.

On the other hand, the terminal B in a stand-by state monitors an incoming call (S2701 in FIG. 23). When an incoming call is detected by a reception of an INVITE command, it responds to the incoming call and returns an OK command (S2702), thereby entering a conversation state (S2703).

During the conversation, it checks whether a preset acquisition time for the received mail is reached (S2704) and whether a received mail acquiring operation is executed by the reload button 215b (S2705). In the equipment of this type, a default mail receiving interval is usually about 15 minutes, but such interval can be changed by a user setting.

In the present embodiment, the mail receiving interval is changed shorter after the transfer of the URL data as will be explained later, but such shortening of the mail receiving interval may be executed immediately after the start of the IP telephone conversation (for example in S2703).

When the received mail acquisition time is not reached (S2704) and the reload button is not operated (S2705), there is checked whether the conversation is cut off by a reception of a BYE command (S2717), and the conversation state is maintained in case the conversation is not yet cut off.

In case the receiving main acquisition time is reached (S2704) or the reload buttons is operated (S2705), the terminal B makes a connection with the POP server 115 and sends a receiving mail confirming command (S2706). It checks whether a received mail is present by a return command from the POP server 115 (S2707), and, in the absence of a received mail, checks whether the conversation is cut off (S2717).

In case a received mail is present in the POP server 115, it sends a received mail acquisition command to the POP server 115 to cause the POP server 115 to transfer the received mail (S2708).

Then it discriminates whether a URL informing mail is present among the mails (naturally plural mails may be received) received from the POP server 115 (S2709). This discrimination is executed by judging the aforementioned description "URLto:<URL>" in the mail text. Then, in case a URL informing mail from the terminal A is found in this manner, the character train of URL is extracted form the "URLto:" tag of such mail (S2710).

In case of receiving a URL informing mail, there is anticipated a situation where a renewal of the WEB page at the transmitting side and a corresponding notice of a new URL take place frequently during the conversation. In such situation, in case the mail acquiring interval is maintained at the set value (for example 15 minutes in a default setting), a new URL for each renewal of the WEB page in the terminal A can only be received by operating the reload button 215b after a voice guidance for such page renewal from the terminal A in the conversation. In the present embodiment, therefore, the received mail acquisition interval is changed to 1 minute (or an even shorter interval) (S2711). Naturally this process is unnecessary in case the received mail acquisition interval is shortened immediately after the start of the IP telephone conversation (for example in S2703).

Then a browser is activated for displaying the WEB page (S2712), and the URL character train, extracted from the "URLto:" tag of the URL informing mail is entered into the browser. The terminal B enquires an address of the WEB server 113 designated by the URL to the DNS server 112 and receives a search result (S2713). Then it accesses to the WEB server 113 based on the IP address obtained from the DNS server 112, received data of a WEB page (S2714) and causes the browser to display the WEB page (S2715). Thereafter the browser is terminated when the browsing becomes unnecessary (S2716).

An end of the conversation is checked by whether a BYE command is received (S2717). Upon detecting that the conversation is cut off by the partner, it returns an OK command to terminate the conversation, and returns to the on-hook state (S2718). Thereafter the received mail acquisition interval, changed in the step S2711, is returned to the set value (S2719) whereupon the process is terminated.

In the present embodiment, a shared utilization of a same internet resource is realized by preparing, at the URL transmitting side, a mail containing text data "URLto:<URL of WEB page>" in the mail text, and, at the receiving side, by checking such description "URLto:<URL of WEB page>" in the received mails (naturally plural mails may be received). But such method is not restrictive, and it is also possible to utilize the SOAP protocol by, at the transmitting side, preparing and transmitting a mail to which an execution file including a SOAP message as shown in FIG. 31 is attached, and, at the receiving side, by checking whether an execution file including a SOAP message is received.

In this manner, the terminals in communication by the IP telephone can utilize a same internet resource, and it is rendered possible, as in the embodiment 1 and in contrast to a prior transmission of the internet resource by voice in the IP telephone conversation, to mutually transmit the information of the internet resource correctly thereby securely enabling the utilization of a same internet resource, and to improve the operability as a re-entry operation for data such as URL can be dispensed with.

The embodiment 2 utilizes E-mail for transferring the URL data. Since the mail transmission/reception function is often provided in the equipment of this type, this embodiment can be realized without a major change in the hardware/software configuration. Also by shortening the mail receiving interval as explained above (either immediately after the start of IP telephone conversation or after the reception of a first URL informing mal), a shared utilization of the internet resource can be realized without a significant time lag.

Various variations mentioned in the embodiment 1 are naturally similarly applicable to the embodiment 2 unless such variation relates to a difference in the URL data transfer method from the embodiment 1.

Embodiment 3

In the foregoing, there have been explained examples utilizing FTP or E-mail protocol (SMTP) for the transfer of the URL data. The present embodiment utilizes an HTTP proxy technology for transferring the URL data.

As regards an HTTP proxy server, HTTP-1.1 is described in RFC2616. An HTTP proxy server is to access to an HTTP server in place for an HTTP client, to obtain desired HTTP data and to transfer the data to the HTTP client, also can cache the HTTP data, and is used widely for the purposes of alleviating an HTTP traffic or concealing information of the HTTP client (information that can be provided by a browser, such as IP address) from the HTTP server.

In the present embodiment, in case of a shared utilization of an internet resource with a partner in the IP telephone conversation, either terminal serves as an HTTP proxy server to transmit the internet resource data themselves to the partner terminal. In the present embodiment, therefore, the already acquired internet resource itself, instead of URL data indicating the location of the internet resource, is transferred to the communication partner.

Also in the present embodiment, the communication terminal and the network have configurations same as those shown in FIGS. 1-4, and, in the following sequence and flow charts, there will be explained a communication between a communication terminal A (200) and a communication terminal B (220) as in the embodiment 1.

Figure 24:
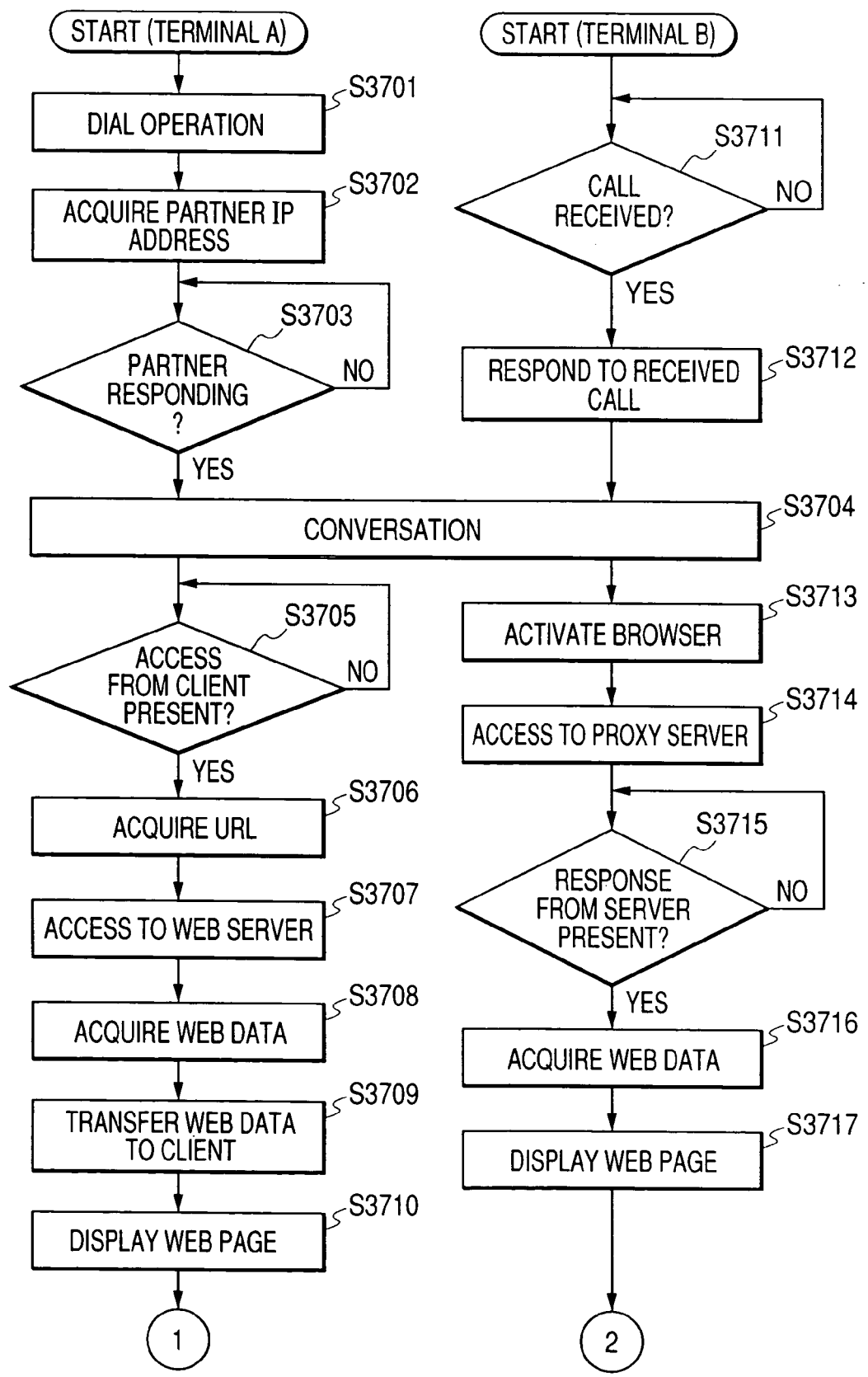
FIG. 24 is a flow chart showing a communication control procedure (embodiment 3) of an IP telephone communication by the apparatus shown in FIG. 1.
Figure 25:
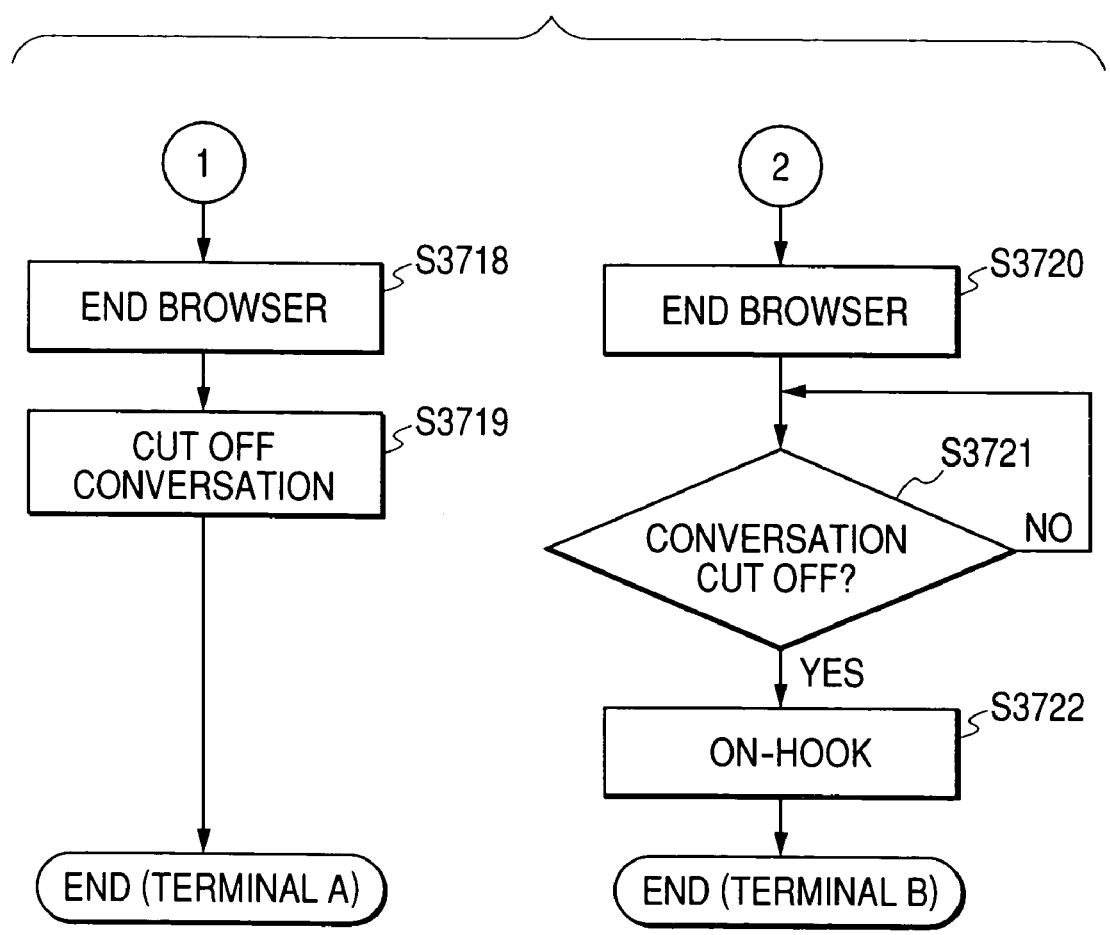
FIG. 25 is a flow chart showing a communication control procedure (embodiment 3) of an IP telephone communication by the apparatus shown in FIG. 1.

FIGS. 24 and 25 shows a state in which, during a conversation of the terminals A and B by the IP telephone, the terminal A acquires a WEB page, and the terminal A becomes an HTTP proxy server and the terminal B becomes an HTTP client to share the WEB page.

In FIG. 24, steps S3701-S3704 indicate a process until a conversation by the IP telephone is started. At first the terminal A calls the terminal B (naturally the calling direction may be opposite).

The terminal A makes a connection to the SIP server 110 by a dialing operation (S3701). As explained before, the SIP server 110 calls a partner terminal and returns an IP address, corresponding to the telephone number of the partner terminal B, to the terminal A (S3702). The terminal A enters a calling state and awaits a response of the terminal B (S3703). A conversation state is initiated when the terminal B responds (S3704).

On the other hand, the terminal B in a stand-by state monitors an incoming call (S3711). Upon detecting an incoming call, the terminal B responds thereto (S3712) and enters the conversation state (S3704).

In the present embodiment, there will be explained a process of a case where a requirement for browsing a WEB page is generated in the terminal B, and it is desired that such WEB page is shared (browsed) also in the terminal A. In such case, in the terminal B, a browser is activated (S3713), then the URL of the desired WEB page is entered and the resource sharing button 215*a* is operated (instead of an ordinary browsing operation).

In this manner, the terminal B makes an access, as a client, to the terminal A serving as an HTTP proxy server. More specifically, the terminal B executes a synchronization with the terminal A and requests a WEB page to be displayed, to the proxy server (S3714) This HTTP proxy procedure will be explained later in more details.

The terminal A monitors an access from the terminal B as an HTTP client (S3705), and, in case of an access from the terminal B, executes a synchronization with the terminal B, accepts the WEB page request, and acquires the URL information which the terminal B desires for display (S3706).

The terminal A accesses to the WEB server 113 utilizing the acquired URL information (S3707) and acquires the WEB data requested by the terminal B (S3708). The acquired WEB data are stored in a cache memory of the terminal A and also transferred, as a response to the WEB page request, to the terminal B functioning as the HTTP client (S3709).

Also the terminal A activates a browser and causes it to display the WEB page requested from the terminal B (S3710). However, the display in the terminal A is not essential. On the other hand, the terminal B awaits a response from the terminal A as the proxy server (S3715), then acquires the WEB data from the proxy server (S3716) and displays the acquired WEB page (S3717). After the browsing, the terminal A or B terminates the browser (S3718, S3720 in FIG. 25).

In the present embodiment, the terminal A cuts off the communication upon completing the conversation with the terminal B(S3719). The terminal B, upon detecting a cut-off from the terminal A (S3721), executes an on-hook operation thereby cutting off the communication (S3722). In this cut-off sequence, the terminals A and B may function in opposite manner from the illustration.

Also in the foregoing explanation, the terminal A functions as an HTTP proxy server while the terminal B functions as an HTTP client and requests the WEB page, but the functions of these terminals may be inverted.

Figure 26:
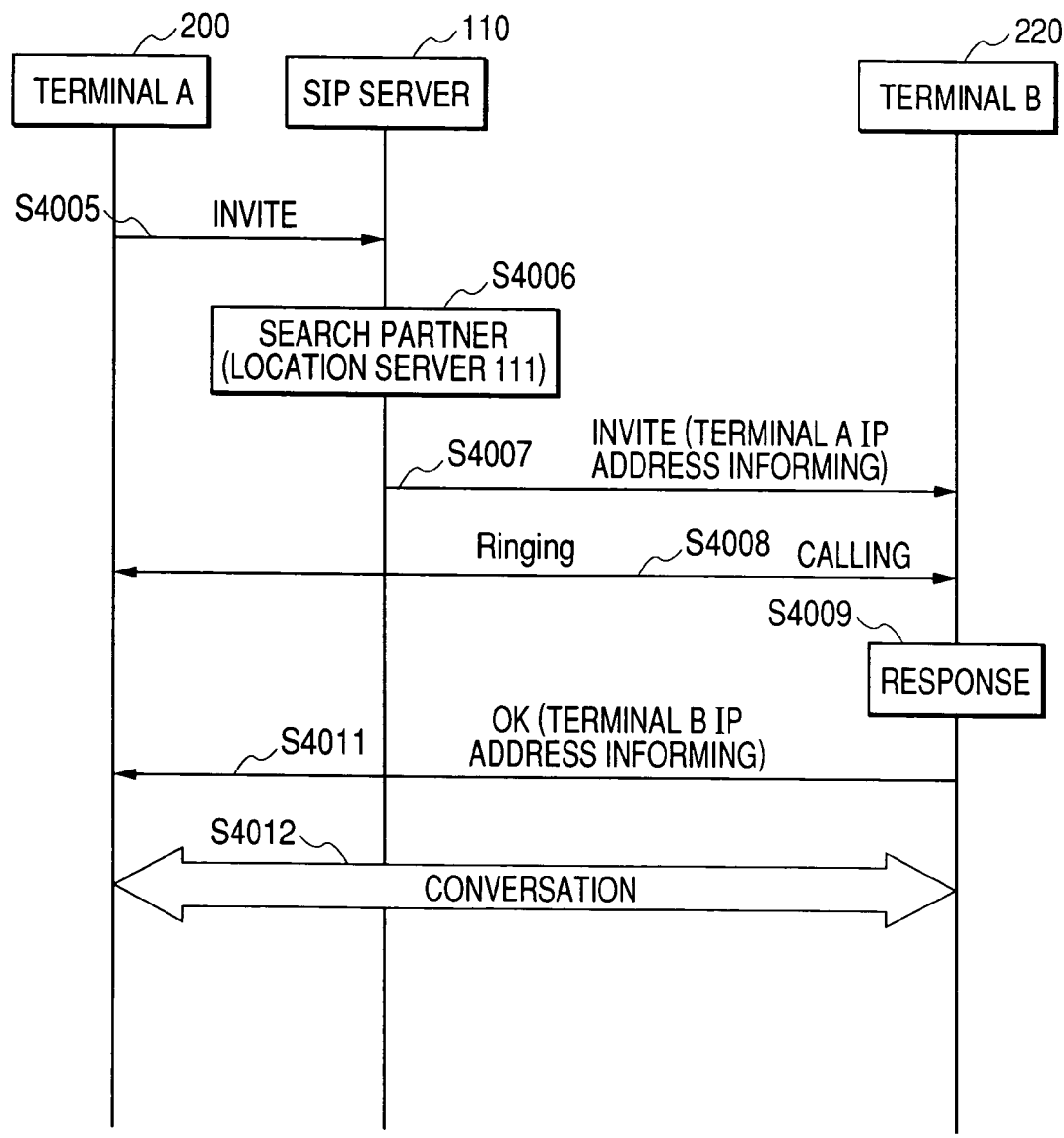
FIG. 26 is a schematic view showing a mode (embodiment 3) of an IP telephone communication by the apparatus shown in FIG. 1.

FIG. 26 shows a sequence in a call connection from the terminal A to the terminal B. The calling terminal A can be connected to an ISP server 110, and the called terminal B can also be connected to the ISP server 110. The ISP server 110 is constituted of an SIP server, a location server, a DNS server and the like, which are mutually connected through the internet.

At first in the terminal A, a dialing operation is executed on the operation unit 215. As in the foregoing embodiments, an INVITE message is transmitted from the terminal A and through the SIP server 110, thereby establishing a conversation state with the terminal B (S4005-S4012). Thus the terminals A and B recognize mutual IP addresses.

Figure 27:
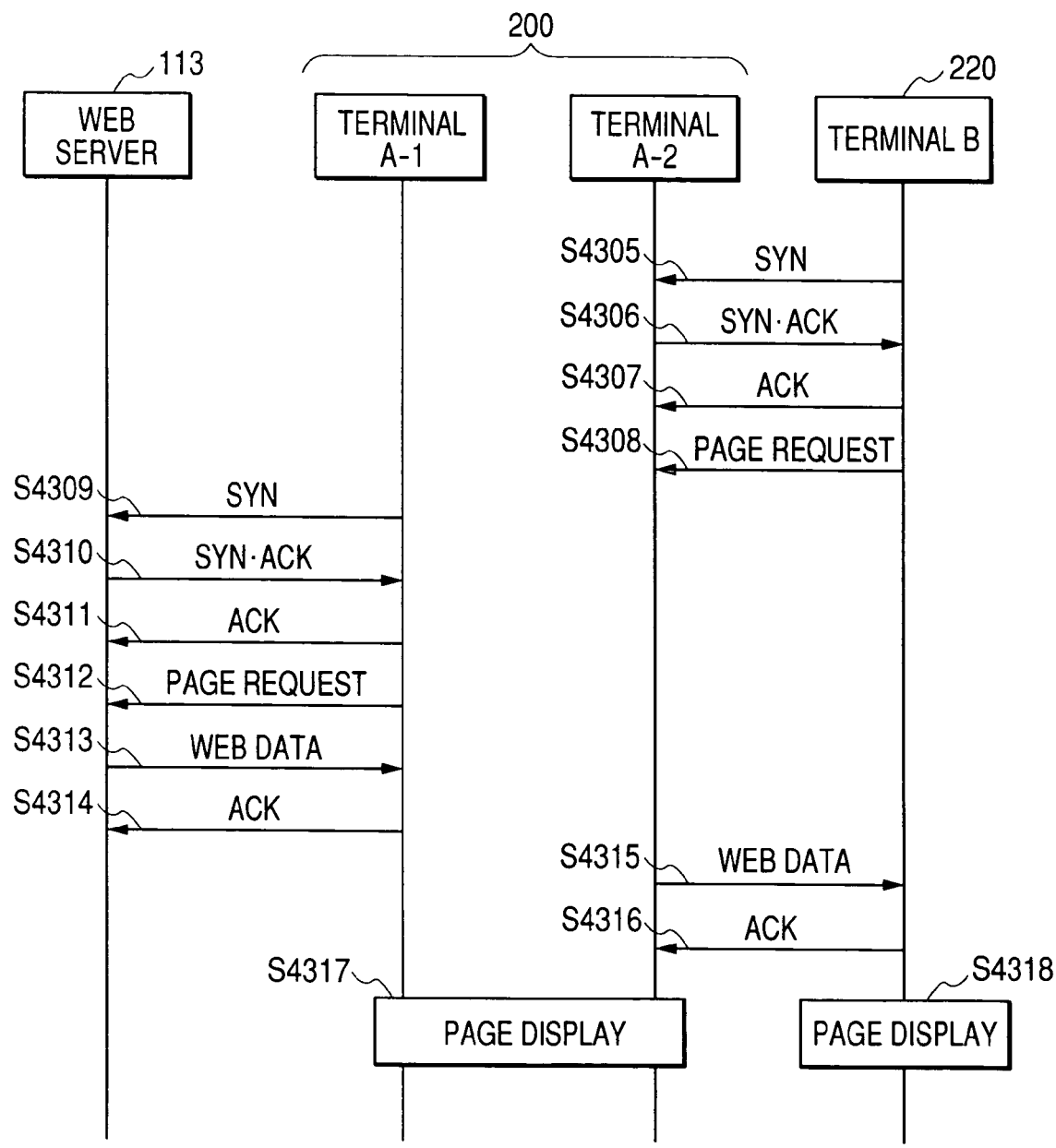
FIG. 27 is a schematic view showing a mode (embodiment 3) of an IP telephone communication by the apparatus shown in FIG. 1.

FIG. 27 shows HTTP packet exchanges in a state in which, after the start of conversation, the terminal A functions as an HTTP proxy server while the terminal B functions as an HTTP client and requests a WEB page. Also FIGS. 28-30 show structures of the HTTP packets.

Figure 28:
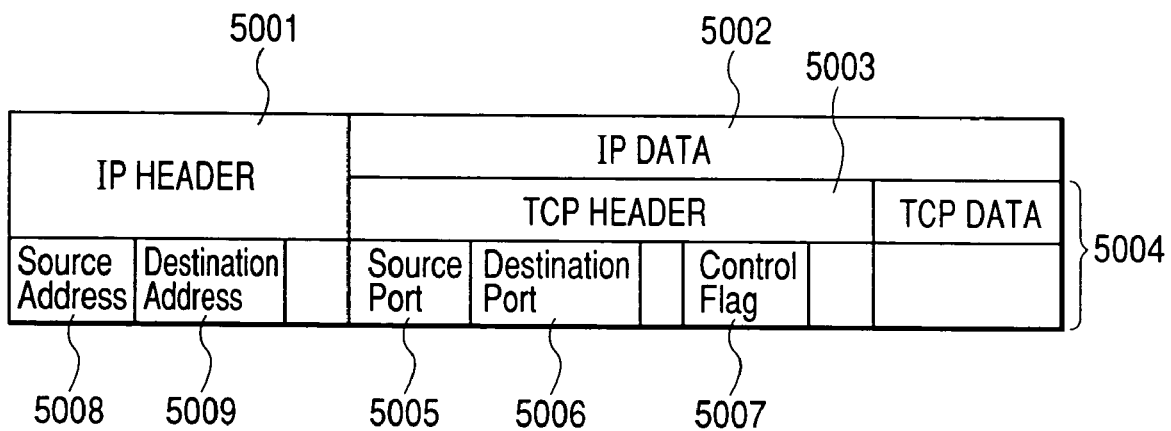
FIG. 28 is a schematic view showing a configuration of a TCP packet employed in the embodiment 3.
Figure 29:
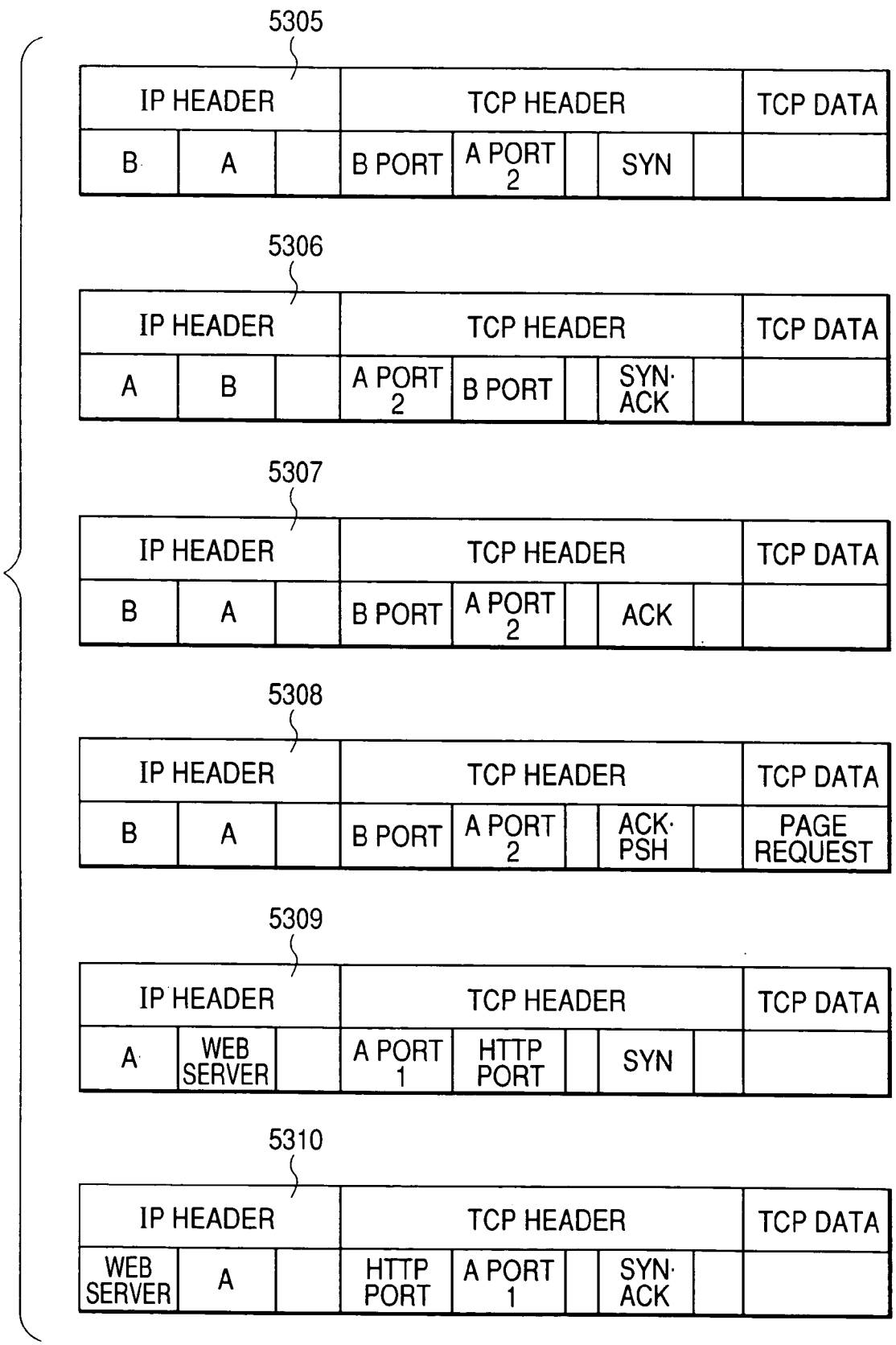
FIG. 29 is a schematic view showing a configuration of a TCP packet employed in the embodiment 3.
Figure 30:
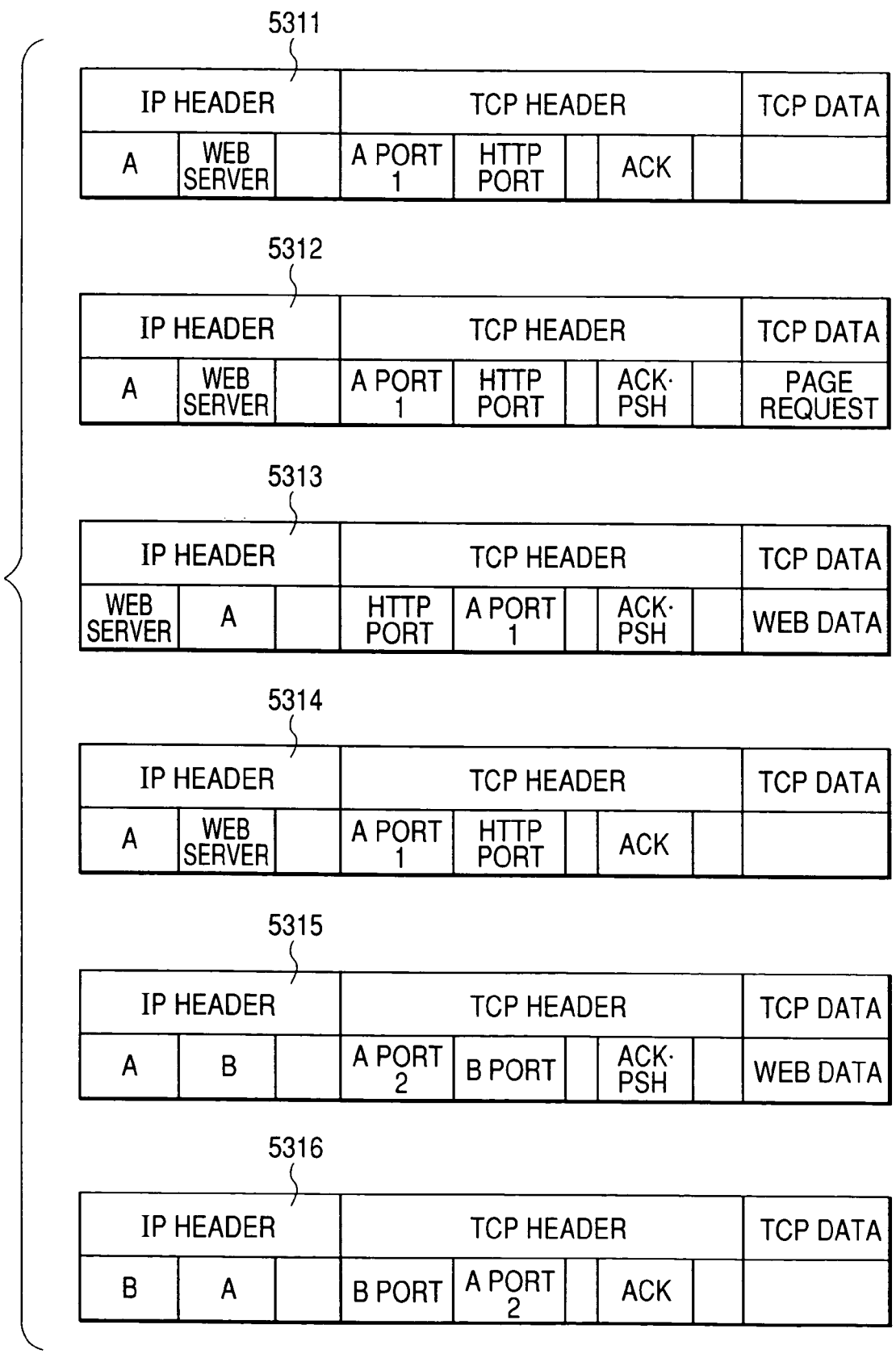
FIG. 30 is a schematic view showing a configuration of a TCP packet employed in the embodiment 3.
Figure 32:
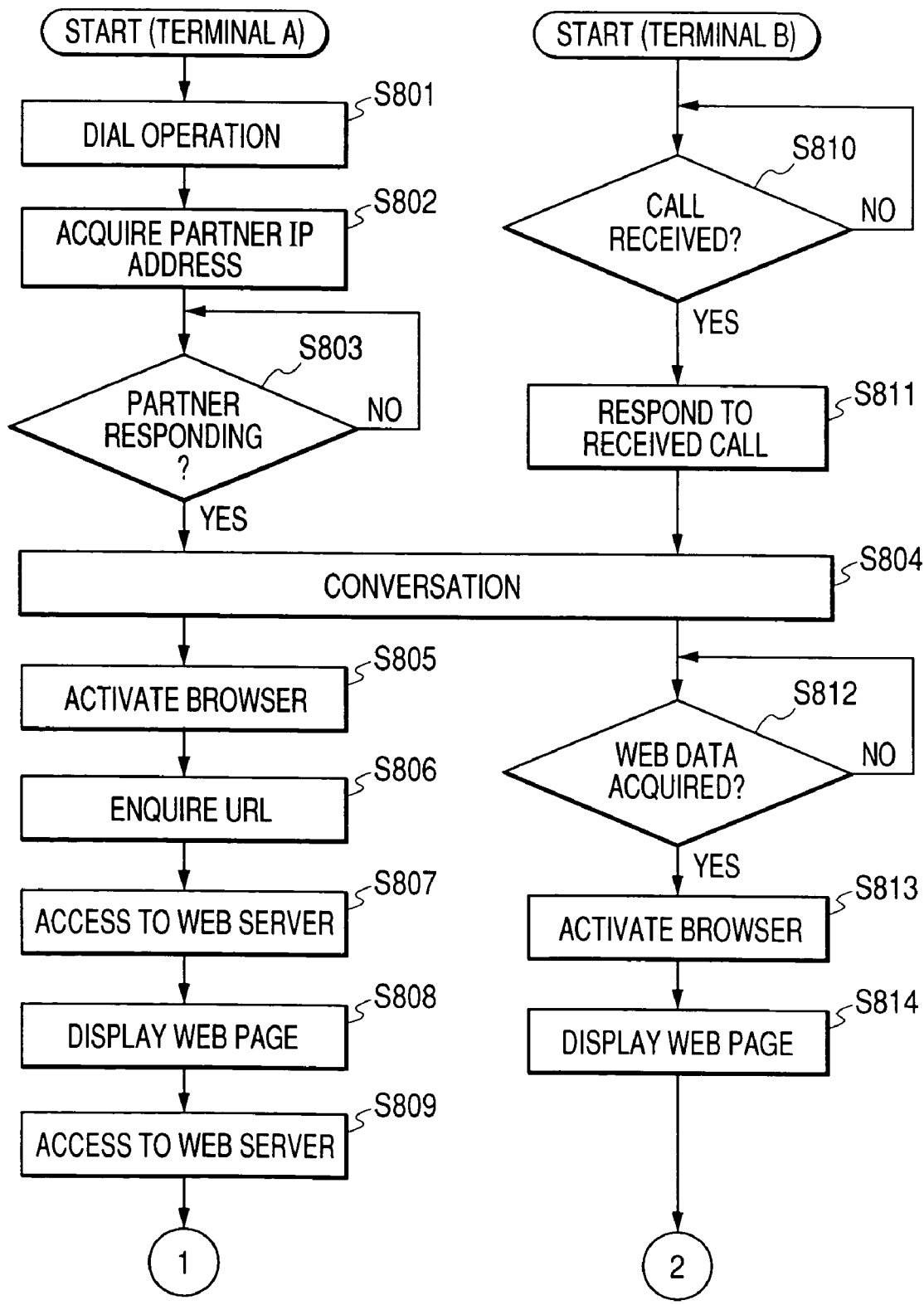
FIG. 32 is a flow chart showing a communication control procedure (embodiment 4) of an IP telephone communication by the apparatus shown in FIG. 1.
Figure 33:
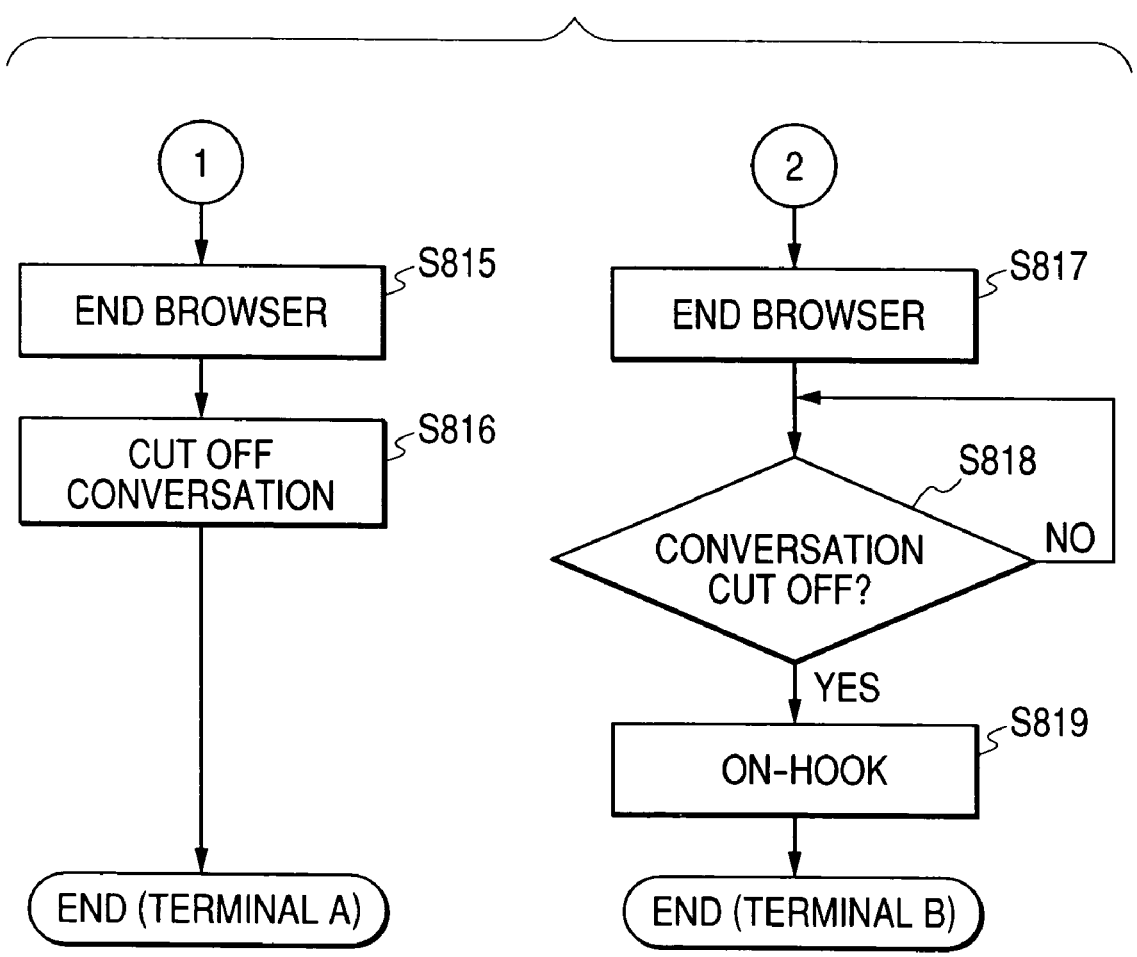
FIG. 33 is a flow chart showing a communication control procedure (embodiment 4) of an IP telephone communication by the apparatus shown in FIG. 1.
Figure 34:
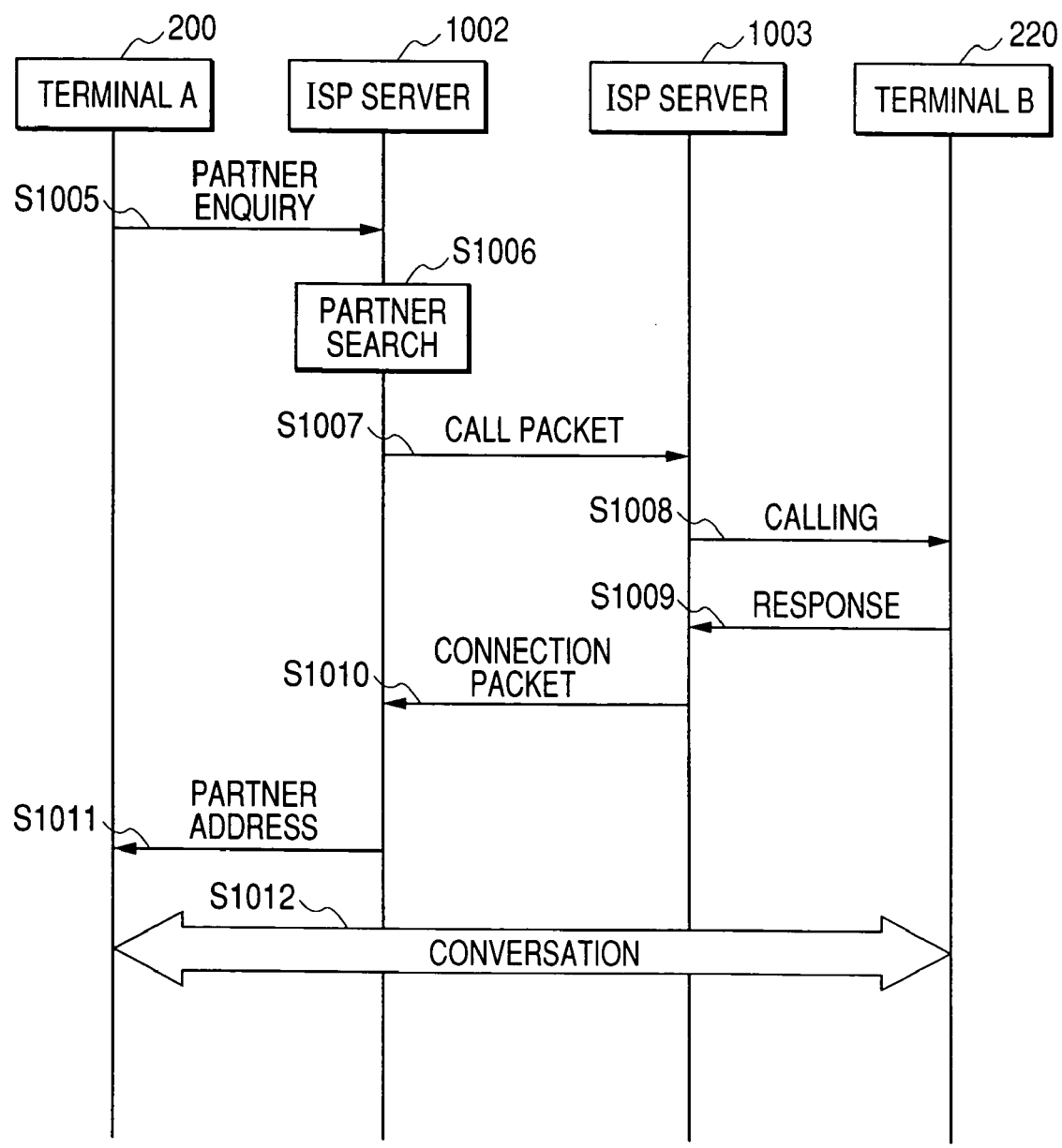
FIG. 34 is a schematic view showing a mode (embodiment 4) of an IP telephone communication by the apparatus shown in FIG. 1.
Figure 35:
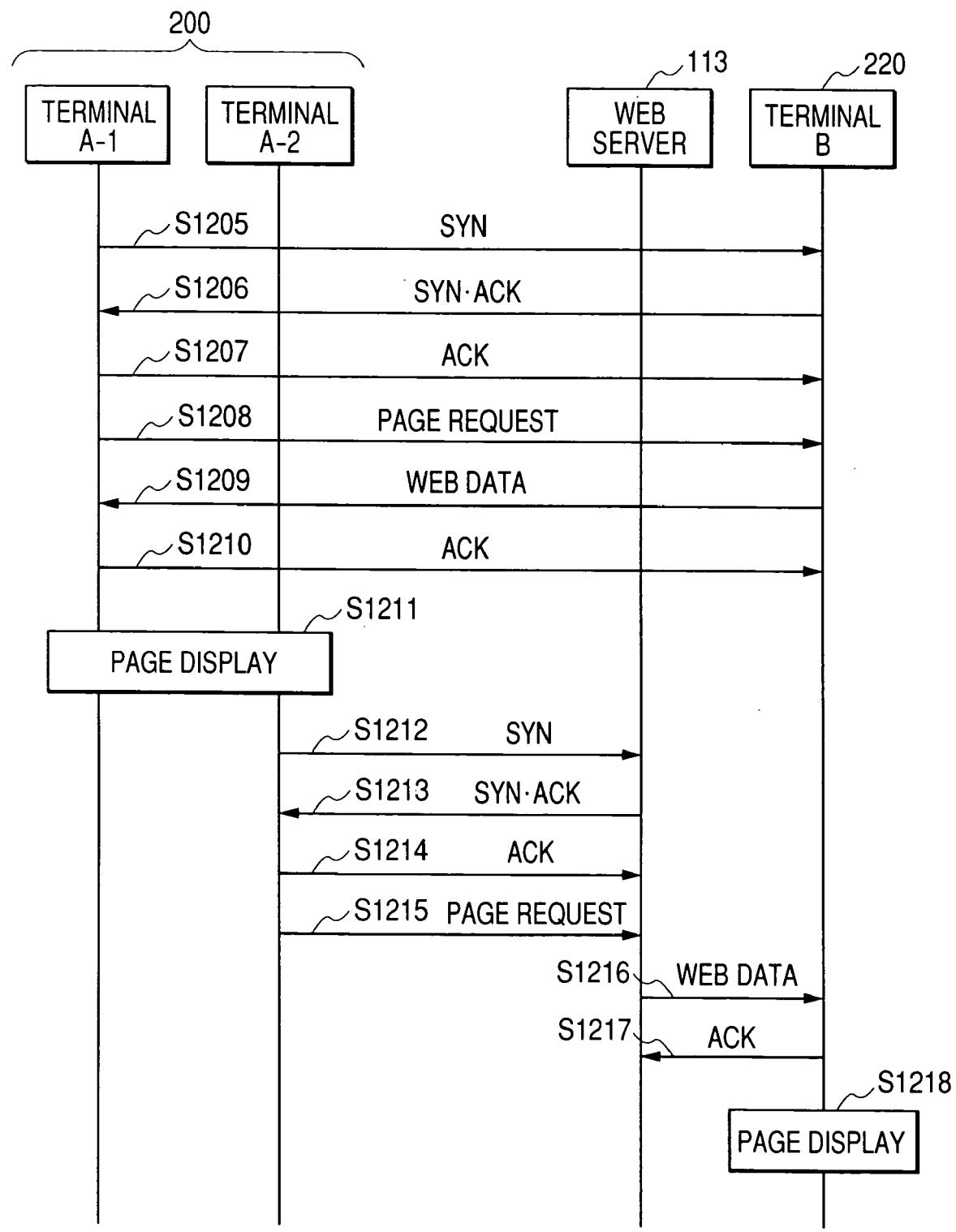
FIG. 35 is a schematic view showing a mode (embodiment 4) of an IP telephone communication by the apparatus shown in FIG. 1.
Figure 36:
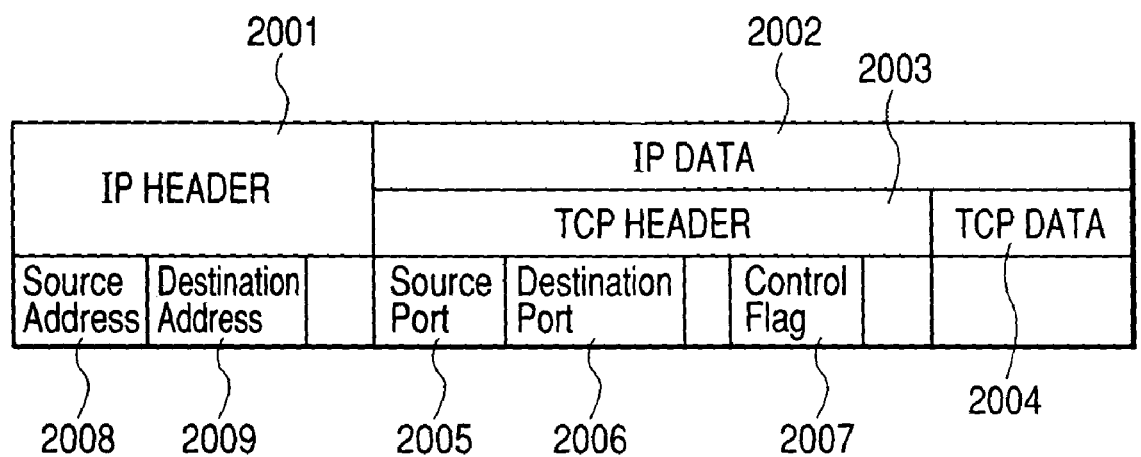
FIG. 36 is a schematic view showing a configuration of a TCP packet employed in the embodiment 4.
Figure 37:
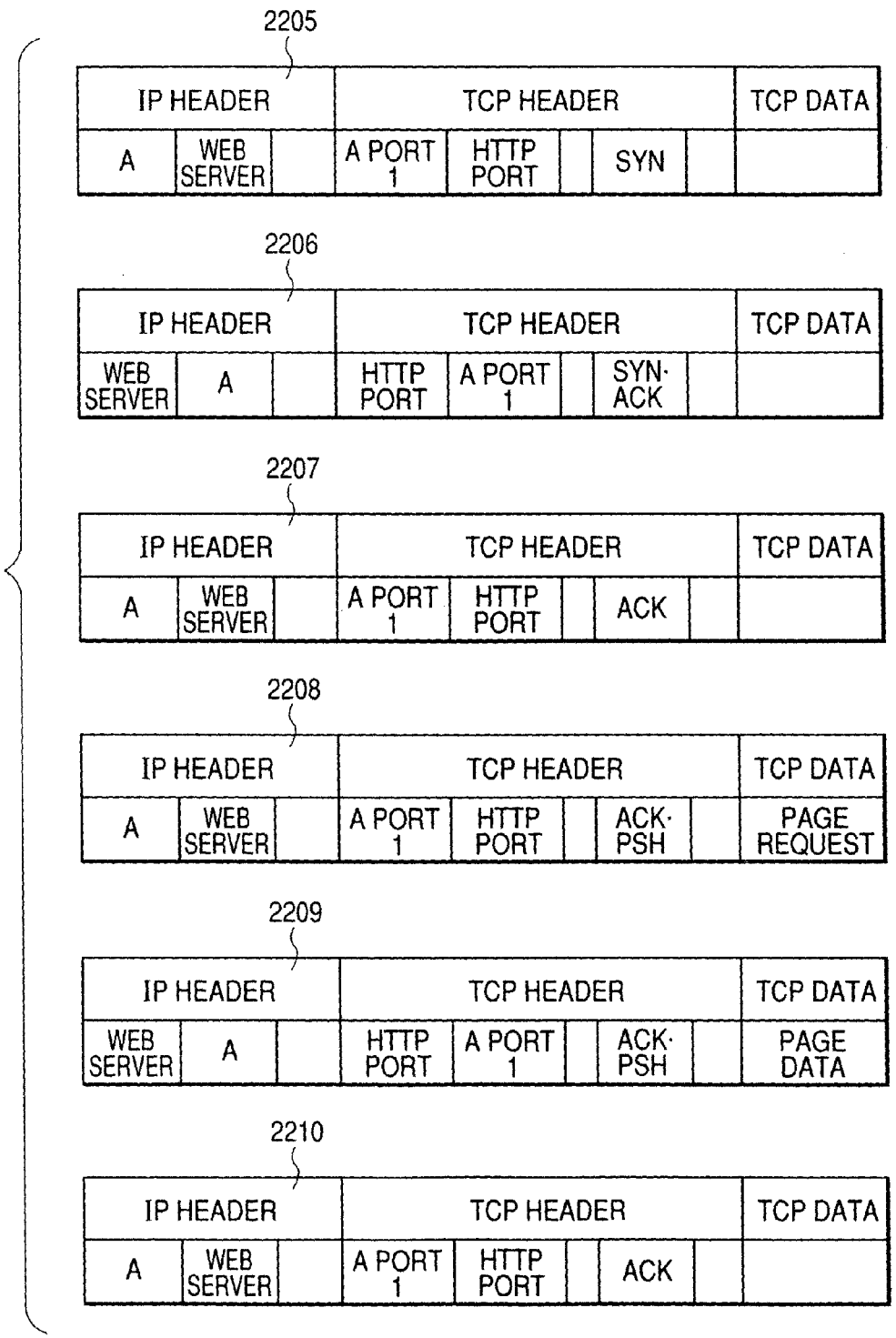
FIG. 37 is a schematic view showing a configuration of a TCP packet employed in the embodiment 4.
Figure 38:
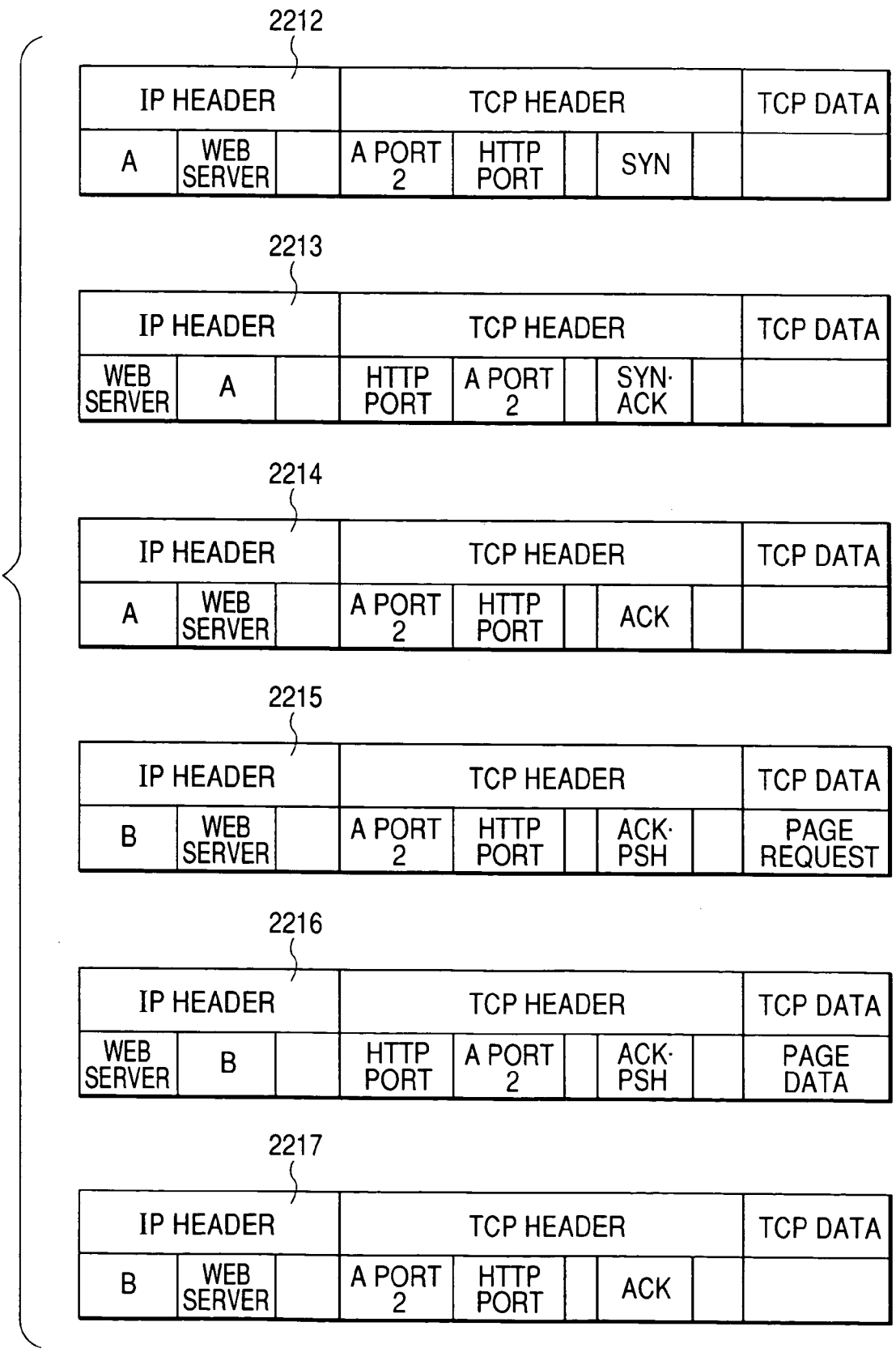
FIG. 38 is a schematic view showing a configuration of a TCP packet employed in the embodiment 4.

In the sequence shown in FIG. 27, steps are represented by numbers of 4000's, and FIGS. 28-30 employ reference numbers of 5000's. In the following description, the correspondence to each step and each packet (or an internal structure thereof) in these drawings is indicated by a form "(S4xxx•5xxx)".

At first, reference is made to FIG. 28 for explaining a structure of an HTTP packet. A packet shown in FIGS. 29 and 30 has a structure shown in FIG. 28. FIG. 28 shows a common structure of a packet employed in TCP/IP, and a TCP/IP packet is constituted of an IP header part 5001 and an IP data part 5002. The IP header part 5001 contains an IP address 5008 of a transmitting terminal, and an IP address 5009 of a destination.

The IP data part 5002 is further constituted of a TCP header part 5003 and a TCP data part 5004, and the TCP data part 5003 includes a port number 5005 of the emitting terminal, a port number 5006 of the destination, and a control flag 5007 indicating the type of the TCP packet.

In the following, there will be explained, with reference to FIGS. 27, 29 and 30, an operation of shared utilization of a same WEB page by the terminal A functioning as a proxy server and the terminal B functioning as a client.

The terminal A, functioning as a proxy server, utilizes two ports for data transmission/reception, in order to exchange HTTP data with the WEB server 113 and with the terminal B functioning as the HTTP client. In FIG. 27, the terminal A is represented as a terminal A-1 and a terminal A-2, corresponding to the aforementioned two ports for data transmission/reception. In TCP/IP, a port number is used in a series of operations from a synchronization to a termination of the function, and another port number is used for a next series of operations. The terminal B functioning as the HTTP client can also utilize plural ports, but utilizes only one port in the HTTP communication of the present embodiment.

At first, in order to achieve a WEB page display, the terminal B executes a synchronization with the terminal A serving as the proxy server. More specifically, the terminal B sends a SYN packet to an HTTP port "80" of the port 1303 of the terminal A (S4305•5305), which returns a SYNACK packet (S430•5306), and in response the terminal B sends an ACK packet (S4307•5307). Thereafter, the terminals A and B can execute an HTTP communication. In the TCP packet exchange between the terminals A and B thereafter, the terminal B describes an HTTP command in the TCP data part 5004, and the terminal A describes a response thereto in the TCP data part 5004.

The terminal B requests WEB data by HTTP to the terminal A (S4308•5308). The TCP packet transmits the URL information from the terminal B to the terminal A.

The terminal A, functioning as a proxy server in place for the terminal B, requests data of the WEB page to the terminal A. The terminal A prepares a port 1302, different from that used in the communication with the terminal B, for a synchronization with the WEB server. More specifically, the terminal A sends a SYN packet (S4309•5309) to which the WEB server 113 returns a SYN•ACK packet (S4310•5310), and in response the terminal A returns an ACK packet (S4311•5311) Thereafter the terminal A and the WEB server 113 can execute an HTTP communication. As described above, in the TCP packet exchange between the WEB server 113 and the terminal A, the terminal A describes an HTTP command in the TCP data part 5004, and the WEB server describes a response thereto in the TCP data part 5004.

Thereafter, the terminal A requests WEB data by HTTP to the WEB server (S4312•5312), and receives desired WEB data (S4313•5313). In response the terminal A returns an ACK (S4314•5314). The terminal A stores the WEB data in a memory and transfers the data to the terminal B, as a response to the WEB data request (S4315•5315). In response the terminal B returns an ACK (S4316•5316).

The terminal A displays the WEB data received from the WEB server (S4317), and the terminal B displays the WEB data received from the terminal A (S4318).

In this manner an internet resource can be shared by the terminals in conversation by the IP telephone. Different from the prior transmission of the internet resource by voice in the IP telephone conversation, it is possible to mutually transmit the internet resource itself correctly thereby securely enabling the utilization of a same internet resource, and to improve the operability as a re-entry operation for data such as URL can be dispensed with.

Various variations mentioned in the embodiment 1 are naturally similarly applicable to the embodiment 3 unless such variation relates to a difference in the URL data transfer method from the embodiment 1.

The software realizing the present invention is applicable to a communication terminal of an arbitrary type connected to an IP network and executing a conversation by a predetermined IP telephone system, and may be supplied, as a program of the CPU of such communication terminal, by storing in a ROM or another memory medium, or supplied through an external memory medium (such as CD-ROM, flexible disk or MO) or through a network. Particularly in case of supply through a network, the software may be provided, as explained before, as an internet resource in the form of a firmware (or an additional software) of the communication terminal in an FTP server or an HTTP server, then downloaded to the communication terminal by the communication method of the invention, and installed in the communication terminal for example through the SOAP protocol.

In the embodiments 1-3, as will be apparent from the foregoing description, a communication terminal connected to an IP network and executing a conversation by a predetermined IP telephone system, a control method therefor and a control program therefor adopts a configuration including internet resource sharing means or control process for shared utilization of a same internet resource with a partner communication terminal in communication, thereby providing an excellent effect, in contrast to a prior transmission of the internet resource by voice in the IP telephone conversation, of mutually transmitting the information of the internet resource correctly thereby securely enabling the utilization of a same internet resource, and of dispensing with a re-entry operation for data such as URL. Thus, the present invention provides an excellent effect of securely sharing an internet resource with a partner in conversation by the IP telephone in simple and inexpensive manner, without requiring any cumbersome operations, by means of the communication terminal only and not relying on other equipment.

Embodiment 4

FIGS. 5 and 6 show a mode of IP telephone communication in the present embodiment. In the IP telephone communication of the present embodiment, a conversation is executed by a call connection from a communication terminal A (200) to a communication terminal B (220), constructed as shown in FIGS. 1 and 2. In the present embodiment, the terminal A executes a WEB browsing, and in the course of the IP telephone communication, transfers the URL data from the communication terminal A to the communication terminal B thereby enabling to share same WEB information between the communication terminals (hereinafter also represented simply as terminals) A and B. The illustrated communication procedure is realized by the execution of a communication control program by the CPU 201 shown in FIG. 1. The communication control program of the CPU 201 is stored in the ROM 202 (or another memory medium). Also in the present embodiment, the communication terminal and the network have configurations same as those shown in FIGS. 1-4, and, in the following sequence and flow charts, there will be explained a communication between a communication terminal A (200) and a communication terminal B (220) as in the embodiment 1.

In the following description, a calling direction between the terminals is assumed as from A to B, and a transfer direction of the WEB data is also assumed as from A to B, but such calling direction and transfer direction are merely an example and can be selected arbitrarily.

At first the terminal A executes a calling operation of the IP telephone. By a dialing operation of the terminal A (S801 in FIG. 5), a call connection process of the IP telephone utilizing the SIP server 110 is executed. As explained before, the SIP server 110 calls a partner terminal and returns an IP address, corresponding to the telephone number of the partner terminal B, to the terminal A (S802). The terminal A enters a calling state and awaits a response of the terminal B (S803). A conversation state is initiated when the terminal B responds (S804).

The terminal A activates a browser for displaying a WEB page (S805). By entering a URL into the browser of the terminal A, the terminal A enquires an address of the WEB server 113 designated by the URL to the DNS server 112, and receives a result of search (S806). The terminal A accesses to the WEB server 113 based on the IP address obtained from the DNS server 112 to receive data of the WEB page (S807), and causes the browser to display the WEB page (S808).

In the present embodiment, the terminal A, in order to transmit the WEB page displayed therein to the partner terminal, employs the IP address of the partner terminal obtained from the SIP server 110 as the transmitting IP address of the TCP packet to be transmitted at the HTTP access as will be explained later, whereby the data request is executed from the terminal A but the WEB data are transmitted to the partner terminal B.

More specifically, the terminal A, in order to transmit the WEB page displayed therein to the partner terminal, accesses again to the WEB server 113 (S809). In this operation, the IP address of the partner terminal obtained from the SIP server is used as the transmitting IP address in the request for the WEB data to the WEB server, so that the response from the WEB server 113 is returned to the terminal B.

After the browsing, the terminal A terminates the browser (S815 in FIG. 6), and cuts off the communication when the conversation with the partner terminal is completed (S816). Otherwise, it terminates the communication upon detecting a cut-off by the partner terminal.

On the other hand, the process of the terminal B is executed in the following manner.

The terminal B monitors an incoming call in a stand-by state (S810 in FIG. 5). Upon detecting an incoming call, the terminal B responds to the incoming call (S811), thereby entering a conversation state (S804).

During the conversation, the terminal B monitors a reception from the WEB server (S812). The terminal A accesses to the WEB server 113 as explained above (S809) and the WEB data requested by the terminal A are transmitted from the WEB server 113 to the terminal B. Upon receiving data from the server, the terminal B analyzes the received data. In case the received data are WEB data, and when a browser is not activated, the terminal B activates the browser (S813) and displays the WEB page (S814).

After the browsing, the terminal B terminates the browser (S817 in FIG. 6). Also it monitors the communication state with the partner terminal (S818), and terminates the communication upon detecting a cut-off by the partner terminal (S819). Otherwise, the terminal B terminates the, communication by itself.

FIGS. 7 and 8 schematically show the IP telephone communication sequence described above. The sequence shown in FIGS. 7 and 8 corresponds to the communication control shown in FIGS. 5 and 6, and is realized, also as explained before, by the execution of the communication control program by the CPU 201 shown in FIG. 1. FIGS. 9-11 show the structures of HTTP packets employed in the sequence shown in FIGS. 7 and 8.

In the sequence shown in FIGS. 7 and 8, steps are represented by numbers of 1000's and 1200's, and FIGS. 89-11 employ reference numbers of 2000's. In the following description, the correspondence to each step and each packet (or an internal structure thereof) in these drawings is indicated by a form "(S12xx•2xxx)".

In FIGS. 7 and 8, for the purpose of simplification, servers such as the SIP server, the location server and the DNS server provided by the respective ISPs of the terminals A and B are illustrated as ISP servers 1002, 1003.

Prior to the explanation of the sequence shown in FIGS. 7 and 8, the structure of the TCP packet will be explained with reference to FIG. 9. Packets shown in FIGS. 10 and 11 have a structure shown in FIG. 9. FIG. 9 shows a general structure of a packet employed in TCP/IP, which is constituted of an IP header part 2001 and an IP data part 2002. The IP header part 2001 includes a transmitting IP address 2008 and a destination IP address 2009.

The IP data part 2002 is further constituted of a TCP header part 2003 and a TCP data part 2004, and the TCP header part 2003 includes a transmitting port number 2005, a destination port number 2006, and a control flag 2007 indicating the type of the TCP packet.

In the following, there will be explained the sequence shown in FIGS. 7 and 8.

At first a dialing operation is executed on the operation unit 215 of the terminal A, whereby the terminal A (200) is connected to an ISP server 1002 of the terminal A (S1005 in FIG. 7). The ISP server 1002 (in fact an SIP server, a DNS server and the like) of the terminal A searches an IP address of the partner terminal B (220) (S1006), and sends a call packet to the searched IP address (S1007).

Upon receiving the call packet, the ISP server 1003 (in fact an SIP server, a DNS server and the like) of the terminal B calls the terminal B (220) (S1008). When the terminal B responds (S1009), the ISP server 1003 of the terminal B returns a connection packet to the ISP server 1002 of the terminal A (S1010). A call connection is completed when the ISP server 1002 of the terminal A returns a response to the terminal A 1001, and, in this state, the IP address of the terminal B is informed to the terminal A (S1011). Thereafter the terminals A and B enter a conversation state, in which audio packets are exchanged (S1012). This IP telephone communication is usually executed, giving emphasis on the real-time property, on an UDP base, including a message. However it is also possible to utilize another call connection method such as TCP H323, and the type of the IP telephone communication can be arbitrarily selected.

In the following, reference is made to FIG. 8 for explaining a sequence for sharing the WEB data, obtained by the terminal A from the WEB server 113, with the terminal B. In FIG. 8, the terminal A is indicated as a terminal A-1 and a terminal A-2, corresponding to two ports for data transmission/reception. In TCP/IP, a port number is used in a series of operations from a synchronization to a termination of the function, and another port number is used for a next series of operations. The terminal B functioning as the HTTP client can also utilize plural ports, but utilizes only one port in the HTTP communication of the present embodiment.

The terminal A, in order to display a WEB page therein, executes a synchronization of a data port 1201 and the WEB server. More specifically, the terminal A sends a SYN packet to the WEB server (S1205•2205), then receives a SYNACK packet therefrom (S1206•2206), and in response sends an ACK packet (S1207•2207). Thereafter, the port 1201 of the terminal A and the WEB server can execute an HTTP communication.

The terminal A requests WEB data to the WEB server (S1208•2208), and receives the WEB data (S1209•2209). The terminal A in response returns an ACK packet (S1210•2210), and displays the received WEB page (S1211).

The terminal A executes a WEB access again in order to cause the terminal B to also display the page. Ensuing operations are initiated by operating the resource transfer button 215a in the operation unit 215 of the terminal A. There may be employed a configuration in which the resource transfer button 215a is depressed each time to display the same WEB page on the partner terminal in conversation, or a configuration in which a depression of the resource transfer button 215a starts an internet resource sharing mode of constantly executing an internet resource sharing operation to be explained later. Also such internet resource sharing mode may be automatically started after the start of the conversation by the IP telephone.

The internet resource sharing explained in the following (browsing of a same WEB page in the present embodiment) can be executed automatically whenever a new WEB page is read on the terminal A.

At first, the terminal A executes a synchronization of the data port 1202 and the WEB server. A port number used in this operation is that usable in the terminal B. The terminal A sends a SYN packet to the WEB server (S1212•2212), then receives a SYN•ACK packet from the WEB server (S1213~2213), and in response returns an ACK packet (S1214•2214). IN this manner the port 1202 of the terminal A and the WEB server can execute an HTTP communication.

Then the terminal A requests a WEB page to the WEB server. In this operation, the IP address of the terminal B is described in the transmitting address of the IP header (S1215•2215). In response to this request, the WEB server sends the data of the WEB page to the requesting IP address (S1216•2216). The terminal B, having received the WEB data, returns an ACK packet to the WEB server (S1217•2217) and displays the WEB page (S1218).

In the present embodiment, in the terminal B receiving the WEB page transmitted by a rewriting of the transmitting address of the packet, a browser (or a TCP/IP stack of an operating system on which the browser functions) has to be capable of receiving WEB data that is not requested by itself and also displaying (or outputting in another form) such WEB data. Therefore, during the IP telephone communication, the operating system of the terminal B (or A: receiving side of the WEB data) is required to execute such a control that the WEB data transmitted to such terminal are supplied to a browser therein (including an activation of the browser if necessary).

As explained above, it is rendered possible to share an internet resource among the terminals in conversation by the IP telephone. Different from the prior transmission of the internet resource by voice in the IP telephone conversation, it is possible to mutually transmit the internet resource itself correctly thereby securely enabling the utilization of a same internet resource, and to improve the operability as a re-entry operation for data such as URL can be dispensed with.

In this manner, the terminals in communication by the IP telephone can utilize a same internet resource (utilization being a display in the aforementioned embodiment, but the method of utilization of the internet resource being not restricted to a display, as in a case of renewal of a firmware to be explained in the following), and it is rendered possible, in contrast to a prior transmission of the internet resource by voice in the IP telephone conversation, to mutually transmit the information of the internet resource correctly thereby securely enabling the utilization of a same internet resource, and to improve the operability as a re-entry operation for data such as URL can be dispensed with.

Also in the aforementioned embodiment, at the access to the WEB page to be shared with the partner terminal, the transmitting IP address is rewritten in such a manner that the desire WEB page is directly transmitted from the WEB server to the partner terminal, so that the sequence requires a significantly reduced number of steps in comparison with a communication control of transmitting the desired WEB page data themselves or the URL data thereof, and the communication can be achieved efficiently at a high speed. Particularly the receiving side of the WEB data can automatically browse the internet resource, indicated the URL thereof, without requiring a particular operation.

In the foregoing, a WEB page is considered as the internet resource to be shared by the first and second terminals in the IP telephone communication, but the first and second terminals can share any internet resource that can be represented by URL (or URI) or an equivalent information format (as long as FTP transmittable) indicating the location of the internet resource. The internet resource sharable by the invention can be any resource utilizable on a browser (or representable by a URL format), and is countless, including an FTP directory, a file therein, a Gopher page, and various services providing an audio or video (still/moving image) stream.

The internet resource sharing technology of the invention is widely applicable to the sharing information for business and amusement. In particular, it is considered useful, for the commercialization of the communication terminal of the invention, to utilize the technology for updating a firmware of the communication terminal of the invention. For example, in case a user of the communication terminal of the invention finds a trouble, and, upon consulting with a product support division of the manufacturer by IP telephone, reaches a conclusion that a firmware in the communication terminal has to be renewed, a support personnel of the manufacturer can directly transmit a URL of the firmware (for example a file obtainable by HTTP or FTP and usually provided from an HTTP server or an FTP server operated by the manufacturer) thereby executing an updating of the firmware. Utilizing a software installing function provided in many browsers, the file handling at the receiving side, such as a firmware updating, can be arbitrarily designated, so that such firmware updating of the communication terminal can be achieved without requiring any user operation.

The software realizing the present invention is applicable to a communication terminal of an arbitrary type connected to an IP network and executing a conversation by a predetermined IP telephone system, and may be supplied, as a program of the CPU of such communication terminal, by storing in a ROM or another memory medium, or supplied through an external memory medium (such as CD-ROM, flexible disk or MO) or through a network. Particularly in case of supply through a network, the software may be provided, as explained before, as an internet resource in the form of a firmware (or an additional software) of the communication terminal in an FTP server or an HTTP server, then downloaded to the communication terminal by the communication method of the invention, and installed automatically in the communication terminal for example by a software installing function provided in many WEB browsers.

In the foregoing, there has been explained a configuration of sharing a same internet resource among the terminals in conversation, by rewriting the transmitting IP address in such a manner that the desired WEB page is directly transmitted from the WEB server to the partner terminal, but the configuration for shared utilization of the internet resource is not limited to such form, and such shared utilization is naturally possible also by transferring the URL information of the desired internet resource to the partner terminal by an FTP or HTTP protocol, or by transferring the downloaded internet resource itself. In transferring such information to the terminal of the partner in conversation, since the IP address of the partner is already identified by the IP telephone procedure, an FTP or HTTP connection can be established with the IP address of the partner by an operation of the aforementioned resource transfer button or by a setting of an internet resource sharing mode, and the URL information of the internet resource or the data of such resource can be easily transferred through such connection.

Also the internet resource sharing operation can be extremely easily executed by the operation of the resource transfer button, and, a setting of an internet resource sharing mode (such mode being started by an explicit operation of the resource transfer button or started automatically after the start of conversation in the IP telephone) can further exclude cumbersome operations, so that the internet resource sharing operation can be easily achieved by any user.

The IP address of the partner, necessary for the internet resource sharing operation, can be obtained by the IP telephone procedure, without requiring a particular hardware or software.

As explained in the foregoing, the embodiment 4 adopts a configuration of achieving a shared. utilization of a same internet resource with the communication terminal of the partner of conversation, in a communication terminal connected to the IP network and executing a conversation by a predetermined IP telephone system, by accessing to a server providing a desired internet resource and changing, in a transmitting packet, the transmitting address to the IP address of the communication terminal of the partner in conversation, whereby a response packet of the server is transmitted to the communication terminal of the partner. It is thus rendered possible, in contrast to a prior transmission of the internet resource by voice in the IP telephone conversation, to mutually transmit the internet resource correctly thereby securely enabling the utilization of a same internet resource, and to improve the operability as a re-entry operation for data such as URL can be dispensed with. Thus the invention provides an excellent effect of securely sharing an internet resource with a partner in conversation by the IP telephone in simple and inexpensive manner, without requiring any cumbersome operations, by means of the communication terminal only and not relying on other equipment.

The invention claimed is:

1. A communication terminal having a browser, connected to an IP network and executing a conversation by a predetermined IP telephone system, comprising: a display which displays thereon an image by the browser; internet resource sharing means for sharing a same internet resource with a partner communication terminal having a browser in conversation, wherein said internet resource sharing is automatically started after starting the conversation, by transmitting a URL information of an internet resource being displayed on the display by the browser of the communication terminal to the partner communication terminal and receiving a URL information of an internet resource being displayed on a display by a browser of the partner communication terminal from the partner communication terminal in conversation, said URL information being described in a specified format including utilization control information relating to the internet resource being displayed, wherein in accordance with reception of the URL information, said internet resource sharing means automatically accesses an internet resource corresponding to the URL information in accordance with reception of the utilization control information.

2. A communication terminal connected to an IP network and executing a conversation by a predetermined IP telephone system, comprising: a display which displays thereon an image by a browser; internet resource sharing means for sharing a same internet resource with a partner communication terminal in conversation, wherein said internet resource sharing is automatically started after starting the conversation, by executing an FTP (File Transfer Protocol) log-in to the partner communication terminal, and transmitting a URL information of an internet resource being displayed on the display by the browser to the partner communication terminal or transmitting a request for a URL information of an internet resource being displayed on a display by a browser of the partner communication terminal in conversation by using an FTP procedure, wherein in accordance with reception of the URL information by the FTP procedure, said internet resource sharing means automatically accesses an internet resource indicated by the URL information.

3. A communication terminal connected to an IP network and executing a conversation by a predetermined IP telephone system, comprising: internet resource sharing means for sharing a same internet resource with a partner communication terminal in conversation, wherein said internet resource sharing is automatically started after starting the conversation, by transmitting or receiving a URL information of a desired internet resource to or from the partner communication terminal in conversation, wherein in order to receive an E-mail which describes the URL information, an Email polling interval for receiving E-mails from a POP server is automatically changed from an ordinary state interval to a short interval which is shorter than in the ordinary state interval in accordance with reception of the E-mail which describes the URL information during a conversation by the IP telephone, and wherein the polling interval is not changed in accordance with reception of another E-mail during a conversation by the IP telephone.

4. The communication terminal according to claim 3, wherein the E-mail polling interval is shortened after receiving an initial E-mail describing the URL information.

5. The communication terminal according to claim 1, wherein the URL information is transmitted to the partner communication terminal, based on an IP address of the partner communication terminal obtained by the predetermined IP telephone system.

6. The communication terminal according to claim 1, wherein the internet resource is WEB data provided by an HTTP server.

7. A communication terminal connected to an IP network and executing a conversation by a predetermined IP telephone system, comprising: display control means for accessing a server which provides a desired internet resource, transmitting to the server a packet which includes an IP address of the communication terminal, receiving the desired internet resource and causing a display means to display the desired internet resource; and internet resource sharing means for causing the server to transmit a same internet resource being displayed on the display means as the desired internet resource to a partner communication terminal, wherein said internet resource sharing is automatically started after starting the conversation, by again accessing the server and transmitting a packet which includes an IP address of the partner communication terminal but does not include an IP address of the communication terminal to request the desired internet resource being displayed on the display means.

8. The communication terminal according to claim 7, wherein the internet resource is WEB data, and the server is an HTTP server which provides the WEB data.

9. The communication terminal according to claim 7, wherein an IP address of the partner communication terminal is obtained by a call connecting procedure of an IP telephone.

10. The communication terminal according to claim 7, further comprising operation means for designating sharing of the internet resource.

11. The communication terminal according to claim 10, wherein an actuation for sharing the internet resource is executed for each operation of the operating means.

12. The communication terminal according to claim 7, wherein during a conversation by the IP telephone, is set an internet resource sharing mode where the actuation for sharing the internet resource with the partner communication terminal is executed every time the internet resource in use at the communication terminal per se is changed.

13. A method executed by a communication terminal having a browser, connected to an IP network and executing a conversation by a predetermined IP telephone system, comprising: a display step of displaying on a display of the communication terminal an image by the browser; an internet resource sharing step of sharing a same internet resource with a partner communication terminal having a browser in conversation, wherein said internet resource sharing is automatically started after starting the conversation, by transmitting a URL information of an internet resource being displayed on the display by the browser of the communication terminal to the partner communication terminal and receiving a URL information of an internet resource being displayed on a display by a browser of the partner communication terminal from the partner communication terminal in conversation, said URL information being described in a specified format including utilization control information relating to the internet resource being displayed, wherein in accordance with reception of the URL information, said internet resource sharing step automatically accesses an internet resource corresponding to the URL information in accordance with the utilization control information.

14. A method executed by a communication terminal connected to an IP network and executing a conversation by a predetermined IP telephone system, comprising: a display step of displaying on a display of the communication terminal an image by a browser; an internet resource sharing step of sharing a same internet resource with a partner communication terminal in conversation, wherein said internet resource sharing is automatically started after starting the conversation, by executing an FTP log-in to the partner communication terminal, and transmitting a request for a URL information of an internet resource being displayed on a display by a browser of the partner communication terminal in conversation by using an FTP procedure, wherein in accordance with reception of the URL information by the FTP procedure, said internet resource sharing step automatically accesses an internet resource indicated by the URL information.

15. A method executed by a communication terminal connected to an IP network and executing a conversation by a predetermined IP telephone system, comprising: an internet resource sharing step of sharing a same internet resource with a partner communication terminal in conversation, wherein said internet resource sharing is automatically started after starting the conversation, by transmitting or receiving a URL information of a desired internet resource to or from the partner communication terminal in conversation, wherein in order to receive an E-mail which describes the URL information, an Email polling interval for receiving E-mails from a POP server is automatically changed from an ordinary state interval to a short interval which is shorter than in the ordinary state interval in accordance with reception the E-mail which describes the URL information during a conversation by the IP telephone, and wherein the polling interval is not changed in accordance with reception of another E-mail during a conversation by the IP telephone.

16. A method executed by a communication terminal connected to an IP network and executing a conversation by a predetermined IP telephone system, comprising: a display control step of accessing a server which provides a desired internet resource, transmitting to the server a packet whose source address field is an IP address of the communication terminal, receiving the desired internet resource and causing a display means to display the desired internet resource; and an internet resource sharing step of causing the server to transmit a same internet resource being displayed on the display means as the desired internet resource to a partner communication terminal, wherein said internet resource sharing is automatically started after starting the conversation, by again accessing the server and transmitting a packet which includes an IP address of the partner communication terminal but does not include an IP address of the communication terminal to request the desired internet resource being displayed on the display means.

* * * * *